(12) United States Patent
Harvill

(10) Patent No.: US 12,073,418 B2
(45) Date of Patent: *Aug. 27, 2024

(54) SYSTEM AND METHOD FOR ADJUSTING CUSTOM TOPICAL AGENTS

(71) Applicant: Shiseido Company, Limited, Tokyo (JP)

(72) Inventor: Leslie Young Harvill, Half Moon Bay, CA (US)

(73) Assignee: Shiseido Company, Limited, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/301,148

(22) Filed: Apr. 14, 2023

(65) Prior Publication Data

US 2023/0419332 A1 Dec. 28, 2023

Related U.S. Application Data

(62) Division of application No. 16/510,851, filed on Jul. 12, 2019, now Pat. No. 11,676,157.

(Continued)

(51) Int. Cl.
*G06Q 30/00* (2023.01)
*G06F 16/242* (2019.01)
(Continued)

(52) U.S. Cl.
CPC ......... *G06Q 30/018* (2013.01); *G06F 16/243* (2019.01); *G06Q 30/0621* (2013.01);
(Continued)

(58) Field of Classification Search
CPC ............... G06Q 30/00; G06Q 30/0601; G06Q 30/0641; G06Q 30/0643
See application file for complete search history.

(56) References Cited

U.S. PATENT DOCUMENTS 5,249,263 A    9/1993    Yanker
5,315,508 A    5/1994    Bain et al.
(Continued)

FOREIGN PATENT DOCUMENTS

CN    101112304 A    1/2008
EP    1 196 893 B1    9/2003
(Continued)

OTHER PUBLICATIONS

Bouslimani, Amina, et al. "Molecular cartography of the human skin surface in 3D." Proceedings of the National Academy of Sciences 112.17 (2015): E2120-E2129. (Year: 2015).*

(Continued)

*Primary Examiner* — Christopher B Seibert
(74) *Attorney, Agent, or Firm* — Calderone McKay LLC

(57) ABSTRACT

Systems and methods herein are developed which enable modification of an initial customized cosmetic product, wherein the initial customized cosmetic product is created based on an initial customized cosmetic product specification or an existing specification of a non-custom product. One such system and method for making a custom cosmetic product from an existing non-custom cosmetic product is configured to be capable of: characterizing a non-custom product with a known key comprised of at least one search component; providing user interaction to modify at least one of the at least one search components in this key to create a modified key; and using the modified key to produce custom product which may include determining manufacturing instructions. Such systems and methods may incorporate a custom or non-custom product attribute data base for providing product attribute data for modification and adjustment of the user search key using an adjustment service. Also incorporated herein are applications based on user interaction through two-dimensional complexion color maps (Continued)

derived using data associated with skin color, tone, morphology and/or biochemistry from a plurality of users.

12 Claims, 20 Drawing Sheets

Related U.S. Application Data

(60) Provisional application No. 62/697,925, filed on Jul. 13, 2018.

(51) Int. Cl.
  *G06Q 30/018* (2023.01)
  *G06Q 30/0601* (2023.01)
  *G06V 10/56* (2022.01)
  *G06V 40/16* (2022.01)

(52) U.S. Cl.
  CPC ..... *G06Q 30/0627* (2013.01); *G06Q 30/0641* (2013.01); *G06V 10/56* (2022.01); *G06V 40/161* (2022.01); *G06V 40/162* (2022.01)

(56) References Cited

U.S. PATENT DOCUMENTS

| | | | |
|---|---|---|---|
| 5,622,692 A | 4/1997 | Rigg et al. | |
| 5,648,915 A | 7/1997 | McKinney et al. | |
| 5,903,465 A | 5/1999 | Brown | |
| 6,177,093 B1 | 1/2001 | Lombardi et al. | |
| 6,510,366 B1 | 1/2003 | Murray et al. | |
| 6,666,216 B2 | 12/2003 | Bourjal | |
| 6,761,697 B2 | 7/2004 | Rubinstenn et al. | |
| 6,856,861 B2* | 2/2005 | Dirksing | G07F 13/10 |
| | | | 700/239 |
| 6,985,230 B2 | 1/2006 | De Rigal et al. | |
| 7,061,617 B2 | 6/2006 | Querleux et al. | |
| 7,324,668 B2 | 1/2008 | Rubinstenn et al. | |
| 7,337,127 B1 | 2/2008 | Smith et al. | |
| 7,437,344 B2 | 10/2008 | Peyrelevade | |
| 7,634,103 B2 | 12/2009 | Rubinstenn et al. | |
| 8,265,351 B2 | 9/2012 | Aarabi | |
| 8,564,778 B1 | 10/2013 | Igarashi | |
| 8,593,634 B1 | 11/2013 | Igarashi | |
| 8,620,038 B2 | 12/2013 | Aarabi | |
| 8,660,319 B2 | 2/2014 | Aarabi et al. | |
| 8,693,768 B1 | 4/2014 | LaForgia | |
| 8,695,610 B2 | 4/2014 | Samain et al. | |
| 8,725,560 B2 | 5/2014 | Aarabi | |
| 8,830,468 B2 | 9/2014 | Igarashi | |
| 8,856,160 B2 | 10/2014 | Beaver et al. | |
| 8,933,994 B2 | 1/2015 | Gross et al. | |
| 9,007,588 B1 | 4/2015 | Igarashi | |
| 9,058,765 B1 | 6/2015 | Mallick et al. | |
| 9,064,279 B1 | 6/2015 | Tuan et al. | |
| 9,064,344 B2 | 6/2015 | Smith | |
| 9,118,876 B2 | 8/2015 | Felt | |
| 9,122,918 B2 | 9/2015 | Howell et al. | |
| 9,122,919 B2 | 9/2015 | Howell et al. | |
| 9,275,400 B2 | 3/2016 | Aarabi | |
| 9,330,298 B2 | 5/2016 | Imai | |
| 9,427,187 B2 | 8/2016 | Gilbert | |
| 9,442,494 B2 | 9/2016 | Igarashi | |
| 9,442,973 B1* | 9/2016 | Tuan | G01J 3/50 |
| 9,449,412 B1 | 9/2016 | Rogers et al. | |
| 9,460,462 B1 | 10/2016 | Walker et al. | |
| 9,519,927 B1 | 12/2016 | Tuan et al. | |
| 9,639,974 B2 | 5/2017 | Smith et al. | |
| 9,760,935 B2 | 9/2017 | Aarabi | |
| 10,083,345 B2 | 9/2018 | Choe et al. | |
| 10,321,748 B2 | 1/2019 | Howell et al. | |
| 10,943,279 B2 | 3/2021 | Stewart et al. | |
| 11,676,157 B2* | 6/2023 | Harvill | G06Q 30/0621 |
| | | | 705/26.5 |
| 2002/0049643 A1 | 4/2002 | Church | |
| 2003/0069667 A1 | 4/2003 | Dirksing et al. | |
| 2003/0149504 A1 | 8/2003 | Iwaki et al. | |
| 2003/0215471 A1 | 11/2003 | Wilmott et al. | |
| 2006/0210154 A1 | 9/2006 | Leveque et al. | |
| 2007/0145126 A1* | 6/2007 | Erlank | G06Q 30/06 |
| | | | 235/382 |
| 2008/0053167 A1* | 3/2008 | Basche | E05B 37/0048 |
| | | | 70/22 |
| 2008/0199042 A1 | 8/2008 | Smith | |
| 2008/0311061 A1 | 12/2008 | Heuer | |
| 2009/0271295 A1* | 10/2009 | Hodge | G06Q 30/0627 |
| | | | 715/764 |
| 2010/0068247 A1 | 3/2010 | Mou et al. | |
| 2010/0081971 A1 | 4/2010 | Allison | |
| 2010/0123801 A1 | 5/2010 | Son et al. | |
| 2010/0245823 A1 | 9/2010 | Chhibber et al. | |
| 2010/0329995 A1 | 12/2010 | Deeter | |
| 2011/0134275 A1 | 6/2011 | Nguyen | |
| 2011/0199204 A1* | 8/2011 | Dionis | E05B 45/005 |
| | | | 340/506 |
| 2011/0211047 A1 | 9/2011 | Chhibber et al. | |
| 2012/0027269 A1 | 2/2012 | Fidaleo et al. | |
| 2012/0188367 A1 | 7/2012 | Marcu | |
| 2012/0216911 A1 | 8/2012 | Bartholomew et al. | |
| 2012/0229828 A1 | 9/2012 | Gill | |
| 2013/0076932 A1 | 3/2013 | Chhibber et al. | |
| 2013/0128686 A1 | 5/2013 | Bartholomew et al. | |
| 2013/0148902 A1 | 6/2013 | Hyde et al. | |
| 2014/0081463 A1 | 3/2014 | Igarashi | |
| 2014/0094964 A1* | 4/2014 | Bartholomew | A45D 44/005 |
| | | | 700/233 |
| 2014/0267664 A1 | 9/2014 | Gross et al. | |
| 2014/0267665 A1 | 9/2014 | Howell et al. | |
| 2014/0267783 A1 | 9/2014 | Howell et al. | |
| 2015/0055086 A1 | 2/2015 | Fonte | |
| 2015/0085279 A1 | 3/2015 | Balooch et al. | |
| 2015/0107678 A1 | 4/2015 | Igarashi | |
| 2015/0145680 A1* | 5/2015 | Favier | G06Q 30/06 |
| | | | 340/572.9 |
| 2015/0339754 A1 | 11/2015 | Bloem | |
| 2015/0339757 A1 | 11/2015 | Aarabi | |
| 2015/0346976 A1 | 12/2015 | Karunamuni et al. | |
| 2015/0366328 A1 | 12/2015 | Tamura et al. | |
| 2016/0027087 A1 | 1/2016 | Ahmed | |
| 2016/0107133 A1 | 4/2016 | Sugino et al. | |
| 2016/0125228 A1 | 5/2016 | Son et al. | |
| 2016/0125624 A1 | 5/2016 | Liu et al. | |
| 2016/0135730 A1 | 5/2016 | Arai et al. | |
| 2016/0174690 A1 | 6/2016 | Howell et al. | |
| 2016/0316886 A1 | 11/2016 | Samain et al. | |
| 2016/0357196 A1 | 12/2016 | Igarashi | |
| 2017/0011711 A1 | 1/2017 | Campbell et al. | |
| 2017/0020436 A1 | 1/2017 | Flament | |
| 2017/0178220 A1* | 6/2017 | Chong | G06Q 50/01 |
| 2017/0228892 A1 | 8/2017 | Nichol et al. | |
| 2017/0262920 A1* | 9/2017 | Hodge | G06Q 30/0601 |
| 2018/0260871 A1 | 9/2018 | Harvill et al. | |
| 2019/0012632 A1* | 1/2019 | Favier | G06K 19/06018 |
| 2019/0350345 A1 | 11/2019 | Howell et al. | |
| 2020/0020011 A1 | 1/2020 | Harvill et al. | |
| 2021/0142382 A1 | 5/2021 | Stewart et al. | |
| 2022/0026276 A1 | 1/2022 | Harvill et al. | |

FOREIGN PATENT DOCUMENTS

| | | |
|---|---|---|
| EP | 1 488 737 B1 | 4/2010 |
| EP | 2 131 697 B1 | 9/2012 |
| JP | 2002-094868 A | 3/2002 |
| JP | 2002-131135 A | 5/2002 |
| JP | 2006-106951 A | 4/2006 |
| JP | 2006-254309 A | 9/2006 |
| JP | 2010-086036 A | 4/2010 |
| JP | 2012-128597 A | 7/2012 |
| WO | WO 2001/091600 A2 | 12/2001 |
| WO | WO 2002/008983 A1 | 1/2002 |

(56) References Cited

FOREIGN PATENT DOCUMENTS

| WO | 2014-144275 A2 | 9/2014 |
|----|----------------|--------|
| WO | 2015-126361 A1 | 8/2015 |

OTHER PUBLICATIONS

International Search Report and Written Opinion from Counterpart International Patent Application No. PCT/2019/041738, dated Sep. 20, 2019, 12 pages.
A. Chardon et al., "Skin Colour Typology and Suntanning Pathways," International Journal of Cosmetic Science 13, (1991) pp. 191-208.
S. Matsui et al., "Genetic Algorithm Can Optimize Hierarchical Menus," CHI 2008 Proceedings—Menu and Command Selection (Apr. 5-10, 2008—Florence Italy), pp. 1385-1388.
C. Donner et al., "A Layered, Heterogeneous Reflectance Model for Acquiring and Rendering Human Skin," ACM Transactions on Graphics, vol. 27, No. 5, Art. 140 (Dec. 2008), pp. 140:1-140:12.
C. Donner et al., "A Spectral Shading Model for Human Skin," University of California, San Diego (no date).
I. Jang et al., "Makeup Color Reproduction Based on Spectrum Data," 19$^{th}$ Korea-Japan Joint Workshop on Frontiers of Computer Vision, 978-1-4673-5621-2/13 (2013 IEEE), pp. 233-236.
G. Jalal, "Color Portraits: From Color Picking to Interacting with Color," Interacting with GUIs, CHI 2015, Crossings, Seoul, Korea, (Apr. 18-23, 2015) pp. 4207-4216.
J. Koenderink et al., "Color Picking: The Initial 20s", ACM Transactions on Perception, vol. 13, No. 3, Article 13 (Apr. 2016), pp. 13:1 to 13:25.
Barng, Keejung. "Makeup Design and the Application of 3D Facial Avatar Makeup Simulation." Journal of Fashion Business 18.6 (2014): pp. 57-66. (Year: 2014).
T. Chen, "Hyperspectral Modeling of Skin Appearance," ACM Transactions on Graphics, vo. 34, No. 3, Article 31, (Apr. 2015) pp. 31:1-31:14.
Li et al., "Simulating Makeup Through Physics-based Manipulation of Intrinsic Image Layers", Proceedings of the IEEE Conference on Computer Vision . . . (Year 2015).
Search Report in Japanese Counterpart 2021-500854 with English Translation (Aug. 5, 2004)(14 pages).
Response to Japanese Counterpart 2021-500854, Dec. 28, 2023 (12 pages).
Decision to Grant Japanese Counterpart 2021-500854, Feb. 13, 2024 (6 pages).

\* cited by examiner

Figure 12
Figure 12a
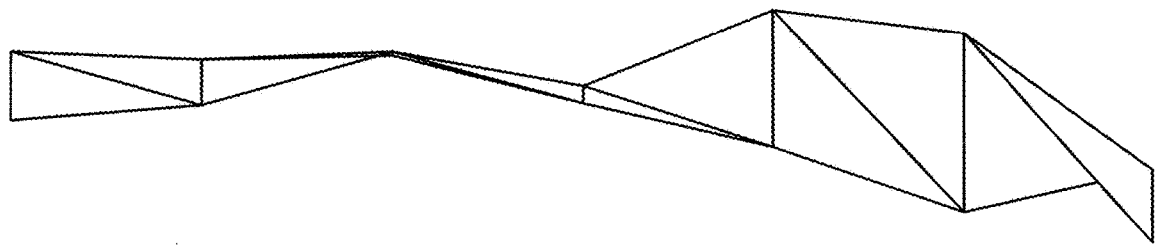
Figure 12b
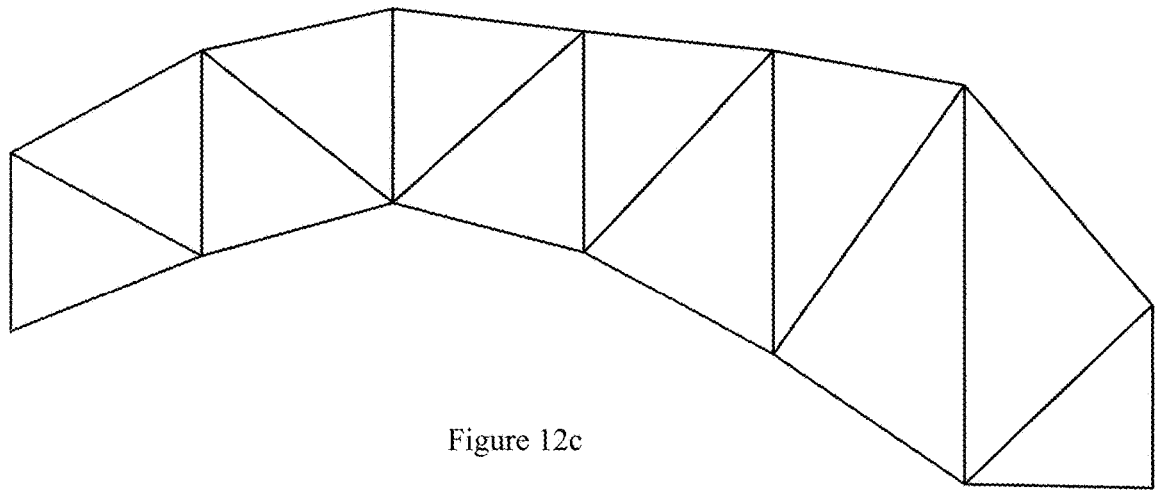
Figure 12c
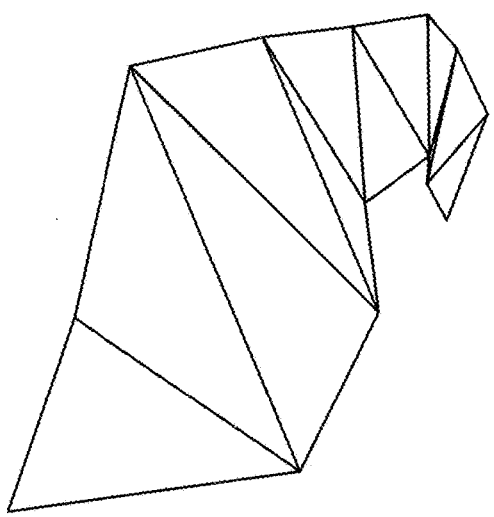

SYSTEM AND METHOD FOR ADJUSTING CUSTOM TOPICAL AGENTS

CROSS-REFERENCE TO RELATED APPLICATIONS

This U.S. Non-Provisional Patent application is a divisional non-provisional Patent Application claiming priority under 35 U.S.C. § 120 to U.S. Non-Provisional patent application Ser. No. 16/510,851, filed Jul. 12, 2019, entitled, "System and Method for Adjusting Custom Topical Agents," which claims the benefit under 35 U.S.C. § 119(e) to U.S. Provisional Patent Application No. 62/697,925, filed Jul. 13, 2018, the entire disclosures of which are incorporated herein by reference.

BACKGROUND OF THE INVENTION

Field of the Invention

The field of the invention relates generally to image analysis and topical agent formulation and, more specifically, to systems and methods for determining a customized cosmetic formulation based on color skin images, and further to such systems in which a customer or end user of such formulations can further modify the customized cosmetic formulation using specific user information and feedback from, for example, an interactive user interface, and more particularly for a system and method having interactive sensing, display and adjustment of attributes of custom cosmetics formulated using the systems and methods herein.

Description of Related Art

Aesthetic and protective cosmetic topical agents in the form of an applied cream or lotion are widely used to protect against UV radiation, provide a moisture barrier, mask blemishes and skin discoloration, reduce or prevent irritation, and provide other healthful and aesthetic benefits. In the best of all possible worlds, these protective topical agents would be specified by a team of experts for a particular individual with specific needs, and for a specific environment or use. The topical agent would then be formulated in a timely manner and delivered to the individual and the individual could have the possibility to collaborate in the creation of such formulations. Unfortunately, logistics and cost have to date limited the practicality of providing such a specific, optimized product to a given user.

There are several prior art approaches for providing cosmetic topical agents that match a particular need. These agents may be compounded based on a specification from a dermatologist. They may be assembled in a retail store from a set of ingredients by a knowledgeable clerk. Systems or sets of cosmetic creams or lotions with a wide variety of properties may be pre-manufactured and chosen based on a given customer's coloration, skin type, and specific needs.

The main barrier to a general solution for the custom manufacture and distribution of these topical agents is that the number of features in the product are many, and the needs are quite varied. It is also not commercially feasible to manufacture and stock each formulation with the granularity that is optimum for a given need and individual. A need in the art arose for ways to provide useful compounds based on a determination of an individual's specific needs using, for example, advanced image analysis techniques, and formulations that are optimal for that set of needs.

Techniques to capture the reflectance spectra of a surface with moderate specular reflectance and predominately diffuse reflectance can require measuring the reflected color as RGB triplets, or measuring the reflected spectra of the surface using optical methods to integrate the reflectance with a known light source at a known distance with a detector that has been set to a fixed aperture, fixed integration optics, and measured over a fixed period of time. Devices that use these techniques are reflection spectrophotometers and colorimeters.

Some mobile devices have many of the characteristics of the colorimeter. For instance, they have a light source with known characteristics, a charge-coupled device ("CCD") detector, a processor, and a lens system that can be used for integration. The primary barriers to using mobile devices as accurate colorimeters are the need to: (1) control ambient light; (2) set the distance to the surface to be sampled; (3) control the aperture used for measurement of the sample; (4) control the detector sensitivity used for measurement of the sample; (5) control the time used for measuring the sample; (6) control the white balance for measuring the sample; and (7) control the focal plane for measuring the sample.

While cameras used in mobile devices have become the most popular handheld cameras presently in use, they generally lack the ability to manually set aperture, and the most popular devices do not allow software to set aperture, sensitivity, or exposure times, although some now allow for the setting of exposure, exposure time and sensitivity. While the hardware and firmware of the mobile device may report what camera settings are used as data embedded in a resulting digital image file, techniques are often used within the firmware to enhance or improve the image, and adjust the white balance. The firmware that controls the camera has been generally optimized to produce quality snapshots, not to make reliable measurement of light and color.

Systems and methods were thus developed to address these issues and allow a user to capture accurate, repeatable color samples using a mobile device. A formulation for an aesthetic and protective topical agent optimized for a specific use was developed by the applicant herein and is disclosed in U.S. Pat. Nos. 8,933,994, 9,122,918 and 9,122,919. The implementation of this and other systems are now being used in industry, and are available in the marketplace. Companies such as MATCHCo. provide a full-stack solution to produce and/or offer for sale such agents. The system and method disclosed in U.S. Pat. No. 8,933,994 has many benefits, not only in enabling the practical production of these aesthetic agents, but in the ability of such systems and methods to characterize a given user's characteristics and use these characteristics to derive a specific formula or match the user to a closest formulation in the database, which may be a pre-existing non-custom product. Thus, a new formulation can be particularly formulated based on such systems for an individual user and/or a user matched to a closest match in the form of a non-custom product formulation which is then associated with a user key as the user's matched custom cosmetic.

While systems such as those described in U.S. Pat. Nos. 8,933,994, 9,122,918 and 9,122,919 may provide an accurate match for a user based on user interaction and scanning previously described, there is further a need in the art to address the issue of how to respond to the user should the user decide he or she wishes to modify the requirements of a specifically matched formulation for aesthetic, environmental, or cultural reasons and also to provide a basis for a user to evaluate their profile and determine if a change should be made after receiving a customized cosmetic.

A user may also fall outside of the collected dataset used to construct such a system as described in U.S. Pat. No. 8,933,994. Thus, it would be desirable to develop and provide a method for a user to provide additional input in such a system to adjust an existing custom agent which may be characterized as described in U.S. Pat. No. 8,933,994. Applicant developed a system for allowing further input and modification which is described in U.S. Patent Publication No. 2018/0260871 A1, that allows modification of a search key using user interaction from closest vector or surround search key selection. There is a need in the art to further improve such a method of modification to provide an improved accuracy in skin color, tone and/or undertone when modifying a customized cosmetic of a user, whether it is based on a specialized formulation or an existing non-customized product.

Adaptive systems have been developed that employ a user interaction to iterate toward a user's intent. For instance, there are well-known methods to select color for a specific use. Some are as simple as selecting a colored tile or square, and seeing it applied interactively to an image or product in a computer interface. A useful description of color picking may be found in J. Koenderink et al., "Color Picking: The Initial 20s," ACM Transactions on Applied Perception, Vol. 13, No. 3, Article 13, pp. 13/1-13/25 (2016). Early patents which describe choosing color in an interface, include, for example, U.S. Pat. No. 5,249,263.

As described in Koenderink, supra, such prior art color-picking methods provide an interface for selection of color for display, rather than for manufacturing.

Other methods apply a set of variables to a graphic filter, and present many variations of these variables in an array of rendered choices. On user selection of a set of variable values, a new set of selections may be presented based on a data model, such as described in G. Jalal et al., "Color Portraits: From Color Picking to Interacting with Color," CHI 2015 Proceedings of the 33rd Annual Association of Computing Machiner (ACM) Conference on Human Factors in Computing Systems, pp. 4207-4216, Seoul, Republic of Korea (Apr. 18-23, 2015).

Other techniques use genetic algorithms to learn how a user interacts and to provide interactions that are more intuitive. See, S. Matsui et al., "Genetic Algorithm Can Optimize Hierarchical Menus, CHI 2008 Proceedings of the SIGCHI Conference on Human Factors in Computing Systems, pp. 1385-1388, Florence, Italy (Apr. 5-10, 2008).

U.S. Pat. No. 8,856,160 describes a method to associate user choice of a key-value attribute for a customizable product, matching the key-value to at least one other key-value and selecting a filter, filtering that key-value selection, and applying it to the product.

U.S. Patent Application Publication No. 2008/0311061 A1 describes an apparatus for gathering color data from a user, comparing that color information to a set of stored color data, and mixing pigments for a custom product based on the comparison of the user data and the stored data.

In addition to the issues noted above, it would be useful to develop an advanced and more accurate way to translate color choices for a user and match them to products and/or advise a user on products that more closely tracks actual user skin color data. Aside from providing tiles or color squares that are known colors for a user to choose from for modification or selection, it would be helpful to build a user-friendly complexion color mapping system derived based on actual user data and on data taken from existing commercial products, commercial products used on users, and customized products matched to users (whether based on a specialty formulation or an existing non-custom product) to enable a user to easily interact with a custom cosmetic formulation and non-custom, commercial cosmetic database to select and/or adjust colors using color-matching and color section techniques that address issues that occur in prior art color-matching systems.

For example, there are many methods known for mapping complexion colors. One such method is the Fitzpatrick Scale. This scale is based on a user's sensitivity to the sun. A series of questions are asked of the user, and the system includes six levels. While this scale has some applicability, it not well adapted for use with Asian- or African-like complexions. Over time, its use was largely supplanted by the use of spectrophotometer readings or the Lab color space. In 1976, the CIELAB color model, L*a*b color was developed and was useful for clinical and industry measures, however, its notation is not easy for users to understand and it is projected in 3-D orientation which is difficult to employ in interactivity.

Chardon Grading ITA was also adapted for mapping of L*a*b data, and uses the L*b* plane of the CIELAB model and a transform that is ITA=((A TAN(L8−50)/B*)×180/π. This model, which maps to 6 levels, while useful for linear scale replacement of the Fitzpatrick scale, omits the contribution of the A* component of CIELAB.

The Pantone Skin Tones provides 110 colors based on a gamut of skin tones. It uses a scale of 1 to 15 for measuring skin from light to dark, and based on a scale of 1 to 5 for yellow undertones and 1 to 5 for red undertones. Discrete colors are matched through direct comparison with skin. However, it provides no direct mapping to spectrophotometer L*a*b measurements. Pantone Color IQ uses the Pantone Skin Tones and is tied to a proprietary colorimeter. It is mapped to retain cosmetics, but is still limited to 110 shades.

Despite such prior art systems, none address a need in the art for a method and system that allows a user to modify an existing customized cosmetic formulation associated with a user (whether created as a unique formulation or initially associated to a user based on a non-custom product) through an interactive user interface so as to automatically create a new and/or modified customized cosmetic formulation, or that provides a basis for a breadth of accurate complexion color mapping using a more expansive breadth of colors from L*a*b CIELAB data, that adapts for geographical areas (where there are differing temperate and environmental skin impact), and that provides a simple and easy-to-use two-dimensional mapping, while still taking into account a full representation of skin undertones, and taking into account morphology and biochemistry of a user's skin. It would also be preferred to enhance skin scanning and sensing capabilities to allow for better matching and/or adjustment in color and tone of custom cosmetics.

BRIEF SUMMARY OF THE INVENTION

To modify or adjust a custom cosmetic associated with a user (whether a unique formulation or a match to a non-custom product) at a specific time or place, or to produce an adjusted product from an existing non-custom product at a user's request, there is a need to employ a specific set of the embodiments described in U.S. Pat. Nos. 8,933,994, 9,122,918 and 9,122,919 as well as U.S. Patent Application Publication No. 2018/0260871 A1, each of which is incorporated herein by reference in relevant part. This same mechanism may be used and modified to adjust an aesthetic agent to a user's specification, and to map the user's characteristics and specifications to additional products. Such mechanisms are further improved herein.

In particular, the same mechanism and an improvement mechanism herein are useful for describing a scanning operation for collecting a specific user's characteristics to be performed on a separate device from the manufacturing device or system, and for that device to communicate the scan information to a server, and for that information be associated with that user on a data store on that server. In this way, scanning data may be used for editing later.

That mechanism is further useful for the server to transform the user scanning data into a form that may be used to find or calculate instructions for manufacture for a variety of cosmetic products. This data form will be called the "key" and is as described, e.g., in U.S. Pat. No. 8,933,994.

Since there may be many different forms of cosmetic products, and many different manufacturers, it is useful to have a separate action performed on a server that will use a specific user's key to find or calculate instructions for manufacturing a specific cosmetic product.

It is also preferred and further useful for the manufacturing apparatus or system to be separate from the device that generates instructions for manufacturing, since these may be in different locations, manufacture different products, or use different manufacturing processes.

While there are prior known techniques to provide interaction for a user to choose a variation in color, increase or decrease a specific setting as described above, or to choose a different setting to affect a modification, each of these prior techniques is specific to the data model being modified. The data model in the present invention is the user characteristics encoded in the scan data, and that is transformed into a "search key". Its application is in deriving a specific customized cosmetic formula (associated with an OAPTA specification as described herein) using the methods described in U.S. Pat. No. 8,933,994 and herein. Since that data model and system of application are unique, the interaction choices presented to the user will be unique as determined by that data model.

The system disclosed herein differs from prior systems in that the user employing the present invention may create a new user key or already be associated with a search key as that term is defined in U.S. Pat. No. 8,933,994 and herein. The search key is also not in key-value form. More particularly, the search key itself may be modified directly, without filtering. The interactive choices presented to the user herein to modify the search key are based on data found within a "ground truth dataset." The system described herein is further unique in comparison with the prior art discussed above in that it collects user data on a separate apparatus, and in a separate process transforms the user scan data into a search key. It then provides another process or interaction to modify the search key and/or to add an additional search key for the same user, preferably, the search key is modified to include different or additional data. The search key as before modification, after modification may then be used to produce a multiplicity of products with different formulas and/or to associate the user with formulations including non-custom products and/or modified non-custom products.

The invention includes a system for making a customized cosmetic product from an existing non-custom cosmetic product, wherein the system is configured to be capable of: a. characterizing a non-custom product with a known search key comprised of at least one search component; b. providing user interaction to modify at least one of the at least one search components in the search key to create a modified search key; and c. using the modified search key to produce a modified customized cosmetic product and to determine manufacturing instructions.

The at least one search component may be one or more of color, color variance, coverage, surface quality, surface finish, dryness, oiliness, SPF, hair color, eye color, facial shape and/or pore size.

In such a system, each user interaction may be based on the selection of a search key to modify. A user interaction direction may be based on past likelihood of the edit direction. A user interaction amount may be based on a change of a key component within a neighborhood of closest keys. A user interaction may include viewing a complexion color map having a location on the map associated with the user and selecting a new location on the complexion color map. The complexion color map may include data relating to one or more of skin color, tone, and/or undertone. The location on the complexion color map and the data of the complexion color map may be derived, at least in part, from the morphology of the skin and the biochemistry of the skin. Each location on the complexion color map may correspond to a CIELAB color within a range of error of ±about 3 percent. The complexion color map may be prepared based on reference users' skin morphology and biochemistry. Regions of the complexion color map may be associated with a natural language description, which may be used as a speech user interface to specify and search for a product or for use in modifying a product.

The manufacturing instructions in the system may comprise amounts of cosmetic primary components, and wherein each cosmetic primary component is a valid cosmetic product that meets applicable regulatory requirements. Two cosmetic primary components may be made and recorded to verify proportions of the cosmetic primary components in a record. Customer contact information is preferably associated with the record. The known search key is preferably associated with a user and the user interaction may further include using a device having an optical sensor to submit updated data to the system for updating data associated with the known search key, and wherein the updated data is employed in the system to optimize the known search key and the modified search key. The modified search key and known search key are preferably each stored in the system and associated with a user.

The user interaction may include interactive selection on a user interface of a slider, button, image or complexion color map to modify at least one search component. The complexion color map may include data relating to one or more of skin color, tone and/or undertone. The complexion color map may be derived, at least in part, from the morphology of the skin and the biochemistry of the skin. Each location on the complexion color map may correspond to a CIELAB color within a range of error of ±about 3 percent. The complexion color map may be prepared based on reference users' skin morphology and biochemistry. Regions of the complexion color map may be associated with a natural language description, which may be used as a speech user interface to specify and search for a product or for use in modifying a product.

The invention further includes a system to modify a customized cosmetic product, wherein the system is configured to be capable of: a. specifying a customized cosmetic product by a known search key comprised of at least one search component; b. providing user interaction to modify the at least one search component in the known search key to create a modified search key; and c. using the modified search key to produce a modified customized cosmetic product and to determine manufacturing instructions. The customized cosmetic product in the system may be either a unique formulation or an existing non-custom product associated with the user or may be a non-custom product selected by the user for modification.

The at least one search component may be one or more of color, color variance, coverage, surface quality, surface finish, dryness, oiliness, SPF, hair color, eye color, facial shape and/or pore size.

In this embodiment, each user interaction may be based on the selection of a search component to modify. The user interaction direction may be based on past likelihood of the edit direction. The user interaction amount may be based on a change of a search component within a neighborhood of closest keys.

The manufacturing instructions in this embodiment may comprise amounts of cosmetic primary components, each cosmetic primary component being a valid cosmetic product that meets applicable regulatory requirements. Two measurement may be made and recorded to verify the proportions of the primary components in a record.

Preferably customer contact information is associated with the record. The known search key is preferably also associated with a user and the user interaction may further include using a device having an optical sensor to submit updated data to the system for updating data associated with the known search key, and wherein the updated data is employed in the system to optimize the known search key and the modified search key.

The modified search key and known search key are each preferably each stored in the system and associated with a user. The user interaction may include interactive selection on a user interface of a slider, button, image or a complexion color map to modify at least one search component. The complexion color map may include data relating to one or more of skin color, tone and/or undertone. The complexion color map may be derived, at least in part, from the morphology of the skin and the biochemistry of the skin. Each location on the complexion color map may correspond to a CIELAB color within a range of error of ±about 3 percent. The complexion color map may be prepared based on reference users' skin morphology and biochemistry. Regions of the complexion color map may be associated with a natural language description, which may be used as a speech user interface to specify and search for a product or for use in modifying a product. The complexion color map may be derived, at least in part, from the morphology of the skin and the biochemistry of the skin. Each location on the complexion color map may correspond to a CIELAB color within a range of error of ±about 3 percent. The complexion color map may be prepared based on reference users' skin morphology and biochemistry. Regions of the complexion color map may be associated with a natural language description, which may be used as a speech user interface to specify and search for a product or for use in modifying a product.

Also included in the invention herein is a method for modifying a customized cosmetic product associated with a user, comprising: a. providing a system configured to be capable of specifying an initial customized cosmetic product of a user by a known search key comprised of at least one search component; b. providing an interactive user interface that allows a user to modify at least one search component in the search key to create a modified search key; and c. using the modified search key to produce a modified customized cosmetic product and to determine modified manufacturing instructions associated with the modified customized cosmetic product. The customized cosmetic product in the system may be either a unique formulation or an existing non-custom product associated with the user or may be a non-custom product selected by the user for modification.

The initial customized cosmetic product may be the same as a non-custom product and the known search key of the initial customized cosmetic product may be the same as a search key of the non-custom product. The at least one search component may be one or more of color, color variance, coverage, surface quality, surface finish, dryness, oiliness, SPF, hair color, eye color, facial shape and/or pore size. In the method, the user interface may include one or more sliders, each associated with a search component. The user interface may include a complexion color map having a location associated with a user and with the known search key, and the user may select a new location on the complexion color map to modify at least one of the search components and create the modified search key. The complexion color map may include data relating to one or more of skin color, tone, and/or undertone. The complexion color map may be derived, at least in part, from the morphology of the skin and the biochemistry of the skin. Each location on the complexion color map may correspond to a CIELAB color within a range of error of ±about 3 percent. The complexion color map may be prepared based on reference users' skin morphology and biochemistry. Regions of the complexion color map may be associated with a natural language description, which may be used as a speech user interface to specify and search for a product or for use in modifying a product.

The system may collect data associated with the search components of the known search key through a device having an optical sensor and the system may further comprise an application capable of interactively guiding the user to scan a calibrated image and of transmitting data from the scan to the system. The device further preferably comprises a light source. The data transmitted from the scan may include device data as well as user data, in which case the application is preferably capable of controlling at least one device setting selected from the group consisting of aperture, exposure, exposure time, shutter speed, focus, ISO sensitivity, and/or white balance.

The system may comprise in one embodiment an order management service including a ground truth database and the application includes a user interface that allows the user to interact with the device having an optical sensor, and wherein the system further comprises a mixture service, a print service, a dispensing application, a shipping application, and a printing application. The ground truth database may include or be associated with a product attribute data store.

The system may comprise a product attribute data store that includes reference data for a plurality of products, which include non-custom products and/or customized cosmetic products, and each product in the product attribute data store is preferably associated with at least one product attribute, and wherein a user interaction with the system includes selecting a product from the product attribute data store or introducing a non-custom product to the product attribute data store for selection. In one embodiment, introducing the non-custom product to the product attribute data store comprises: using a device with an image sensor to scan or take a photo of packaging of the non-custom product; applying the non-custom product as a swatch to an area of a face of the user; taking a photo of the face having the swatch of the non-custom product thereon; and transmitting the photo or scan of the non-custom product and the photo of the face having the swatch of the non-custom product thereon to an adjustment service.

The system may further comprise an adjustment service, in which case the application may include or be able to access and/or interact with the adjustment service.

The adjustment service may be configured to carry out the following steps: identifying the product in the transmitted photo or scan of the non-custom product; retrieving data associated with at least one product attribute of the identified product from the product attribute data store; locating a product region having the swatch in the transmitted photo of the user's face and calculating a relative product color for the product region; locating a skin region next to the product region and calculating a relative skin region color for the skin region; transforming each of the relative product color and relative skin region color into an absolute color using the data from the product attribute data store; and analyzing the difference between the absolute skin region color and the absolute product color, and using the difference to modify the search key associated with the user to create modified manufacturing instructions.

The adjustment service may be configured to carry out the following steps: identifying the product in the transmitted photo or scan of the non-custom product; retrieving data associated with at least one product attribute of the identified product from the product attribute data store; locating a product region having the swatch in the transmitted photo of the user's face and calculating a relative product color for the product region; locating a skin region next to the product region and calculating a relative skin region color for the skin region; transforming each of the relative product color and relative skin region color into an absolute color using the data from the product attribute data store; and using the absolute skin color represented as a CIELAB color, to provide a facial scan and associated facial scan data for use in the application.

The facial scan and associated facial scan data from the absolute skin color is preferably associated with the known search key and when transmitted updates the known search key to create the modified search key. The facial scan and associated facial scan data are preferably transmitted to the system, the system comprises a user interface, and the application provides a user interaction selected from the group of modifying a user location on a complexion color map associated with the known search key of a user and modifying a user profile including user data based on the known search key using the user interface. The complexion color map may include data relating to one or more of skin color, tone, and/or undertone. The complexion color map may be derived, at least in part, from the morphology of the skin and the biochemistry of the skin. Each location on the complexion color map may correspond to a CIELAB color within a range of error of ±about 3 percent. The complexion color map may be prepared based on reference users' skin morphology and biochemistry. Regions of the complexion color map may be associated with a natural language description, which may be used as a speech user interface to specify and search for a product or for use in modifying a product.

Also included herein is a method for modifying a customized cosmetic product associated with a user, comprising: a. providing a system configured to be capable of specifying an initial customized cosmetic product of a user by a known search key comprised of at least one search component; b. providing an interactive user interface that allows a user to modify at least one search component in the search key to create a modified search key, wherein the user interface comprises a complexion color map having a location associated with the user and with the known search key, and wherein the user selects a new location on the complexion color map to modify at least one of the search components and create a modified search key; and c. using the modified search key to produce a modified customized cosmetic product and to determine modified manufacturing instructions associated with the modified customized cosmetic product. The initial customized cosmetic product in the system may be either a unique formulation or an existing non-custom product associated with the user or may be a non-custom product selected by the user for modification, In this embodiment, the initial customized cosmetic product may be the same as a non-custom product and the known search key of the initial customized cosmetic product may be the same as a search key of the non-custom product.

The at least one search component may be one or more of color, color variance, coverage, surface quality, surface finish, dryness, oiliness, SPF, hair color, eye color, facial shape and/or pore size. The complexion color map may include data relating to one or more of skin color, tone, and/or undertone.

The complexion color map may be derived, at least in part, from the morphology of the skin and the biochemistry of the skin. Each location on the complexion color map may correspond to a CIELAB color within a range of error of ±about 3 percent. The complexion color map may be prepared based on reference users' skin morphology and biochemistry. Regions of the complexion color map may be associated with a natural language description, which may be used as a speech user interface to specify and search for a product or for use in modifying a product.

The complexion color map may be prepared using at least one two-dimensional projection of L*a*b* color data in the L*/b* plane, wherein the L*a*b* color data is taken from a group of users having varying complexions scanned using a calibrated spectrophotometer, and a plurality of regions overlaying the two-dimensional projection are associated with varying complexions.

The system may further comprise an application that is installed on or in communication with a device having an optical sensor, wherein: the application interactively guides the user to scan an area of the user's skin to collect data on one or more skin regions of the user; wherein the application is capable of adjusting the device settings for controlled scanning of the user's skin; and wherein the data collected is used to identify a location on the complexion color map associated with the user and the initial search key.

In one embodiment of the method, step (b) further comprises the application interactively guiding the user to complete a new scan of the user's skin to collect updated data prior to creating the modified search key, and wherein changes in the updated data are collected by the system and used to modify the location on the complexion color map associated with the user and the initial search key. The user may interact with the user interface to select the new location on the complexion color map based on at least one of a user preference, or a recommendation from the application based the changes in the updated data.

The invention further includes a system to modify a customized cosmetic product, wherein the system is configured to be capable of: a. specifying a customized cosmetic product by a known search key comprised of at least one search component; b. providing user interaction to modify the at least one search component in the known search key to create a modified search key, wherein the user interaction includes interactive selection on a complexion color map to modify the at least one search component, and the complexion color map includes data relating to one or more of skin color, tone, and skin undertone; and c. using the modified search key to produce a modified customized cosmetic product and to determine manufacturing instructions.

In this system, the at least one search component may be one or more of the group of color, color variance, coverage, surface quality, surface finish, dryness, oiliness, SPF, hair color, eye color, facial shape and/or pore size. Each user interaction may be based on the selection of a search component to modify. The user interaction direction may be based on past likelihood of the edit direction. If manufacturing instructions are included, such manufacturing instructions may comprise amounts of cosmetic primary components, each cosmetic primary component being a valid cosmetic product that meets applicable regulatory requirements. In the system, two measurements may be made and recorded to verify the proportions of the primary components in a record. Further, customer contact information may be associated with the record.

The known search key may be associated with a user and the user interaction may further include using a device having an optical sensor to submit updated data to the system for updating data associated with the known search key, and wherein the updated data is employed in the system to optimize the known search key and the modified search key. The modified search key and known search key may each stored in the system and associated with a user.

The user interaction may further include interactive selection on a user interface of a slider, button, or image to modify at least one additional search component. In one embodiment, each location on the complexion color map corresponds to a CIELAB color within a range of error of ±about 3 percent. Regions of the complexion color map may be associated with a natural language description. In such embodiment, the natural language description may be used as a speech user interface to specify and search for a product or for use in modifying a product.

The customized cosmetic product associated with the known search key may be selected from a unique formulation associated with the user and a non-custom cosmetic associated with the user. The customized cosmetic product associated with the known search key may be a non-custom cosmetic selected by the user. The customized cosmetic product may be selected by the user by applying a swatch of the non-custom cosmetic on the user's skin and scanning an image of the swatch on the user's skin to the system, by the user scanning the non-custom product and/or by the user scanning the non-custom product in a container. The customized cosmetic product associated with the known search key may also be associated with a location on the complexion color map and the interactive selection on the complexion color map may include identifying a second location on the complexion color map.

A method is also included for modifying a customized cosmetic product associated with a user, comprising: a. providing a system configured to be capable of specifying an initial customized cosmetic product of a user by a known search key comprised of at least one search component; b. providing an interactive user interface that allows a user to modify at least one search component in the search key to create a modified search key, wherein the user interaction includes interactive selection on a complexion color map to modify the at least one search component, and the complexion color map includes data relating to one or more of skin color, tone, and skin undertone; and c. using the modified search key to produce a modified customized cosmetic product and to determine modified manufacturing instructions associated with the modified customized cosmetic product.

In one embodiment of this method for modifying a customized cosmetic product, the at least one search component may further include a search component selected from the group of color variance, coverage, surface quality, surface finish, dryness, oiliness, SPF, hair color, eye color, facial shape and/or pore size. Each location on the complexion color map may correspond to a CIELAB color within a range of error of ±about 3 percent. Regions of the complexion color map may be associated with a natural language description, in which case the natural language description may be used as a speech user interface to specify and search for a product or for use in modifying a product.

In the method, the system may collect data associated with the at least one search component of the known search key through a device having an optical sensor and the system further comprises an application capable of interactively guiding the user to scan a calibrated image and of transmitting data from the scan to the system. In the method, the system may also collect data associated with the at least one search component of the known search key through a device having an optical sensor and the device further comprises a light source. The data transmitted from the scan may include device data and the application is capable of controlling at least one device setting selected from the group consisting of aperture, exposure, exposure time, shutter speed, focus, ISO sensitivity, and/or white balance.

The system in the method may also comprise an order management service including a ground truth database and the application includes a user interface that allows the user to interact with the device having an optical sensor, and wherein the system further comprises a mixture service, a print service, a dispensing application, a shipping application, and a printing application.

In the method, the device may scan a face and associated facial scan data can be transmitted to the system, wherein the system may include an application that provides the interactive user interface.

The customized cosmetic product associated with the known search key may be selected from a unique custom formulation associated with the user and a non-custom cosmetic associated with the user. The customized cosmetic product associated with the known search key may be a non-custom cosmetic selected by the user by applying a swatch of the non-custom cosmetic on the user's skin and scanning an image of the swatch on the user's skin to the system, by the user scanning the non-custom product and/or by the user scanning the non-custom product in a container.

In the method, the customized cosmetic product associated with the known search key may also be associated with a location on the complexion color map and the interactive selection on the complexion color map includes identifying a second location on the complexion color map.

The invention further includes a method for modifying a customized cosmetic product associated with a user, comprising: a. providing a system configured to be capable of specifying an initial customized cosmetic product of a user by a known search key comprised of at least one search component; b. providing an interactive user interface that allows a user to modify at least one search component in the search key to create a modified search key, wherein the user interface comprises a complexion color map having a location associated with the user and with the known search key, and wherein the user selects a new location on the complexion color map to modify at least one of the search components and create a modified search key; and c. using the modified search key to produce a modified customized cosmetic product and to determine modified manufacturing instructions associated with the modified customized cosmetic product.

In the method, the initial customized cosmetic product may be the same as a non-custom product and the known search key of the initial customized cosmetic product is the same as a search key of the non-custom product. The at least one search component may be selected from color, color variance, coverage, skin tone, skin undertone, surface quality, surface finish, dryness, oiliness, SPF, hair color, eye color, facial shape and/or pore size.

The complexion color map may include data relating to one or more of skin color, tone, and skin undertone. Each location on the complexion color map may correspond to a CIELAB color within a range of error of ±about 3 percent. Regions of the complexion color map in the method may be associated with a natural language description used as a speech user interface to specify and search for a product or for use in modifying a product. The complexion color map may be prepared using at least one two-dimensional projection of L*a*b* color data in the L*/b* plane, and wherein the L*a*b* color data is taken from a group of users having varying complexions scanned using a calibrated spectrophotometer, and a plurality of regions overlaying the two-dimensional projection are associated with varying complexions.

In the method, the system may further comprise an application that is installed on or in communication with a device having an optical sensor, wherein: the application interactively guides the user to scan an area of the user's skin to collect data on one or more skin regions of the user; wherein the application is capable of adjusting the device settings for controlled scanning of the user's skin; and wherein the data collected is used to identify a location on the complexion color map associated with the user and the initial search key.

Further, in the method, step (b) may further comprise the application interactively guiding the user to complete a new scan of the user's skin to collect updated data prior to creating the modified search key, and wherein changes in the updated data may be collected by the system and used to modify the location on the complexion color map associated with the user and the initial search key.

In the method, the initial customized cosmetic product associated with the known search key may be one of a non-custom cosmetic product and a unique custom formulation associated with the user. The initial customized cosmetic product associated with the known search key may be a non-custom cosmetic selected by the user by applying a swatch of the non-custom cosmetic on the user's skin and scanning an image of the swatch on the user's skin to the system, by the user scanning the non-custom product and/or by the user scanning the non-custom product in a container.

The customized cosmetic product associated with the known search key may also be associated with a location on the complexion color map and the interactive selection on the complexion color map may include identifying a second location on the complexion color map.

BRIEF DESCRIPTION OF THE SEVERAL VIEWS OF THE DRAWINGS

The foregoing summary, as well as the following detailed description of preferred embodiments of the invention, will be better understood when read in conjunction with the appended drawings. For the purpose of illustrating the invention, there is shown in the drawings embodiments which are presently preferred. It should be understood, however, that the invention is not limited to the precise arrangements and instrumentalities shown. In the drawings, like reference characters generally refer to the same parts throughout the different views. Further, the drawings are not necessarily to scale, with emphasis instead generally being placed upon illustrating the principles of the invention.

In the drawings:

FIGS. 10a-10b provide graphical representations of data collected from scanning of a user's face using a device having an optical scanner, wherein the data is aggregated using median sampling as described below, wherein FIG. 10a is a graphical representation of data from the L*/a* plane having the a* channel data plotted against luminance L* data and FIG. 10b is a graphical representation of data from the L*/b* plane having the b* channel data plotted against the luminance L* data;

FIG. 12 includes FIGS. 12a, 12b and 12c which are graphical representations of projections of data of FIGS. 10a, 10b and 11 as 2-dimensional connected polytopes generated through PCA, wherein FIG. 12a is a graphical representation of a projection of data of FIGS. 10a, 10b and 11 as a polytope in the L*/a* plane, FIG. 12b is a graphical representation of a projection of data of FIGS. 10a, 10b and 11 as a polytope in the L*/b* plane and FIG. 12c is a graphical representation of a projection of data of FIGS. 10a, 10b and 11 as a perspective projection in the b*/a* plane;

DETAILED DESCRIPTION OF THE INVENTION

Figure 1:
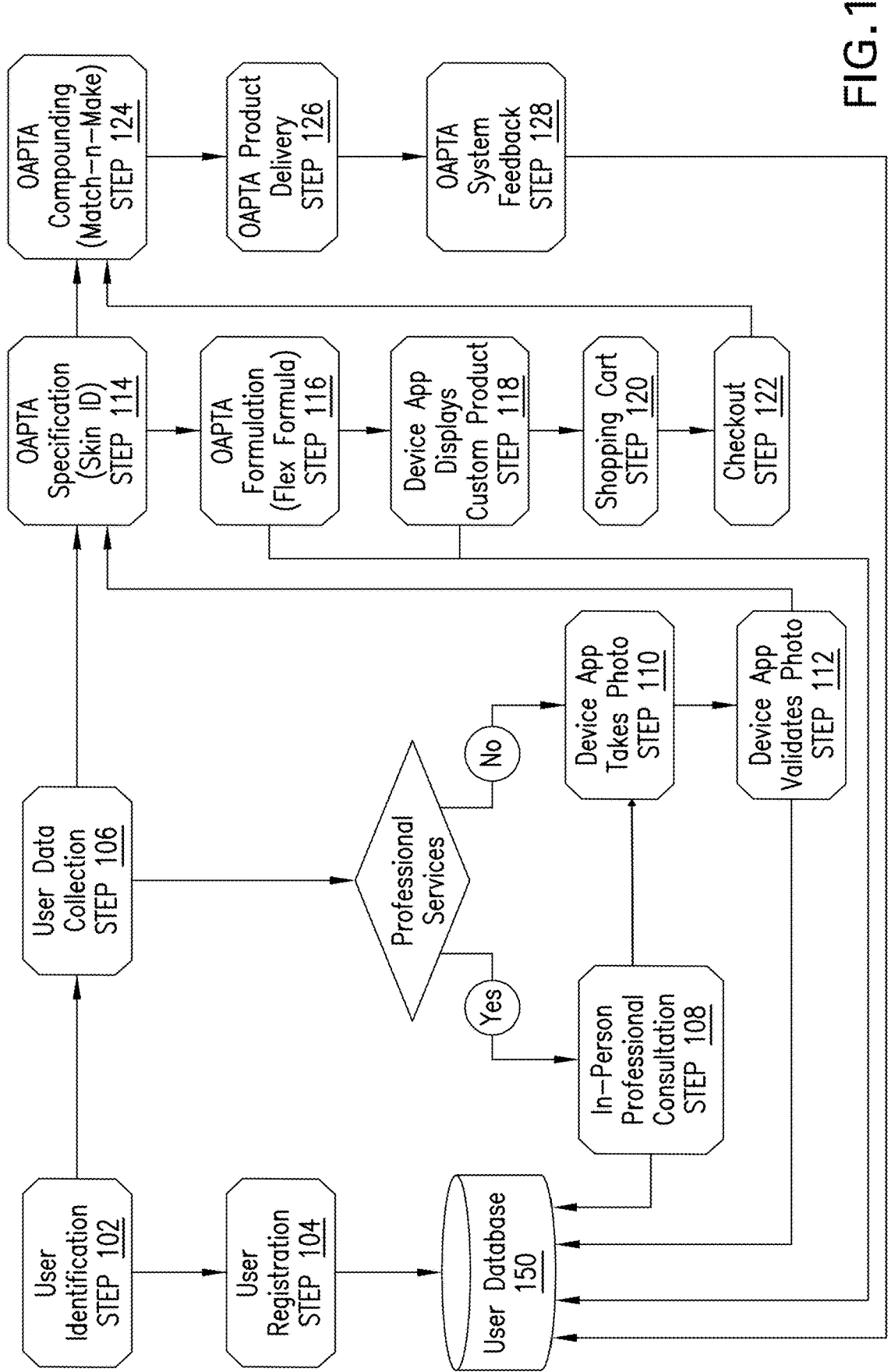
FIG. 1 is a flowchart of an example method for providing an optimized topical agent to a user that may be used by a user to create an initial user profile in the invention.
Figure 2:
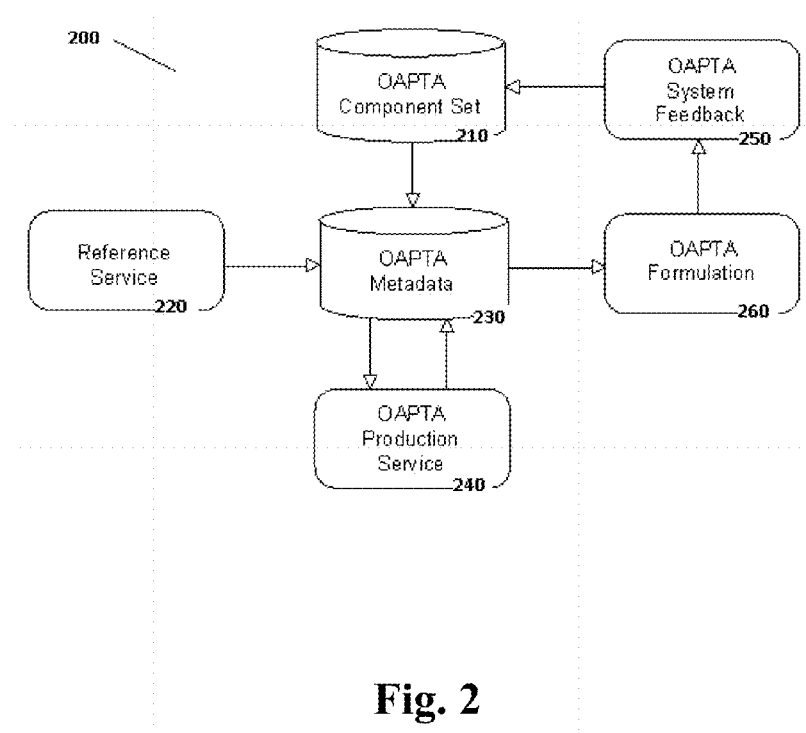
FIG. 2 is a high-level architecture diagram of an example system for providing an optimized topical agent to a user for use in the invention.

The following Description is directed to a new invention and incorporates by reference in relevant part the following patent references as they relate to the underlying systems and methods used for preparing an initial search key as part of a preferred method for creating an initial search key and for calibrating a device as well as other related steps as noted herein each of U.S. Pat. Nos. 8,933,994, 9,122,918 and 9,122,919 and co-pending Patent Application Publication No. 2018/0260871 A1. Each of these patents and the noted application is incorporated herein in its entirety to the extent relevant to the disclosure being made herein, and wherein definitions therein from those patents are used in the same manner herein unless otherwise modified herein, and wherein the text is incorporated as applicable to define the prior systems and methods therein which are useful to be employed in the present invention.

In one example of a system that may be used as described above, the customized cosmetic formulation is assembled from some number of primary components. Each of these primary components is a cosmetic that meets applicable regulatory requirements. In this embodiment, the ground truth dataset used for making an initial existing customized cosmetic formulation or that includes an existing non-custom cosmetic formulation is built from scanning and matching a set of reference users, the dataset contains records including the proportions of the primary components used to mix an initial customized cosmetic formulation for the reference user (this will be referred to in some places generally herein as the "mix"), calibrated data generated from the scans of the reference users (this is called the "key,"), and further data which may be collected from the reference users, such as a SPF, color and/or a "product finish" (i.e., the optical quality of product on the skin). The "ground truth data set" as referred to herein, includes all available reference data useful for calibration of a user's device including a collection of measurements for device calibration purposes taken from a variety of devices having image sensors useful for device calibration settings; all reference data needed for searching to establish or modify a new user search key, including reference data taken from scans of reference user subjects (which may include influencers); commercial product information; mix information (including a collection of measurements and formulations associated with one or more (or all) of the reference user subjects and/or commercial products; metadata and other unstructured data such as data not specific to a particular compound or user.

In addition to the foregoing and further data collected as described below, the ground truth data set may include, or a separate database built to include, various non-custom cosmetics having known colors as measured by the reflective color of the cosmetic in a well or other container (as opposed to being applied to the skin of a user or reference user) as well as known skin tones and undertones. This database is suitable to store a variety of complexion skin colors, tones and undertones and can be the basis of custom products that are well mapped. A swatch of each of various non-custom cosmetics in such database may also be applied on the skin, e.g., in a swatch, and the difference in the data for the non-custom cosmetic on the skin and in the well or container can then be used to assist in determining and extrapolating how the non-custom cosmetic would appear on a user or reference user's skin. Such a correction can then be used to assist in modifying a custom or non-custom product selection of a user and the information may be stored as a correction factor in the ground truth data set.

Further data can be incorporated into the ground truth data set and/or into a user's profile data by allowing a user to select a product (either an existing custom product from a prior search key or a non-custom product that the user prefers, but is not a good match on the user's skin) that the user would like to modify. The user can then apply a swatch of the product on the user's skin and take an image, such as a "selfie" using a device having an optical sensor. The color of the product on the user's skin in the photo data can be characterized, and transmitted to the system along with the user's entry of the product key (for an existing custom product) or a commercial product name or SKU. The color information for the product and SKU in the ground truth data set is then used essentially as a marker (as that term is used elsewhere herein with respect to calibration and the like) to allow the system to determine accurate skin color, tone and/or undertone of the user, based on the image of the user's skin having the swatch applied. The existing custom formulation, or a modified formulation of a non-custom product may then be adjusted to accommodate the user's actual skin color, tone and/or undertone thereby providing a modified formulation and associated modified search key.

Similar data collected from calibrated data of individual users of the system is then used to match that user's data to the closest known match in the ground truth data set. Each user accessing the system would have that user's own "search key," which includes information similar to the keys for reference users saved in the ground truth dataset. The search key for each user includes, at least one search component, which may be, but is not limited to color information, color variation, surface quality (smoothness, roughness), surface finish (such as matte, shiny or glossy), amount of skin dryness, oiliness, pore size, face shape, hair color, eye color and other color variations and amount of coverage needed and once located will be associated with a specific mix for the user that is linked to the user's search key.

As used herein, the user's search key may include an initial customized cosmetic formulation associated with the user. The initial customized cosmetic formulation may be a unique formulation matched to the user's input data from the components in the ground truth data set or may be a non-custom product having characteristics in the ground truth data set that create a best match to the user. The user key may also initially include a non-custom cosmetic identified by the user either through user input in an initial data collection or by scanning a product or swatch of the product on the user's skin. In the case of a user requested modification to a commercial product, the initial customized product is the chosen non-custom product, and a modified product may include a new unique formulation based on the chosen non-custom product or a different non-custom product that matches the desired modification criteria provided through the interactive interface by the user and/or based on a user's updated scan data as described further herein.

In one embodiment, an algorithm is used to search the ground truth dataset of reference user and other relevant data, to find a mix, reference user key or commercial product match using a user's search key. The algorithm is selected to perform at least the following steps: (a) it traverses entries in the ground truth dataset and finds the reference user or commercial product record whose key is closest to the search key; (b) it finds those records that are nearby, and assembles them into a set called a neighborhood; (c) it solves for the contributions from each entry in the neighborhood that best matches the search key; and (d) it uses the found contributions to calculate the mix formula, which is then associated with the search key of the user.

The preferred steps to produce the customized cosmetic formulation for a given search key include: using the algorithm to find the mix formula for the search key; using the mix formula to dispense the primary components into a container; using at least two methods to verify the quantity dispensed, such as a manual operator check, a verification by an automated process using weight, and/or a verification by an automated process using volume; and blending the mixture in the container.

In such an embodiment, at the outset, the user has to create an initial customized cosmetic formulation, which steps may include providing initial feedback to the system by identifying an existing non-custom product being used, various user preferences and other user data as described in detail below that may be incorporated into the search key along with the calibrated scan data. The same steps used for creating the initial customized cosmetic formulation may also be used if the user wants to create a new and separate formulation or wishes to modify the formulation after creating the initial customized cosmetic formulation. As described in the patents and patent application noted above that are specifically incorporated herein by reference, the user will initially have to run an interactively guided scan which may be done in several different ways. In one method, a user is preferably guided interactively through a set of steps to produce a customized cosmetic product. For example, the user scans herself or himself using a mobile device and an application acts to interactively guide the user to scan areas of the user's face. In the scan process, a user is guided to capture at least one image of a skin region with known lighting and color characteristics. That image is processed to provide calibrated skin information, such as skin color information. The system then automatically determines a customized cosmetic formulation for the user based on the calibrated skin information. The system may also be used to modify or adjust a customized cosmetic formulation (even if the customized cosmetic formulation initially selected matched to an existing non-custom product), for use based on the calibrated skin information.

A skin region image is preferably received from a device having an image sensor, and more preferably an image sensor and light source, and the user can be interactively guided through capture of a plurality of skin region images such as facial regions using the device image sensor and/or light source. An "image sensor" may be any image sensor such as a device having a CCD Array to sense light photons and a lens to project an image, software and an image processor, although any suitable image sensor capable of carrying out the functions herein may be used.

Another way of initially carrying out a scan for creating a customized cosmetic formulation, as described in the patents noted above, includes interactively guiding the user through capture of an image of a marker using the device image sensor, and the skin region image is processed based at least in part on the captured marker image. The device used in these scanning and/or image capture steps can be one or more of a mobile phone, a tablet, a digital camera, a webcam, smart glasses, a television, virtual reality goggles, a gaming console, or home assistants (such as Alexa™ or Google® Home™), which preferably have camera and light sensor requirements, and more preferably a light source. The skin region image can include embedded data identifying properties of at least one of the device and the image sensor and the skin region image can be processed based at least in part on the embedded data, which may be included into the search key. The marker used for calibration may be a variety of things, for example, a previously analyzed skin region (or data taken from a variety of samples of skin regions of users), a marker of known size on a white background, or marker that is a white sheet of paper of known size, such as a typical sheet 8.5 inch×11 inch sheet of white paper, or a pre-set marker field displayed by the software from the device (such as a simple marker displayed, e.g., as a white rectangle). The marker should have a known reflectance and color, although the size or standardized reflectance and color could be varied.

A sheet of paper having known color, reflectance and size can be used to calibrate the device and its settings, for example to adjust the settings of the camera on a mobile smart phone. Thus, the white sheet of paper acts as a white field and a marker. The user places the paper on a white surface and then proceeds as instructed interactively to calibrate the device.

In calibrating the device or in completing a scan, the user preferably touches the device to a calibration surface, which may be a marker or a skin region (that is, a marker surface is the surface of whatever is used as a basis for calibration). A calibration surface is preferably flat or reasonable flat, but could be any suitable calibration surface. Each touch is considered a "tap." Each movement towards the surface of the marker or skin region to tap and each motion back away from the surface is a single "pass". A complete touch process or "tap" includes two passes and the touch to the surface. The device should be moved so that at least 90% of the image sensor's field of view (i.e., the image area of the CCD) is covered by the marker (such as a white paper or other marker), i.e., there is a sufficient amount of the marker projected in the image plane. During a tap of about 1 second, about thirty images/second may be recorded and the brightest frame is selected. The data may be analyzed by Histogram by brightness and the pixels are analyzed for brightness, shininess and other property differences. Each pass gives a sample of data for analysis.

The user is preferably directed through this process using the application and either video, photos, voice commands or other prompts to perform the tapping. Each scan is evaluated by the application and is composed of at least 5 taps (providing 10 samples during each pass) and sometimes more. After 5 samples are taken, new samples are compared with other samples to perform a running median filter. The filter encourages the collection of samples that fall in the median by discarding those samples that are too light or too dark as compared with the median of the existing samples. Samples that are too distant in color are also discarded. If too many samples are out of calibration range, the application software will ask the user to perform the first step again and begin or continue tapping. The software will continue the scan process until enough valid samples are collected or until the process fails. Users may leave scanning at any time.

Should calibration fail for some reason (such as for poor device performance), the application may instruct the user to continue to tap to try for better data, and will re-set the device to try again, however, if that continues to fail, a customer service contact information option may be provided.

One preferred method of running a scan is described herein. For recording accurate, and reproducible color (that may be repeated), the application software is set to control the exposure of the camera, the amount of light used to measure the surface of the user's skin, and the angle and distance of the camera from the surface of the skin. The software effectively "re-purposes" the device's characteristics for running the scan and further directs user actions.

Each device has an image sensor (camera) and preferably a light source, such as an LED torch. In such a device, the separation of the LED torch and camera, as in a typical mobile smart phone, and its relation to a flat surface to be measured describes a geometry such that there is a single distance from the camera to the target where illumination is brightest. To place the phone at that point, the software will interactively guide the user to make a pass to touch the surface to be measured. As the phone moves towards the surface, the software analyzes each video frame from the camera and finds the time at which the specific region of the image is brightest. This is a known distance from the surface. The surface may be a simple calibration marker as described herein and/or a region of the skin to be measured.

As noted elsewhere herein, a marker may be a piece of white paper with known reflectance and known size (such as white 8.5×11" copy paper of Euro brightness 104) for consistency in size and reflectance as well as widely known use and availability. The use then makes multiple passes ("taps") to measure the surface. Measurements are taken with each pass to and from the surface in the tap. The data is gathered during the tapping and the software may find the specular reflection of the LED torch in the surface of the skin and measure shininess of the surface. It may also be pulled back until the camera focuses on an area of skin and record a micrograph of the skin.

In another embodiment, the user may use a front-facing camera (such as the front camera of the user's mobile phone), and the exposure is determined. The camera is then set to a known ISO sensitivity, a known aperture, a known shutter speed (exposure) and known white balance. The camera may also interact with the software to be set automatically to determine the exposure and the device using exposure settings are automatically and continuously read to supply the values for ISO sensitivity, aperture, shutter speed and white balance. As noted above, the software may use text, picture(s) and voice command(s) and prompts to have the user properly hold and position the camera or mobile device with a camera. The following is described in terms of a mobile phone, but one skilled in the art would understand that such embodiments as are described herein can be carried out on any suitable device as described in this specification. The user may be instructed to hold the phone up to a mirror in one embodiment herein and to display the camera towards the mirror (with or without the user in the image). The software can then display its own marker in the form of a bright marker field, such as a white rectangle. The phone may also be held up to a marker as described above display side facing the marker (such as a common object or white paper with known size and reflectance as noted herein above).

The software then displays a bright illumination field using the display and the software recognizes the marker, recording an image of the marker. The marker and exposure settings are then used to calibrate the phone. Once calibrated, it is within the scope of the invention to have the phone save the calibration information for future scans. It should be appreciated by those skilled in the art based on this disclosure that the camera can be the image sensor and its phone display the primary light source, which is used to determine camera settings that are calibrated to the white point and brightness of the display illuminant.

In addition to the mirror calibration noted above, a user may calibrate the camera or other optical device by using the light of the front display of the camera itself to complete a scan of the user, e.g., a "selfie" scan. In proceeding in this manner, a known color would be displayed by the application on the display screen of the device, and the phone held up to a mirror while an image is taken of the known color on the device and using the illumination of the device display. That information from the image, which may include any or all of the camera and image data noted elsewhere herein, to process the image and allow the image to calibrate the camera by identifying how the camera views the image of the known color illuminated on the display screen of the device. Thus, an image of a phone in a mirror may be used to calibrate and also measure ambient light for allowing the application to adjust the color in that setting using the techniques described herein.

Another way of creating a customized cosmetic formulation can include matching the calibrated skin color information to a reference user, the reference user having a previously determined cosmetic formulation associated therewith.

The automatic determination of the customized cosmetic formulation can be based at least in part also on user input information, for example, on an indication by the user of an allergy to a cosmetic ingredient, which information can be included in the search key for that user. A topical agent based on the customized cosmetic formulation can be compounded and delivered to the user. The user can be allowed to purchase a topical agent compounded based on the customized cosmetic formulation.

A user search key as noted herein (which is associated with a user's customized cosmetic formulation) may be associated with an existing non-custom cosmetic product that the system selected as a best match when creating an initial customized cosmetic formulation or an initial custom formulation. It may also include a non-custom product selected by a user. The search key may also include an initial customized cosmetic formulation and/or non-custom product selected by a user, that is associated with the user but that was adjusted and modified based on the user's customized cosmetic formulation. The user may thus provide as user initial information (user data collection) its own information to develop the initial customized cosmetic which is associated with the user's search key. The user may also provide product preferences as feedback to the user's profile for use in creating and/or modifying or adjusting an initial customized cosmetic formulation as described herein.

The user may further perform a transaction to order the product. The data collected from the scan (scan information) is also communicated to a server. The system used in the above-noted methods for creating an initial customized cosmetic formulation includes at least one computer that includes a memory for storing computer-executable instructions and a processing unit for executing the instructions stored in the memory. The execution of the instructions configures the computer to perform operations including guiding a user to capture one or more image(s) of at least one skin region with known lighting and color characteristics.

The image is processed to provide calibrated skin color information, and the system automatically determines a customized cosmetic formulation for the user based on the calibrated skin color information. The skin region image(s) can be received from a device having an image sensor, and preferably also a light source, and the operations can further include interactively guiding the user through capture of a plurality of skin region images, such as facial regions using the device image sensor as noted above.

In the MATCHCo. application developed based on the patents incorporated herein by reference, a preferred interactive scanning is carried out using known lighting which is identified by using a device that preferably has a lighting source as well as an image sensor, such as a mobile phone with an LED torch or display as a source of illumination, and having known color characteristics. The lighting and color on the skin is further controlled by using the geometry created between the device's position with respect to the surface of the skin and the light source position to determine the distance of the device from the surface of the skin. This is done by interactively guiding the user through a series of actions for each facial region. The user is asked to move the device toward and away from a given facial region, i.e., by making a pass including a "tap," and the distance is detected using the brightest point of illumination of the skin by the light source. For example, the application will run and prompt the user to turn on the device's light source (such as to turn on the LED torch of a mobile smart phone), use software commands to turn on the light source of the device such as the LED torch automatically, or use software commands to operate and use the device's display as a light source, and to move the device towards a particular skin region and away from that region until the brightest point of illumination is recorded through a series of interactive steps. This data is then used to capture calibrated skin color information.

The methods and systems noted above may also have operations that further include interactively guiding the user through capture of an image of a marker using the device image sensor (or displaying a marker from the display of the mobile device), and the skin region image is processed based at least in part on the captured marker image. The device may be any of those noted above. The skin region image may include embedded data identifying properties of at least one of the device and the image sensor, and the skin region image can be processed based at least in part on the embedded data.

One of the operations carried out in the method and using the system may also include automatically determining the customized cosmetic formulation by matching the calibrated skin color information and/or other information in a user's search key to a reference user, the reference user having a previously determined cosmetic formulation associated therewith. The customized cosmetic formulation may also be automatically determined based, at least in part, on an indication by the user of an allergy to a cosmetic (or other user preference which may be incorporated into the user's search key) so that the operations carried out can further include allowing the user to purchase a customized cosmetic formulation that accommodates those preferences (omitting an ingredient for example).

The user scan may also be carried out in a method for determining a customized cosmetic formulation that includes interactively guiding a user through capture of one or more images using a device having an image sensor and preferably also a light source, wherein each image comprises a skin region of the user, processing the skin region images to provide calibrated skin color information, comparing the calibrated skin color information to a ground truth data set to identify a set of closest known values in the ground truth data set, and automatically determining a customized cosmetic formulation for the user based on the comparison. The customized cosmetic formulation includes at least one of (i) a unique customized cosmetic formulation that is derived based on a relative proximity of the calibrated skin color information to the set of closest known values and (ii) an existing non-customized cosmetic product. The calibrated skin color information may also be used to identify a location on a complexion color map prepared in accordance with one embodiment herein. The complexion color map may also be used by the user to modify the location on the complexion color map for a different selection, and that information may further be incorporated in the user's search key.

The operations carried out by the systems and methods may include processing the skin region images to include, for at least one of the skin region images: detecting a plurality of facial regions in the at least one skin region image, by various means including by using facial recognition and/or feature detection software, segmenting the facial regions based on skin tone, and assigning a color to each facial region segment based on at least one of skin tone, shadow and specular highlight. One such facial feature detection software that may be implemented for this purpose is described in U.S. Patent Application Publication No. 2017/0076474A1 and available from Giaran, Inc. Other known facial recognition and/or feature detection software may also be employed for this purpose.

In carrying out the various methods and systems herein that involve scanning the user's data, the skin region(s) to be scanned are preferably one or more, or all of, an underside of a wrist, a forehead, a right cheek, a left cheek, a right jaw, a left jaw and/or optionally a full face, although other areas may also be used depending on how the system is designed for optimal use.

The methods and systems may further include allowing the user to purchase an existing cosmetic product based on (i) an initial customized cosmetic product (i.e., one that is based on a unique customized cosmetic formulation or a matched existing non-custom product) or (ii) based on a separate, new customized cosmetic product or a new, modified customized cosmetic product, each of which is based on an initial customized cosmetic product.

A customized cosmetic formulation may also be determined using a system that includes at least one computer that itself includes a memory for storing computer-executable instructions and a processing unit for executing the instructions stored in the memory. The execution of the instructions configures the computer to perform operations including interactively guiding a user through capture of one or more images using a device having an image sensor, and optionally a light source, wherein each image comprises a skin region of the user; processing the skin region images to provide calibrated skin information; comparing the calibrated skin information to a ground truth data set to identify a set of closest known values in the ground truth data set; and automatically determining a customized cosmetic formulation for the user based on the comparison. The customized cosmetic formulation may include at least one of (i) a unique compound of a customized cosmetic formulation that is derived based on a relative proximity of the calibrated skin information to the set of closest known values; (ii) a match to an existing cosmetic product; or (iii) a customized cosmetic formulation that is derived based on a modification of a unique customized cosmetic formulation or existing cosmetic product. The data included in the ground truth data set, as noted above, may also include, among other things, data based on the attributes of commercial products and/or data from a separate commercial product data set.

Such customized cosmetic formulations and modifications of such customized cosmetic formulations, existing commercial products and modifications of commercial products may be input to a user using a 2-dimensional color map for selection or modification of a product formulation, wherein one dimension of the color map relates to a user's skin tone (i.e., measurements from light to dark), while the other dimension relates to the user's skin undertones (i.e., measurements from cool to warm).

The skin region images used above can be processed so as to include the steps of, for at least one of the skin region images: detecting a plurality of facial regions in the at least one skin region image and segmenting the facial regions based on skin tone; and assigning a color to each facial region segment based on at least one of skin tone, skin undertone, shadow, and specular highlight.

Ambient lighting information associated with at least one of the skin region images may also be received, and the at least one skin region image can be processed based at least in part on the ambient lighting information. Such image processing may include use of facial recognition and/or facial feature detection software to process the ambient lighting information to remove ambient lighting to correct the color to one true to the calibrated settings.

The system and methods herein may also further include the steps of interactively guiding the user through capture of an image of a marker using the device image sensor and optionally a light source on the device, and then processing the skin region images based at least in part on the marker image. The current settings of the device image sensor can be stored based on a successful capture of the marker image. The device image sensor settings can include, among other things, aperture, exposure or shutter speed, exposure time, focus, ISO sensitivity, and/or white balance. The skin region images can be processed based on the stored image sensor settings. Processing the skin region images can include compensating for unknown light sources.

The scanning of the user may also be done using a method of capturing accurate color of an object using a device having an image sensor, and optionally a light source, that includes calibrating a plurality of settings of the device using a marker having a known size and/or a known color (as described above); measuring a color of each of a plurality of surfaces of the object; determining a surface reflectance of the object based on the measured colors; and determining a surface color variation of the object based on the calibrated settings, the measured surface colors, and the surface reflectance of the object. The plurality of surfaces can include regions of skin, and the device and marker may be as described above.

The device may be calibrated by, for example, directing a user to place the marker on a substantially white field. Calibrating the device can then include setting, based on a captured image of the substantially white field, at least one of aperture, sensitivity (based on ISO unit for measuring sensitivity), exposure time, exposure and/or white balance of the device. Calibrating the device can also include setting a light associated with the device image sensor, such as a mobile phone LED torch or display, to a known brightness and temperature (using the Kelvin scale). This allows for control of the white balance, color and temperature of the light source, and allows for setting of the exposure of the device image sensor, e.g., in the case of a mobile smart phone, the camera's exposure is adjusted. Calibrating the device may also include interactively guiding a user to position the device image sensor at a specific distance from a surface of the marker. Calibrating the device may also further include, upon the positioning of the device image sensor at the specific distance from the surface of the marker, locking at least one of the settings of the device. Calibrating the device may also further include software on the device displaying a bright marker field such as a white rectangle when held up to a mirror with the display side facing the mirror or holding the device up to a marker with the display side facing the marker. The settings of the device can be automatic exposure, shutter speed, exposure time, ISO sensitivity, aperture, automatic focus, and/or automatic white balance, or the temperature and/or brightness of the light source. The locked settings of the device can be applied while measuring the color of each of the surfaces of the object.

In device calibration in one embodiment, using a mobile smart phone camera having an LED torch and illuminated display, each such device is manufactured with a high degree of quality control, and so individual devices of a similar model perform similarly. However, each model has a different set of capabilities and components, such that there are large differences in illumination and exposure characteristics from one model to another. Each model has a particular CCD component. Different CCD components have a different response to light. Each model has a different LED array illuminant component, each LED component produces different light spectra. Further each model may have a specific version of operating system software that acquires the image and adjusts the illumination. For each model of phone and for each major operating system version, it is necessary to have a method of calibrating the response of the camera to the LED illuminant. This is done to build calibration data for various devices into the ground truth data set. As new devices are developed they are then evaluated and used to build the ground truth data set information. Calibration of phones are done to build the reference data necessary for drawing upon when each user completes a scan. For each type of phone and model, such settings are already incorporated for reference users in a reference data set. When a user then uses their own CCD device, the scan pulls the white point for the phone and the skin color and compares it against the ground truth data set reference data for the type and model of the phone. The calibration then makes minor adjustments to the settings of the user's phone, and saves and stores that data for the user's phone in the user's search key when the user uses the application. Updated scans operate in the same manner and allow for minor adjustments if necessary when compared to updated information in the ground truth dataset.

One embodiment of calibration of the system is that it calibrates the response of the CCD to the light separately from its specific response to skin color. The CCD's response to the LED torch's illumination (or display illumination) is performed by using a scanning method as described above (using a calibration surface and tapping) to measure a set of known gray reflectance targets. The targets are manufactured so that their reflectance is known and represent even steps from high to low diffuse reflectance. The response curve of the system is determined using this data. The same process is run against a calibration marker and then a set of targets representing skin tones. The targets may be manufactured to represent the reflectance of skin, or may be an area of a test subject's skin with a known measurement. The targets are chosen to represent a wide range of skin tones and color and are used to build the ground truth data set reference information.

A color calibration response for each device is then built by transforming each device skin measure for linearity using the gray scale response curve. The response of each color is then calibrated to a white point using the calibration marker as a reference. A transform is then built for each device by mapping its adjusted color response to the known measure from the targets. The resulting device calibration may be stored on the OAPTA service process server accessible to the application and also becomes part of the reference ground truth data set. It need only be updated if there is a change in the imaging software for the device or to include a new device.

A color of a surface of the object may be measured by directing a user to place the marker in proximity to the surface of the object. Measuring a color of a surface of the object may also include interactively guiding a user to position the device image sensor and the object relative to one another to match a calibration target. The interactive guidance can include voice and/or video direction and other user cues such as vibration or sound feedback (ping tones, etc.) to let the user know that another step is needed, such as a cue that the user has drawn the device far enough from the surface to gives the best data. Measuring a color of a surface of the object can further include, upon positioning of the device image sensor at a specific distance from the marker, capturing a color of the surface of the object. Determining the surface reflectance of the object may also include transforming the captured color to a surface reflectance of the object.

A system that may be used for the for capturing of accurate color of an object for use in the methods and systems herein includes at least one computer that itself includes a memory for storing computer-executable instructions and a processing unit for executing the instructions stored in the memory. The execution of the instructions configures the computer to perform operations including calibrating a plurality of settings of a device (which can have an image sensor and/or preferably a light source) using a marker having a known size; measuring a color of each of a plurality of surfaces of the object; determining a surface reflectance of the object based on the measured colors; and determining a surface color variation of the object based on the calibrated settings, the measured surface colors, and the surface reflectance of the object. The plurality of surfaces can include regions of skin as noted above, and the device can be those mentioned above. The marker can further have a known reflectance. In its simplest form and usage, as noted herein, the marker can be a white sheet of paper with known size and known reflectance.

Calibrating the device may include directing a user to place a marker on a substantially white field (or using a white sheet of paper as a marker having a substantially white field). Calibrating the device can also include setting, based on a captured image of the substantially white field, at least one of aperture, sensitivity, exposure, exposure time, and white balance of the device. Calibrating the device can also include setting a light associated with the device image sensor to a known brightness and temperature. Further, calibrating the device can include interactively guiding a user to position the device image sensor at a specific distance from a surface of a marker. In so doing, the user will reach a point by user device interaction (a Haptic interface) wherein the device vibrates or gives another cue to the user that the device has reached its preferred distance for achieving the optimal light source brightness and focus to give the best user data collection. Moreover, calibrating the device can include, upon positioning of the device image sensor at the specific distance from the surface of the marker, locking at least one of the settings of the device. The settings of the device can be automatic exposure, automatic focus, exposure time, sensitivity and/or automatic white balance. The locked settings of the device can be applied while measuring the color of each of the surfaces of the object.

In another embodiment, the device is calibrated by selecting the front camera (display side camera) of the device and determining the camera exposure. This may be done by (i) setting the camera to a known exposure in terms of a specific ISO sensitivity, aperture, shutter speed, white balance, brightness, temperature, etc. (with parameters chosen in accordance with the specific device application program) or by setting the camera to automatically determine the exposure. In the latter case, the exposure settings are continuously read supplying values for the ISO sensitivity, aperture, shutter speed, white balance, etc. Once the exposure is determined (or set), the software will interactively direct the user by text, picture, video and/or voice on how to hold and position the phone.

As noted above, the display side of the device is held up to a mirror. The user may or may not be visible in the image in the mirror. The software may direct the device to display a marker as an illuminated bright marker field as noted above. Alternatively, the device may be held with its display side facing a marker as described above such as a common object of known size and reflectance (like a piece of white paper, etc.), and the software will direct the device to display a bright illumination field. As noted above, once the device is calibrated, the settings may be saved for subsequent scans or use, added to a user's search key and/or incorporated in the reference data in the ground truth data set.

After the software recognizes the marker, it records the image of the marker and the marker image and exposure data are used to calibrate the device. As noted above, while different devices with separate illumination sources can be used with a device having a camera and its own illumination source (such as a mobile phone) is used, the camera is the image sensor, and the device display provides the primary light source, such that the image may be used to determine camera settings calibrated to the white point, brightness and temperature of the display illuminant.

Measuring a color of a surface of the object may include directing a user to place the marker in proximity to the surface of the object. Measuring a color of a surface of the object can also include interactively guiding a user to position the device image sensor and the object relative to one another to match a calibration target. The interactive guidance can include voice direction and/or optionally video direction and/or user feedback such as vibration and/or a notification sound. Measuring a color of a surface of the object can further include, upon a positioning of the device image sensor at a specific distance from the marker, capturing a color of the surface of the object. Determining the surface reflectance of the object may include transforming the captured color to a surface reflectance of the object.

For each scan area, the information should include: color information, the amount of specular reflection; and color variation and other information as noted above. User data collection may also include user feedback information (such as to leave out or add specific ingredients). This user data collection information is then encoded into a search key as described above. The key may be associated with the user for future orders. An algorithm then performs a search on continuous n-space using the key, and returns the mix formula. The mix values are attached to the transaction. A production system is selected for the order, and the order is produced. The produced order is sent to the customer.

When the user receives the product and evaluates it, in some cases, the user may wish to change or modify the product and re-order it. To do so, the user may then follow a set of steps to modify the product. This modification of the product is an extension of the creation of a basis to provide reference OAPTA feedback. In creating the original OAPTA, the user may use various methods and systems described in the patents incorporated herein by reference above, and the various implementations of such systems and methods for specifying and formulating topical agents that are optimized for the characteristics of particular individuals using, for example, image analysis techniques applied to photographs taken with mobile phones, tablets, webcams, digital cameras, gaming consoles, televisions, virtual reality goggles, smart glasses, home assistants (such as Alexa™ or Google® Home™), which preferably have camera and light sensor requirements, and other consumer or professional devices that have an image sensor and more preferably a light source.

Optimized Aesthetic and/or Protective Topical Agent

In one implementation, a system is provided that generates a specification for a customized topical agent, referred to herein as the "Optimized Aesthetic and/or Protective Topical Agent," abbreviated herein as "OAPTA." The OAPTA is formulated for the needs and characteristics of a specific individual client, referred to throughout, absent an express direction otherwise, as the "user." The OAPTA can include a set of possible components. The set can be large enough to meet most needs of a given user. In some instances, only a small number of components are used in a specific formulation of an OAPTA for a user. The OAPTA may be created to be various types of cosmetics used on the skin for either aesthetic, coverage and/or protective purposes such as foundation, various forms of make-up, skin care, sun care and other color cosmetic formulations and personal care products and should not be considered to be limiting. Therefore the application can be any customized cosmetic formulation, however, for shorthand purposes, the applicants will refer to all such customized cosmetic formulations collectively also as OAPTA. The components of the OAPTA (an OAPTA component set) can include, but are not limited to:

Topical bases, water, solvents, emulsions, gels, gums;
Moisture and humectant agents;
Ultraviolet (UV) filtering and/or sun screen active agents;
Opacity (hiding) agents;
Color control agents;
Reflectance (shine, matte, opalescence) control agents;
Anti-inflammatory agents (e.g., aloe, etc.);
Protective agents (e.g., vitamin E, etc.);
Colorants and/or dyes;
Thickeners and/or rheology agents;
Buffers and other pH adjusting agents or neutralizing agents;
Organic additives and/or fragrances; and
Preservatives and anti-fungal or anti-microbial agents The user may use a mobile device, computer or other related device as noted above. The device preferably has an ability to run an application and/or download an application, and preferably has a user interface for modifying and/or proactively requesting a separate new OAPTA after an initial OAPTA is formulated into a product. The user may login and select an order, or enter the order number. The user may log into the application through social media applications or another on-line service provider. Such social media or other on-line service provider log-in sources may provide additional data about the user to the application herein, including user personal data, preferences, product or brand affinity, products previously purchased, celebrities and influencers the user "follows," and other purchasing profile data which additional data about the user may be used to construct a new user search key or to modify a user's existing search key as such additional data changes over time. Data taken from a user's initial scan or scan for the purpose of modifying a product, including, e.g., skin tone, color and/or skin undertone, can be incorporated as search data criteria along with other user data in the user's search key components, such that when interacting in social media, the application may direct the user to a search of such social media or other reference databases in communication with the ground truth dataset and systems herein to select for prioritized evaluation images of reference users, users in the ground truth dataset or images of non-reference users on social media who demonstrate similar facial characteristics, complexion issues, skin color, skin tone, skin undertone, face shape, hair color and/or eye color to allow the user to review an overall look or makeup look that the user would like to try on, or use to modify an existing search key for a makeup component thereby using information from the user's scan for calibration and/or for preparing an initial search key or modified search key as input to a search metric for further social interactions on the application or linked social media, which can then be used for further interactions if desired to modify or request a custom formulation for the user based on the user's feedback from reviewing similar images of users on the application or on social media.

If not creating an initial OAPTA, and a user chooses to modify and/or create a new OAPTA, the user is preferably presented with an interface to modify the order. However, it should be understood that variations of the system could involve use of a voice-only device having voice command actions through user-assisted voice or word prompts which can incorporate access to a user help service if needed.

Referring to FIG. 1, in one example, an initial OAPTA is provided to the user using the following high-level steps. For the sake of brevity and clarity, the aggregation of all the steps to provide an OAPTA to a user will be referred to as a "service" herein. In Step 102, the user is identified using, for example, a user name and password that provides access to the present system. Other log-in methods and/or security steps may, of course, be implemented, including log-in confirmation identifiers (such as text confirmation numbers, photo identifiers, finger print, retina security), log-on through other linked applications (social media or on-line providers as noted above) and the like. In the case that the user has not previously used the system, the user can proceed to registration to set up a new account (Step 104) and/or link the account to an existing application such as Facebook®, YouTube®, Instagram®, and the like. The user's details (e.g., name, address, etc.) can then be stored in user database 150. Once the user is identified by the system (e.g., logged in), data can be collected (Step 106) to determine the user's needs and preferences (e.g., allow the user to indicate desired cosmetics, indicate preferred brands or products previously used, allow the user to specify any allergies, capture skin imagery, and so on). The interface may optionally provide prompts to the user to complete an initial survey and question and answer prompts can assist in providing the desired data. The data collection step can also be optionally performed using a professional service, such as an in-person professional consultation (Step 108) or, alternatively, and preferably can be performed by users themselves by taking a photograph using an application on a consumer device (e.g., a mobile phone, tablet, digital camera, or other device as noted herein) (Step 110), which will then automatically validate the photograph for color accuracy, quality, and other properties (Step 112). Information captured by the professional service and/or the device application can be stored in the user database 150 for later reference and reuse.

Following data collection (or reference to previously collected data), Step 114 provides for the OAPTA specification, in which the components of the OAPTA are specified using components such as those described above. In Step 116, based on the OAPTA specification, the instructions to formulate and/or manufacture the OAPTA are generated. If the user is using an application to generate the OAPTA, the application can display the custom product to be created (Step 118), and allow the user to place the product in a shopping cart (Step 120) and purchase it (Step 122). The generated formulation instructions can then be used to compound the OAPTA or select a premade OAPTA that matches the formula (Step 124). The OAPTA can then be delivered to the user (Step 126), and feedback can optionally be collected to determine if the User's need(s) were met (STEP 128).

OAPTA System

In one implementation, the system 200 that provides the OAPTA to users is made up of a set of components and services. The system 200 can include a shared OAPTA component set 210, such as that described above, for use by the various OAPTA services in the system 200. At least one OAPTA reference service 220 can facilitate the creation of an OAPTA for a collection of reference uses and the assembly of OAPTA metadata 230. The OAPTA reference service 220 collects user data in the same manner as the OAPTA production service 240, and can collect additional user data to formulate an optimal initial OAPTA specification.

The OAPTA Metadata 230 is the assembly of user data collected from an OAPTA reference service 220 in a form that allows for the mapping of user data collected from the OAPTA production service 240 to the OAPTA specifications generated by the OAPTA reference service 220. At least one OAPTA production service 240 provides for the creation of the OAPTA specification using the OAPTA metadata 230 generated by at least one OAPTA reference service 220.

OAPTA system feedback 250 provides for the collection of OAPTA feedback from at least one OAPTA reference service 220 and at least one OAPTA production service 240, in order to modify or change an OAPTA component set 210 and/or modify the specification, formulation and/or compounding 260 of the OAPTA production service 240.

Shared OAPTA Component Set

The shared OAPTA component set 210 can be specified as described below; yet it is to be appreciated that the shared OAPTA component set 210 can be specified in various suitable manners that function similarly within the OAPTA system described herein. A group composed of a dermatologist, an esthetician, and a cosmetic colorist is referred to herein as an example of an "OAPTA professional group." In one implementation, the shared OAPTA component set 210 is specified by an OAPTA professional group. The shared OAPTA component set 210 can be specified first as a full set, and then as a set of connections indicating those components that can be used with one another. For instance, a set of colorants can be specified as only usable with a specific topical base, or a group of components that work together to provide more opacity can be indicated as most effective when used together. Similarly, groups of those items which are best for users with certain allergies or skin conditions can be identified and tagged.

This initial mapping of components provides data for the specification method of the OAPTA production service 240, and will be referred to herein as "specification hints." In one embodiment herein, the specification hints are represented as a non-directed graph, which is converted to a set of minimum spanning trees. It is to be appreciated that it is faster to traverse a minimum spanning tree to discover which components can be used together, rather than evaluating a non-directed graph. After this conversion, a single item in the shared OAPTA component set 210 can be referenced by multiple spanning trees which compose the specification hints. After initial creation, the specification hints can be updated or discovered by OAPTA system feedback 250, as well as modified by the OAPTA professional group.

OAPTA Reference Service

The OAPTA reference service 220 can be constructed after the shared OAPTA component set 210 is specified. The OAPTA reference service 220 produces the OAPTA metadata 230 needed to construct the OAPTA production service 240. In one example embodiment, the OAPTA reference service 220 is configured as a professional service. In another implementation, the OAPTA reference service 220 is configured as an online business and a retail store. The implementation of the OAPTA reference service 220 as a professional service is used as an example in the description below.

Reference User Identity

As a professional service, the OAPTA reference service 220 can use best practices for managing a user identity. In addition to this, it can also implement a privacy policy and information use policy that allows the reference service 220 to collect and store user data in a form that is anonymous and does not identify the user, and that can be used to build OAPTA metadata 230. Agreements can also be made, based on some consideration, for the data to be used by the OAPTA system 200 so that a user of the production component of the system 200 can identify a specific reference user (such as a celebrity) that has a similar OAPTA product need.

Reference User Data Collection

The OAPTA reference service 220 can use the same data collection as the OAPTA production service 240. In addition, this data can be augmented with data collection methods as specified by the OAPTA professional group.

Common Service Data Collection

In one embodiment, the service data collection uses an application on a set of mobile devices that have similar features and are manufactured in a manner to have similar information gathering and media display properties. The mobile application can walk the user through a series of steps to collect the data. For example, the application can ask the user if he or she has specific needs, allergies or a skin condition of concern. The application can show a video instructing the user as to which step to perform next, and/or can use the context of a mobile game to obtain and optimize the data. The mobile device can be selected, and the application constructed, to provide consistent data from each collection. Consistent image data collection can be performed using one or more of the following methods.

1. In one example, a manufactured token or marker with known characteristics (e.g., a portion of a new dollar bill, a new quarter, a piece of white paper, or a marker which is manufactured and sent to the user) is used. A mobile device application (or other device application) can instruct the user to take a picture of a portion of the marker alone and/or, if applicable, the marker next to the user's skin. The image is sent to the OAPTA Service, where it is calibrated based on the marker used, and the necessary data is generated from the image.

2. In another example, a reference color chart is projected on the user device screen and the user is instructed to take a picture in the mirror capturing both his or her skin and the reference color chart in the same frame. The image is sent to the OAPTA service, where it is calibrated based on the marker used, and the necessary data is generated from the image.

3. In a further data collection example, a mobile device's internal flash (or LED torch) is used as a light source, and the user is instructed to take one or more picture(s) of his or her skin in a specific manner. The image is sent to the OAPTA service, where it is calibrated based on the flash and Exif data from the device, including focal length, and the necessary data is generated from the image.

4. In another example, packaging used to ship OAPTA products is designed in a manner to hold a mobile device to provide a light shield and define a specific distance from the user's skin. The user is instructed to take one or more picture(s) of his or her skin in a specific manner. The image is sent to the OAPTA data collection service, where it is calibrated based on the flash and Exif data from the device, including focal length, and the necessary data is generated from the image.

5. In another, and preferred, example, an image can be captured by an application on a mobile device that allows software to control the camera. The software running on the device can set the device to use only a flash or light resident on the device, such as the LED torch or display illumination as described above and/or it can also use facial detection software on the device to time when an image is taken. The software can also calibrate the device and save the settings for later use. The image or scan of the user can be taken when, for example, the distance to the user's face is within a known distance and/or the user's face is centered and in focus and using the various techniques described herein for scanning the user's face or regions thereof. The software running on a mobile device can also use real-time video capture to determine the amount of ambient light (not using the flash) and can use a voice, text, sound or effect prompt to interactively suggest to the user how to change the lighting and/or what steps to undertake to capture the desired image. Information about the ambient lighting detected in video mode before the digital photo is taken with the flash can be sent along with the image for processing. Additionally, two images can be taken in quick succession, one with ambient light and one with flash.

Capturing accurate skin color using the camera and a light source on a device having an image sensor, such as a mobile smart phone with an LED torch or illuminated display will now be described in further detail. It is to be appreciated that, although the present techniques are described primarily with respect to capturing accurate skin color, other applications are possible, particularly in circumstances where one would use a colorimeter.

Figure 3A:
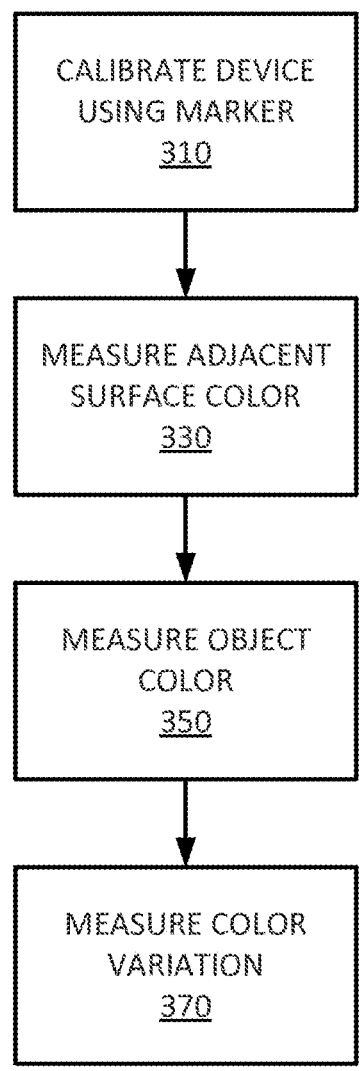
FIGS. 3A-3D are flowcharts of example methods for capturing skin color using a device with an image sensor for use in the invention.

FIG. 3A depicts one implementation of a process for capturing skin color using a mobile device or other device with an image sensor. In Step 310, the device is calibrated using a marker of known size on a white or substantially white field, wherein the marker may itself be a white field, such as a standard sized sheet of paper or a marker displayed on a user's device display screen with the illumination necessary through use of software on the device as noted above. In Step 330, the system measures the color of an object's surface (e.g., a skin region) adjacent to the marker. In Step 350, the color of an object of known size is measured and, in Step 370, the system measures the color variation of an object's surface based on the luminance found in Step 330 and/or Step 350.

Figure 3B:
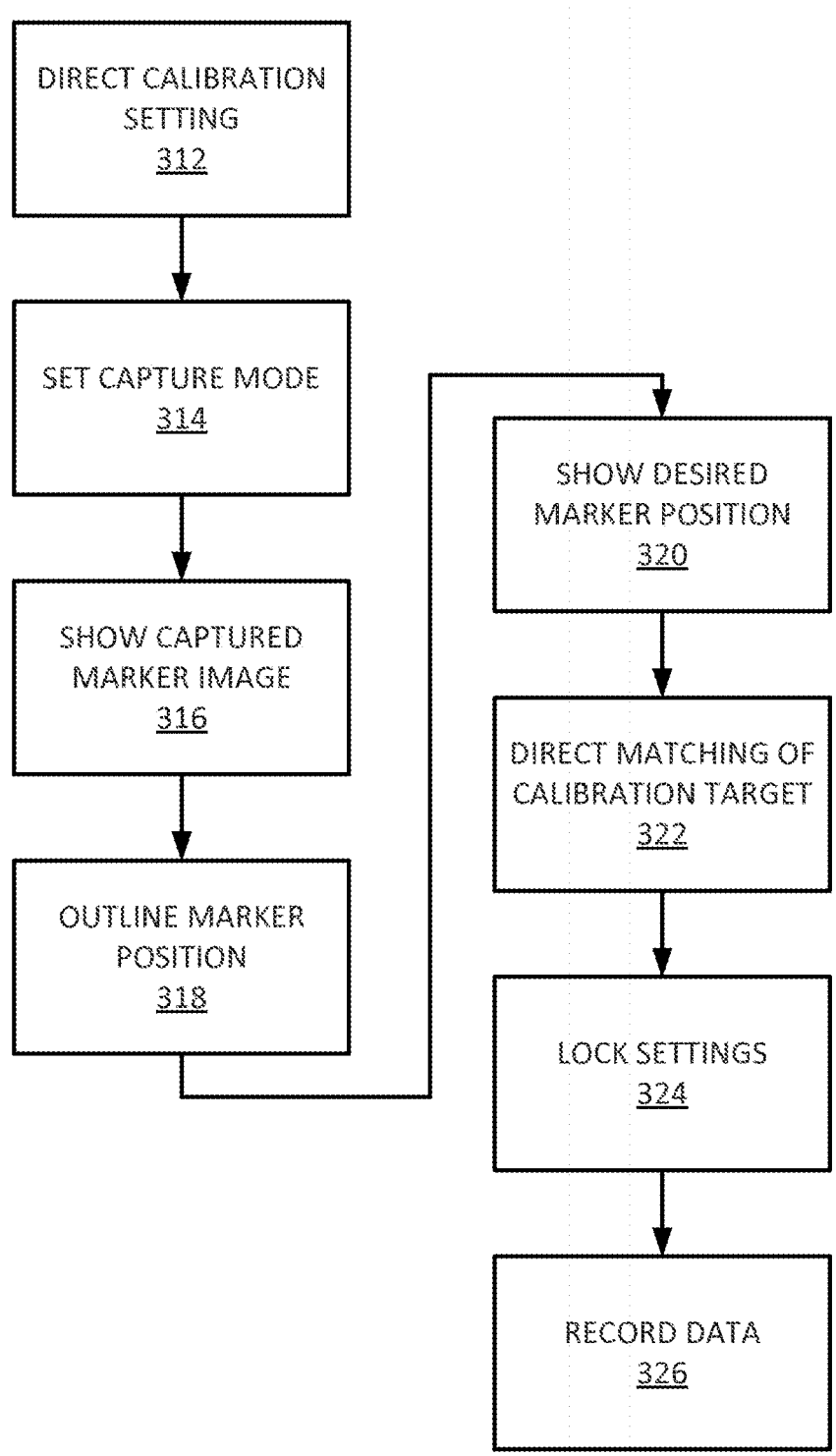

Referring now to FIG. 3B, the device calibration Step 310 is shown in further detail. In some implementations, calibrating the device requires a setting where a software detectable object of known size and known reflectance (a "marker") is placed on a white or substantially white field or a marker is used that is a white field (such as a particular sheet of paper or a displayed marker from the device display screen as noted above) that has known size and reflectance. This setting and the "object" can be manufactured, and/or can be, for instance, a portion of product packaging, or included within a packaged product, such as a skin care product or simply displayed by the device itself using application software. Alternatively, this setting can be created by placing a common object or any other object having well-known properties, such a coin, on a white field or substantially white field with known properties, such as two sheets of copier/printer paper or simply using a white sheet of paper as a marker that is a white field having known size and reflectance properties. The distance used for calibration can be determined to be close enough to the measured surface to reduce the effect of ambient light.

In Step 312, a software application on the device preferably directs the user to set, place or construct the setting used for calibration. This may be carried out by the automatic setting of the camera and marker calibration using a mirror as noted above using the software application. The software can set a specific video or image capture mode for a camera on the device as noted above, and set the light source associated with the camera to a known brightness and/or temperature (Step 314). The software on the device can interactively show the captured image of the marker on the field (Step 316), and can detect the marker and highlight and/or outline the marker's position and/or the marker properties for the user (Step 318) or may automatically capture the marker image and properties by displaying the projected marker in a mirror or taking an image of a known marker. In some, but not all, implementations, the marker's position may be offset so that the software uses the white field to set desired device settings such as the aperture, sensitivity, exposure time, and white balance of the device.

In Step 320, the software may show and/or highlight the desired size and/or position for the marker that will result in the device's camera being positioned at a specific distance. This size and position is referred to herein as the "calibration target." The software can interactively direct the user to match the highlighted marker with the calibration target (Step 322). When the user positions the device to match the marker with the calibration target, the software can cause the device to lock automatic exposure, automatic focus, ISO sensitivity, exposure time, aperture, shutter speed and/or automatic white balance and/or the illumination source white point and/or temperature (Step 324). This locking effectively calibrates aperture, exposure, ISO sensitivity, exposure time, shutter speed, focus, white balance and/or illumination source settings to a predetermined distance to a surface with known reflectance. The white point (and other data) of the setting can be recorded and used to calibrate subsequent sessions (Step 326).

Figure 3C:
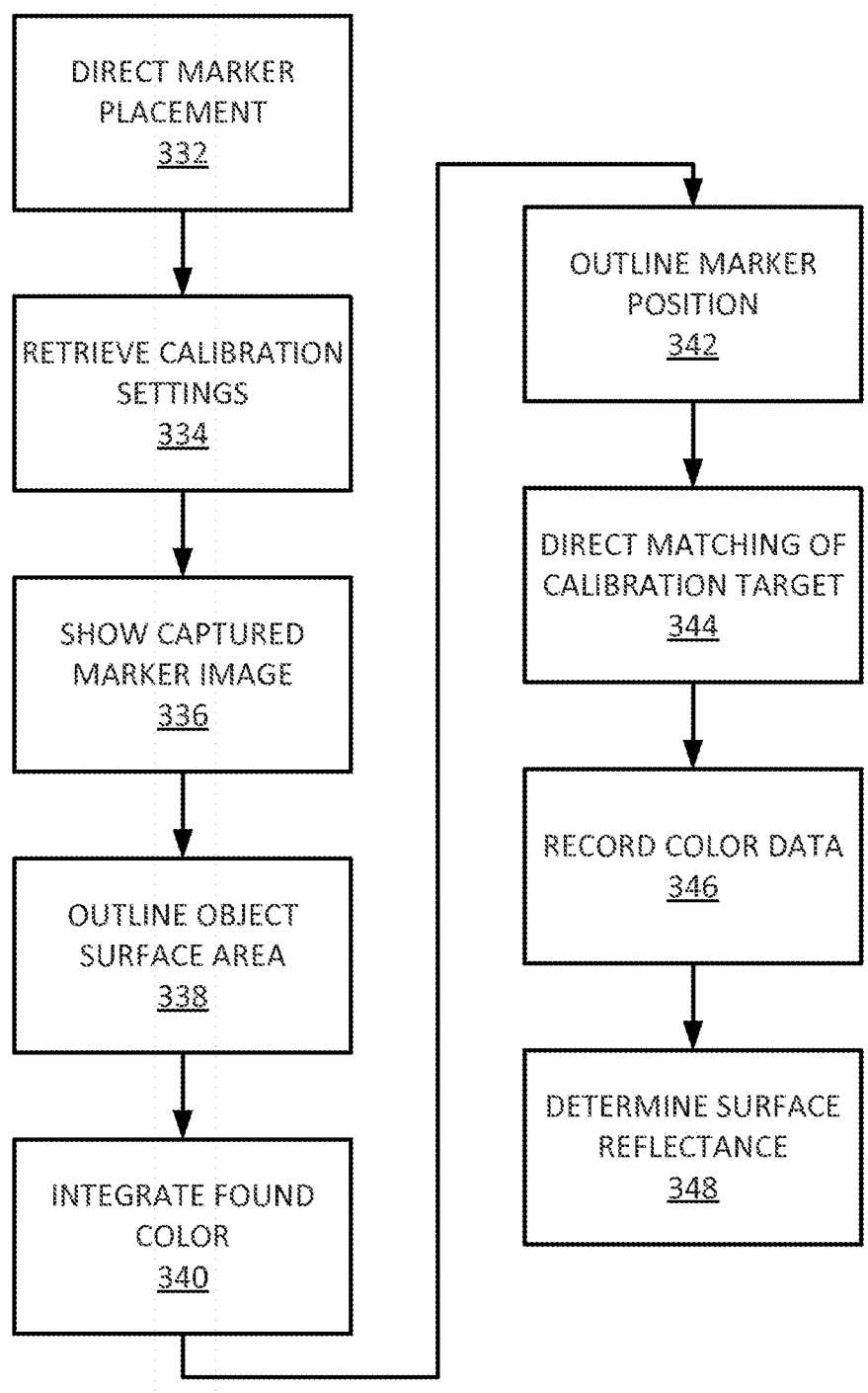

Referring now to FIG. 3C, an optional adjacent surface color measurement Step 330 is shown in further detail. In one embodiment, measuring the color of an object necessitates that the distance from the device's camera to the surface of the object's surface be set, or at least known. If the object size is not fixed, this can be done by placing a marker of the same size used in the calibration step adjacent to the surface to be measured.

In Step 332, the software on the device may direct the user to place the marker adjacent to or on the surface to be measured. In Step 334, the software preferably maintains or recreates the locked settings from the calibration step 310. The software can optionally interactively show the captured image of the marker adjacent to the object (Step 336) (or alternatively, just the capture image of the marker), including showing an outline of the area of the object's surface being integrated and measured if applicable (i.e., the "swatch") (Step 338). In Step 340, the software can integrate the color found in the swatch and show the found color interactively. The software can also detect the marker and highlight or outline the marker's position for the user interactively (Step 342). The marker's position can be offset so that the swatch matches the region of the captured image used to calibrate the white point.

In Step 344, the software interactively directs the user to match the highlighted marker with the calibration target. When the user positions the device to match the marker with the calibration target, the software can record the integrated color of the swatch as the raw color value of the object (Step 346). The software can use known techniques to apply the found white balance and stored data about the characteristic of the device to transform the found raw color value of the object to the surface reflectance of the object (Step 348).

Figure 3D:
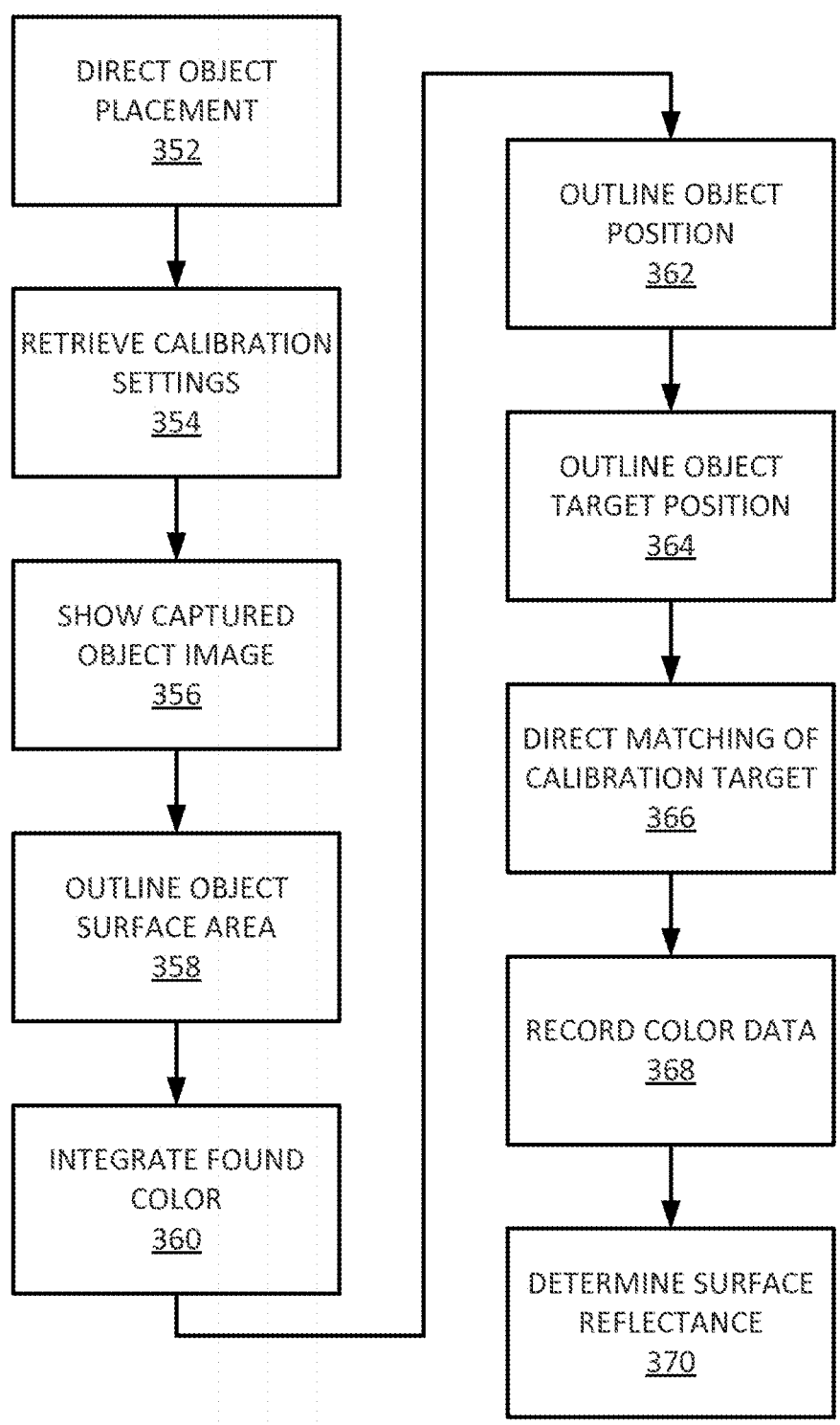

Referring now to FIG. 3D, the object color measurement Step 350 is shown in further detail. If the object to be measured has a known size, or features of a known size, the size of these features can be used to determine the distance of the device's camera to the object to be measured. For instance, in measuring skin color, the width of a user's wrist, or the distance between the user's pupils can be used to detect the distance of the device's camera to the user's skin.

In Step 352, the software on the device directs the user to point the camera at the object (e.g., wrist, face, right and left cheeks, forehead, right and left jaw or other skin region), and to hold the object in a position to match an outline on the display. In Step 354, the software maintains or recreates the locked settings from the calibration step 310. The software can interactively show the captured image of the wrist or other object, and highlight the found width of the wrist (Step 356). The software can further show an outline of the area of the object's surface being integrated and measured (i.e., the swatch) (Step 358). In Step 360, the software can integrate the color found in the swatch and show the found color to the user interactively.

The software can also function to detect the marker and highlight or outline the wrist's position for the user interactively (Step 362), and can also interactively highlight or outline the wrist's target position for matching the calibration distance (Step 364). The software can further interactively direct the user to match the highlighted marker with the calibration target (Step 366). When the user positions the device to match the wrist with the wrist's target, the software can record the integrated color of the swatch as the raw color value of the wrist (Step 368). In Step 370, the software can use known techniques to apply the found white balance and stored data about the characteristic of the device to transform the found raw color value of the wrist to the surface reflectance of the object.

Referring back now to Step 370 in FIG. 3A, an object's surface color variation can be measured when the overall reflectance of the object is known, the device has been calibrated, and the color of a portion of the object is known. For instance, if the color of a person's inside and outside wrist is known, and the color of a person's forehead is detected using intra-pupillary distance, variation in skin tone can be measured by positioning the device such that the integrated reflectance matches a known value.

In one embodiment herein, steps analogous to those noted above in embodiment 300 may be carried out using an interactive calibration and scan. In this embodiment, any of the devices noted herein may be used, however for purposes of illustration, this embodiment will be described with respect to a mobile phone device. The device display side is used as the primary source of illumination as noted above in discussing a marker. In this embodiment, the light from the display screen is used to illuminate the user's face. The light from the screen was also used and sensed in calibration (and calibration was used for this device independently in creating and building the reference data in the ground truth data set so that the settings are set through the scan in comparison to the reference data). The calibration settings, including the set exposure and screen color set the white point. The calibrated exposure also uses the sensed screen luminance to set the ISO sensitivity, aperture and shutter time of the front (display side) camera. Software loaded on the device or in communication therewith displays an illumination area on the device screen, and through image display on other portions of the screen, using voice prompts or other visual prompts interactively directs the user to place the front camera on an area of the user's face.

The software may be set (using the calibration techniques noted above) to detect when the front of the phone is sufficiently proximate the facial area to be scanned to begin the scan (i.e., the "near point"). The distance for the near point may be about 3 cm from the camera lens plane, but it should be understood that depending on the camera and calibrated settings, the near point may vary. Once detected as the near point, the software may use the device's proximity sensor to detect when the phone is close to a facial region. The software may also use the luminance of the camera image to sense shadowing of the phone on the facial region based on the geometry of the phone's camera and the portion of the screen providing illumination to the user's facial region. Once the near point is detected, the scanning gesture state begins. As the software continues to display an illumination area on the device screen, and through image display on other portions of the screen, using voice and/or visual prompts, interactively directs the user to pull the phone slowly away from the user's face. The software may operate to detect when the geometry of the phone's camera, the illumination are on the screen, and a specific distance from the surface of the user's skin region produces the brightest luminance on an area of the camera's image. The image (or several images) recorded at the time of brightest luminance are then analyzed. This analysis may produce a local skin color for that skin region, which may be corrected using known display characteristics, and the settings determined in the calibration steps.

The calibrated color for the skin region is recorded and applied to the recorded image as a first facial region. After this step, the software again adjusts (or the user may be directed to manually adjust) the camera settings with respect to the exposure, and white balance (which are preferably automatically set) and the camera to have a focal point at a near field location about 7.5 cm from the camera lens plane. The software will continue to track movement of the measured first facial region relative to the camera, and tracking may be done using any suitable technique known in the art, including, e.g., optical flow or discrete image comparisons over time. Such techniques may be assisted by using sensors on the phone that measure inertial changes which changes can be used to direct optical flow or discrete image comparison. As the phone is pulled away from the user's face, there is a point at which the focal plane of the camera matches a region of the user's face and a new region is then recorded (second facial region). The image of the second facial region will include a larger area of skin than the skin area of the first facial region. The software can provide images or voice prompts to direct the user's interaction so that the second facial region includes the first facial region. The tracking step noted above allows the software to determine the location of the first facial region within the second facial region.

The second facial region is further analyzed. It may be color calibrated using the calibration of the first facial region and the recorded second facial region may cover an area of about 5 cm×5 cm which may include high resolution data of the second skin region's surface. This data may be further analyzed to provide pore size data, color variance, surface finish, surface quality, and skin dryness or oiliness. Pore size data may be analyzed using monochrome segmentation of textural features. Color variance may be evaluated by segmentation of color features as described herein, and skin dryness or oiliness may be evaluated through analysis of the ratio of specular reflectance to diffuse reflectance.

Once the second facial region is found, the camera settings again are adjusted (manually or preferably automatically) to select exposure, white balance and focus. The software will continue to track the movement of the second skin region relative to the camera, and as the phone pulls away from the user's face, it will reach the point where the entire face is visible. At such point, the software may use facial feature detection and facial feature tracking to determine when the user's full face is visible to the camera. Most devices currently incorporate facial feature detection and/or tracking on their current device operating systems (OS). However, devices may be modified to incorporate such software. Apple™'s AR kit supports these features as does Google™'s Mobile Vision API. Giaran, Inc. also provides facial feature tracking and detection. The software may also incorporate depth maps which some devices now incorporate in devices having 3-dimensional cameras and related interfaces that support and capture a depth map. The depth map may be used to segment (or separate) a face from the background of the image. At this point, an image of the entire user's face may be recorded as a third facial region. The third facial region, preferably includes a larger skin area then the second facial region, and the software may provide images and/or voice prompts and directions to direct the user's interaction so that the third facial region includes the second facial region and the tracking performed as the third facial region is detected allows the software to determine the location of the second facial region within the third facial region. The third facial region may then be calibrated using the calibration of the second and the first facial regions.

Facial Region Detection

Figure 4A:
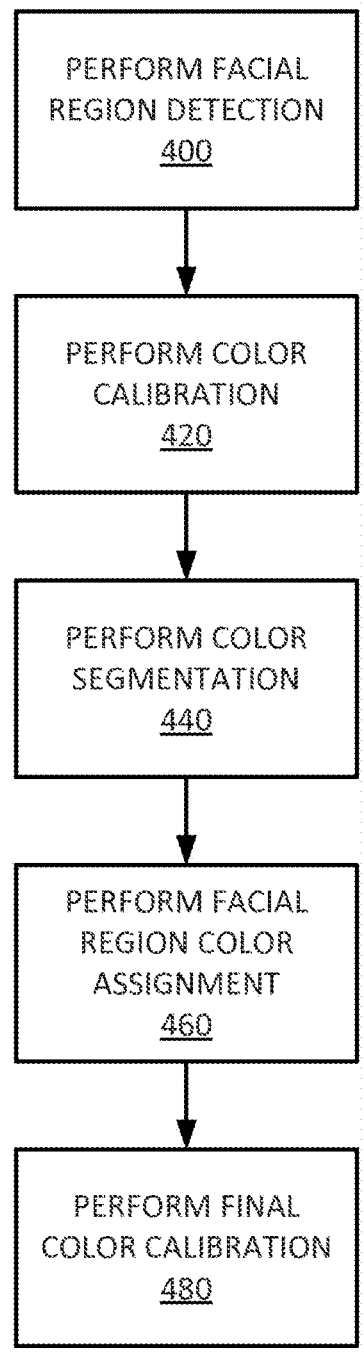
FIGS. 4A-4E are flowcharts of example methods for analyzing an image containing a facial region which may be used by a user in the invention.

In another example embodiment, the present system performs processing on an image containing a user's face or a portion of the user's face as part of formulating a customized topical agent for the user. As shown in FIG. 4A, facial region detection is performed on the image (Step 400), and calibrated color and reflectance information is provided (Step 420). Color segmentation (Step 440), facial region color assignment (Step 460), and final facial region color calibration (Step 480) can also be performed, as further described below and using techniques as noted above.

In some embodiments, once an image is received by the OAPTA data collection service, it is processed to provide calibrated color and reflectance information. To assist in the calibration process, a facial region detection process (Step 400) can be used such as that noted above or another facial region detection process. For example, open source and other techniques exist, such as use of facial recognition software as noted hereinabove, to detect the position of the face, eyes, mouth and nose in a digital photo. For a further reference, a Haar Cascade Classifier can be used with training sets built for detecting facial features. One software package and associated training sets that can be used to provide this functionality is found at OpenCV (opencv.org). Additional software and facial recognition processes such as those of Giaran, Inc. may also be used.

If using the embodiment noted above to detect and track data for first, second and third facial regions using the software prompts and automatic camera settings, the facial features detection may be used to assemble a map of the face placing the first and second facial regions within the map. The facial map may be used to provide face shape, hair color, eye color, color variations and other data as noted herein. This same facial map may be used to calibrate colors for other facial regions derived from the facial map, e.g., repeating the process noted above in that embodiment (which detects and tracks a first region, within a second region and then within a full face third region) on other starting regions of the face, such as the forehead, right cheek, right jawline, left cheek and left jawline. As each scan is integrated, it may be used to increase the accuracy of the color calibration and provide additional detail data on the various skin regions of the user's face over each skin region to provide an accurate facial map.

Using the positions of the facial features determined by any suitable procedure such as those described above, existing open source and other techniques or available software can be used to detect the position of discrete facial features in the digital photo. For reference, active shape models developed with a large training set can be used. One software package and associated data that can be used to prove this functionality is the stasm library (which is an open source facial feature detection library), the Apple X 3-d modeling software, ARKit, or the software and systems available from Giaran, Inc. and/or described in U.S. Patent Publication No. 2017/0076474A1. All of the above noted device settings and/or facial detection and/or recognition software may be used to locate and model the correct color and related user data.

The discrete facial feature points determined above can then be assembled into a set of polygonal regions. In one implementation, the face includes 77 recognized feature points, although any suitable number of feature points and regions can be used. The recognized regions can include some or all of, but are not limited to:

Full face (includes all regions);
Forehead;
Right cheek;
Left cheek;
Nose;
Nose bridge;
Mouth (includes both lips);
Chin;
Right eyebrow;
Left eyebrow:
Right eye;
Left eye;
Top lip;
Bottom lip;
Right jaw line; and/or
Left jaw line;

Color Calibration

Figure 4B:
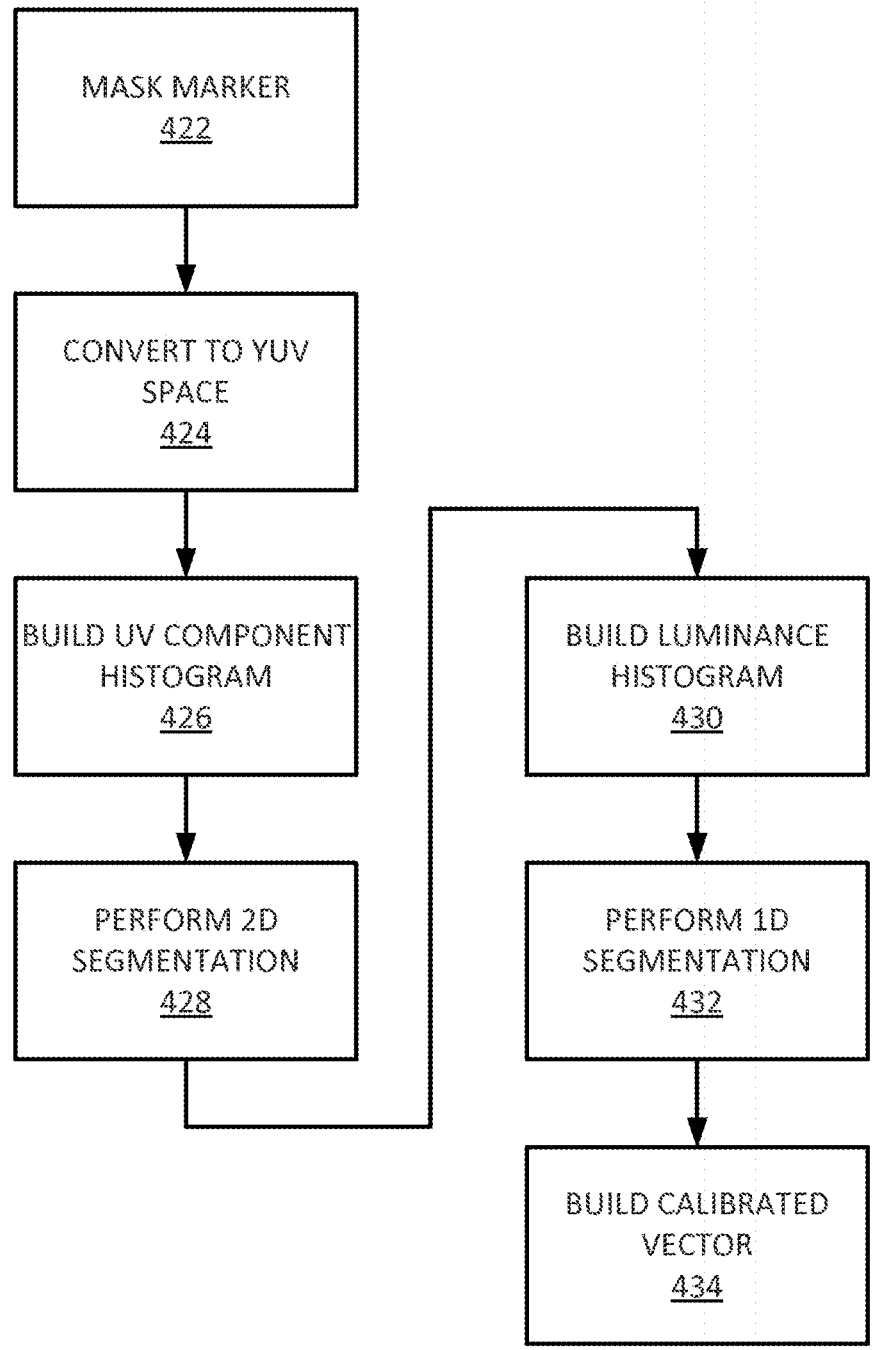

FIG. 4B depicts Step 420 in further detail, namely, one way to employ a method to provide calibrated color and reflectance information using a captured image. In Step 422, the image is calibrated, and the marker, if used, is recognized and masked. The image is converted into YUV color space (Step 424) and a 2D histogram of the UV image components is built (Step 426). In the following Step 428, 2D segmentation is performed on the UV histogram to find a set of colors representing highlight, body color and spot color. A luminance histogram of the Y image component is built (Step 430), and 1D segmentation is performed on the luminance histogram to find, e.g., a luminance set representing reflectance of body color, amplitude of highlight reflection (shininess) and shadow luminance (Step 432). Then, in Step 434, a calibrated n-dimensional vector is built using the combined UV and luminance sets. This vector is referred to hereinafter as the "nColorVector." Of note, the nColorVector can contain data representing skin shininess and color variation (spottedness).

In another example method, a digital photo can be calibrated based at least in part on data embedded in a digital photograph, such as the IFD tags found in JPEG compression, or Exchangeable Image File format (Exif) data. The characteristics of the device used to take the photograph can be used to pre-calibrate the color. The distance from the camera to the user's face can be determined by the interocular distance found by facial feature detection, such as that described herein above. The shot data embedded in the digital photo, such as brightness, flash characteristics, and so on, can be combined with the distance from the camera to adjust the luminance of the image. Further, additional data sent by software resident on the device at the time of the shot, such as ambient lighting information or an ambient lighting image, can be used to color correct for ambient lighting.

The color and facial regions are calibrated using the facial mapping technique described above having first, second and third facial regions calibrated over varying regions of the face to create a facial map.

Color Segmentation

Figure 4C:
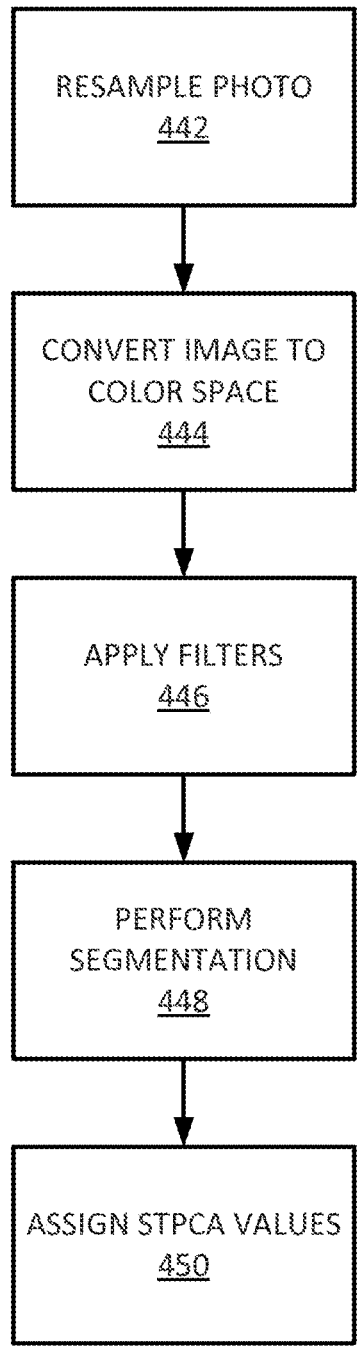

Another way to create color segmentation is as part of the processing of the digital photo. One way to perform color segmentation (Step 440) is shown in FIG. 4C. In Step 442, the digital photo is resampled to a smaller size that matches the resolution needed for identifying skin tones. The size can be determined by the dimensions of key facial regions. For instance, the size can be calculated as newSampleHeight= (Image.height*128)/sqrt(Area of Face region in Pixels). This resampled photo is referred to hereinafter as the "segmentation image."

The segmentation image can be converted to a color space using, for example, a 3×3 matrix transform that transforms skin color from an RGB representation to a skin tone principal component representation (Step 444). The skin tone principal component space will be referred to herein as "STPCA." This transform can be found by performing principal component analysis on a large array of RGB colors of skin tones from digital photos taken by various users with matching devices (e.g., associated by being taken by a particular mobile phone). This image will be referred to as the "PCA segmentation image." Principal component analysis (PCA) is a well-known method of reducing the dimensionality of a set of vectors.

The principal component channel (channel 0) of the PCA segmentation image is prepared for segmentation by applying additional filtering, such as a bandpass filter (Step 446). In Step 448, segmentation can be performed by using well-known techniques such as a Watershed transform. The resulting image is referred to herein as the "segmentation label image." The brightest pixel of the PCA segmentation image channel 0 within each segmentation label image region can then be used to assign an STPCA value to each segmentation label region (Step 450).

Facial Region Color Assignment

Figure 4D:
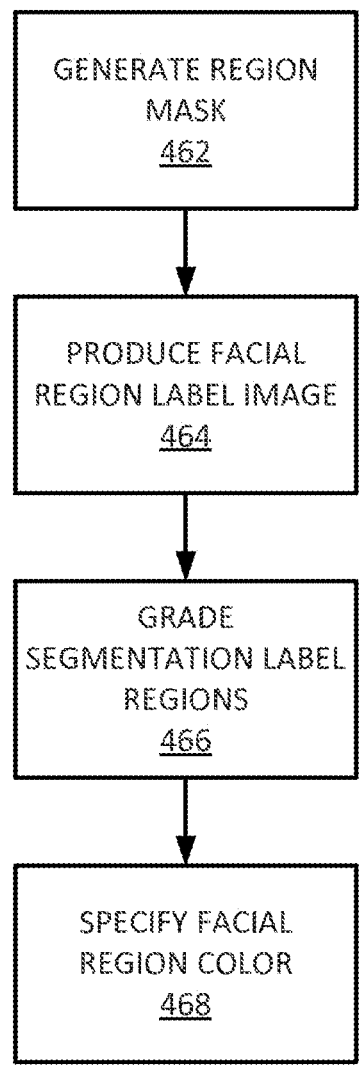

Referring now to FIG. 4D, given the delineation of a facial region, one procedure for determining the skin tone for a region (i.e., Step 460) is as follows. In Step 462, a region mask is generated for the facial region by, for example, drawing the region as a white polygon on a black background. The segmentation label image produced by the color segmentation process described above is masked by the region mask to produce a "facial region label image" (Step 464). Then, in Step 466, the segmentation label regions in the facial region label image are graded by area and by maximizing the distance of the label region's assigned STPCA value from STPCA values representing shadow and specular highlight. The STPCA value for the segmentation label region with the best grade is then specified as the "facial region color" (Step 468).

Final Facial Region Color Calibration and Additional Data

Figure 4E:
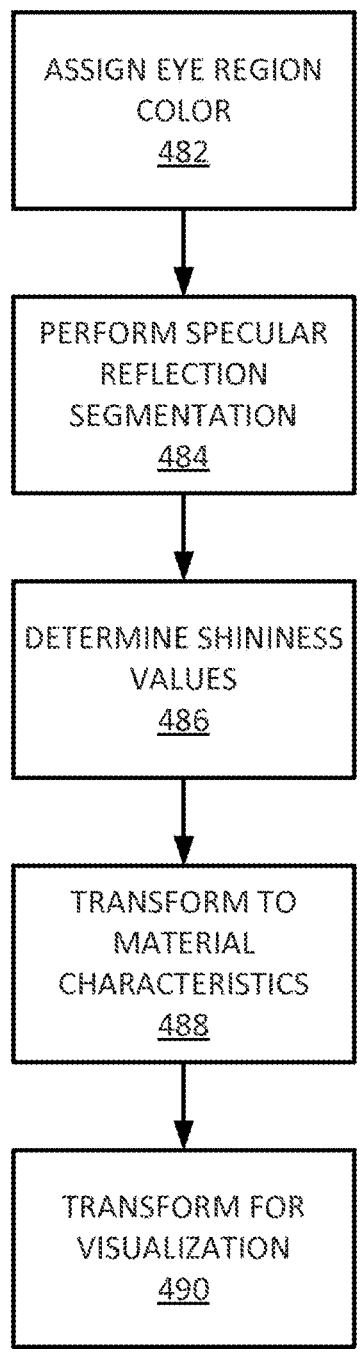

Final facial region color calibration (Step 480) can be performed using the following steps, as shown in FIG. 4E. In Step 482, a facial region color for the eyes may be determined and assigned and, in particular, a grey level for the sclera of the eye determined. In Step 484, segmentation of specular reflection in the eye regions can be used to determine if the flash and/or a torch were fired and if other point sources of light were present (see further description below). Specular reflection sub-regions are detected for each facial region, and a "shininess" value is determined for each facial region based on its size relative to the overall region size (Step 486). The shininess metric for the eyes can also be used to calibrate other regions.

Final transformation of STPCA values, grey level, and shininess values can be transformed directly into material characteristics used for manufacturing of a cosmetic product, rather than an intermediate form (Step 488). Further, transformation of STPCA into RGB or CIELAB L*a*b color spaces can be performed for visualization for the user. These can be performed using a modified version of the original PCA matrix, adjusted by the grey level and shininess value.

As mentioned above, facial region color calibration can involve determining the presence and color of lighting sources (other than known sources, such as a camera flash or LED torch) based on an evaluation of specular reflection in the eye regions. In one implementation, this process includes the following steps:

Subtract the red channel from the digital photograph. Take a bandpass filter of a relatively small number of pixels in the high frequency (e.g., around two pixels), and a higher number of pixels in the low frequency (e.g., around five or six pixels) to remove detail. Perform a histogram on the result and take a threshold at the 99th percent of the pixel population that the histogram has, thereby determining all of the highest lights. Dilate the highest lights by approximately twenty pixels to create a mask for the lights. Apply another bandpass filter to the resulting image at a high frequency of approximately ten pixels and a low frequency of approximately twenty pixels, resulting in an image having broader features, including pulling out the iris of the eye. Dilate the dark part of the eye by approximately ten pixels, resulting in the intersection of the inverse of the iris, or the dark part of the eye, with the discovered highlights. Threshold the bright spots (i.e., reflections of light) within the eye with the initial inputs. Use the resulting spots to mask the original color of the input images and determine if there are previously unknown light sources. Subtract any discovered unknown light sources and color calibrate.

User Data Collection Specific to the Reference Service

The common service data collection can be augmented by additional data collection which aids the OAPTA professional group and/or is used by application software to create the reference OAPTA specification. In one implementation, this data includes one or more of:

Visible, IR, and UV color spectrographic data;

Bidirectional reflectance data;

Photomicrographs of specific facial skin sites (and evaluating skin health);

Analysis of surface skin oils or residue using a Raman Spectrophotometer, Mass Spectrophotometer, or other instrument;

Augmented data provided by the common service data collection by interview;

One or more facial maps according to one embodiment of the invention that is created using scan data of user(s), wherein the user is scanned by a device such as those mentioned herein, including a mobile phone with a camera, and application software maps calibrates skin color data, wherein the data is based on scans of different and increasingly enlarged facial regions on a user's face while tracking the data as noted above to create a facial map of a scanned user;

A complexion map created based on scanned data collected from a variety of users with varying skin color and/or from users from a number of differing geographic areas as described elsewhere herein; and/or A product attribute data store as described herein.

Reference OAPTA Specification

The OAPTA professional group and/or the application software can specify the components and amounts to be used in making a custom OAPTA for a user based on the reference user data collection. The specification and the reference user data can be compiled to create an entry in the OAPTA metadata 230.

Reference OAPTA Formulation

The OAPTA professional group and/or the application software can provide a set of instructions that specify the order and methods that are used to combine the components to make the OAPTA product. This set of instructions can be added to the current entry in the OAPTA metadata 230.

Reference OAPTA Compounding

In one implementation, the OAPTA product is compounded manually based on the OAPTA formulation 260. In another method of compounding, a review of the formulation instructions and the shared OAPTA component set 210 is used in an apparatus which will automatically compound the OAPTA product based on the formulation instructions. An exemplary device is described in detail in the applicant's co-pending U.S. Patent Application Publication No. 2019/0189853 A1, incorporated in relevant part herein for compounding and creating an OAPTA product and further for delivery of such product. However, other suitable mixing and blending apparatuses as are known in the art, preferably that are programmable and responsive to an electronic and/or digital control system are preferred.

Reference OAPTA Delivery

The OAPTA product may be delivered on premises to the user at a service location after being compounded in the same or a different location and during the user's use of the system. The OAPTA product after compounding in the same or a different location from a point of service can be directly given to or shipped to the user.

Reference OAPTA Collection

Reference OAPTA collection may be accomplished through billing via the professional service. Further, payment information may be collected as part of the common service data collection, and payment may be collected on OAPTA delivery and/or at the time of ordering through various on-line payment methods as are known in the art, preferably a secure payment service and/or shopping cart feature.

Reference OAPTA Feedback

User feedback may be collected through an interview after the OAPTA product is delivered and tested. Feedback information may also be collected by the mobile application used for common service data collection and/or through linked social media or other on-line sources for the same user.

OAPTA Metadata

The OAPTA metadata 230 may include one or more of the following example data fields, including user data collection, although other fields as desired for forming an OAPTA may be provided or used:

Common service data;

User ID;

Geographic Region;

Gender;

Birthday;

Date;

CombinedVector (if used);

Ultraviolet radiation exposure;

Allergy vector;

nColorVector (if used);

Reference specific data;

Skin color spectra;
Color variance data;
Skin location on a complexion color map;
Bidirectional reflectance data;
Specular reflectance data;
Diffuse reflectance data;
Photomicrographs of specific facial skin sites;
Pore size data taken from scanning;
Skin surface oil index;
Facial shape;
Hair color;
Eye color
Reference specification;
Reference formulation instructions;
User device operating system;
User device software information;
User beauty profile (color, shininess and/or opacity); and/or
Tags for spanning trees found in the specification hints.

The data noted above may be captured through scanning, user self-reporting, such as through a survey or query, self-reported data from onboarding data gleaned from device sensors (e.g., GPS) and data captured through social media sites.

CombinedVector can be thought of as a point in n-space. The magnitude of each component is normalized to its significance system-wide.

Reference data can include one or more ground truth data set(s) as described herein, or other data collections that include defined values relating to, e.g., skin color, reflectance, skin texture, skin tone, skin undertone, skin oiliness, skin finish and skin surface quality, allergies, and/or other data as described herein, for which known OAPTAs can be accurately formulated. In other words, for a specific set of values in the ground truth data set (which may be one or more stored ground truth data sets), there can be a predefined topical agent that is optimized for those values. The predefined topical agent can also be similar to or the same as an existing product, such as a commercial offering of the OAPTA's compounding company or any third party's commercial product (which products may have scan data or other attributes stored in a product attribute data store). Thus, one way to determine an optimal OAPTA for a user can be to determine the relative proximities of the user's captured skin data with data in one or more of the ground truth data set(s)' values, or by using the scanned data and creating a facial map which may also be used to compare a user's scan data to a complexion map. The data set values that are closest in proximity, or that match a location on a complexion color map, are selected and that data may be saved in a user's search key and associated with an OAPTA. The OAPTA or existing product corresponding to those closest values can then be the unique compound selected for the user.

OAPTA Production Service

The OAPTA production service 240 can be constructed after a sufficient number of records have been collected into the OAPTA metadata 230, and the reference service OAPTA compounding means have been automated.

Production User Identity

The OAPTA production service 240 creates and begins to manage a user identity when a user purchases software, e.g., a mobile application and launches the application for the first time. The service creates a data store to hold user data, and provides for retrieval of the data based on the user identity. The user identity can also contain shipping and billing information.

Production User Data Collection

The OAPTA production service 240 can use the common service data collection previously described for the OAPTA reference service 220. The user's common service data for a given session is stored with the production user identity.

Production OAPTA Specification and Formulation

The OAPTA production service 240 uses the OAPTA metadata 230 generated by the OAPTA reference service 220 to synthesize a specification. For example, based on the facial image data gathered and processed as described above, a particular user's complexion can be matched to an existing reference complexion (or location on a complexion color map) for which a custom cosmetic formulation or existing commercial cosmetic formulation has already been defined (e.g., based on an actual reference user, a ground truth data set, a product attribute data store, etc.). Properties unique to the user, such as allergies, can be considered in determining whether a particular formulation will be compatible with the user. New formulations derived by the system can be saved as references for future use.

In one implementation, to process and order an OAPTA product, the system obtains the user's current common service data that is linked to the user's production user identity, and determines the closest match to the common service data combined vector in the OAPTA metadata 230 as described above. If the distance between the combined vector and the closest match is too far, the user can be queried if he or she would like to be promoted to being a reference user and end the current order.

The system can then locate the next closest match filtered by the first match's spanning tree tags, and can use geometric algebra or singular value decomposition to find a third filtered match point describing a hyperplane. If the distance between the combined vector and the surface of the hyperplane is too large, the user can be queried if he or she would like to be promoted to being a reference user and end the current order. For each found reference point, the blend values are determined, and a specification is built by adding blends for each component common to the closest match. Finally, the formulation from the closest match's OAPTA metadata is selected as the formulation suited to the user. Thus, an initial OAPTA and initial customized cosmetic formulation is created.

Production OAPTA Compounding

The system can use the automated compounding method specified by an implementation of the OAPTA reference service 220 described herein. In one embodiment, this is a shared resource. Alternatively, there may be multiple locations with similar automation equipment, and the location closest to the user's geographic location is chosen.

The OAPTA product can be compounded on demand after the user has proceeded through the steps described herein that allow an initial customized cosmetic formulation to be determined. Additionally or alternatively, OAPTA products can be compounded in advance (e.g., the most common formulations can be compounded and stocked) to provide for a faster turnaround time from formulation to delivery. In some embodiments, the formulation determined by the system is mapped to existing products from other vendors and brands. For instance, based on the formulation, ingredients, color, and/or other known properties of other products, the system can compare the user's customized cosmetic formulation with the other products and determine those that are most similar to or that meet a threshold of similarity (e.g., 75%, 80%, 90%, and so on). As one example, the system can determine that the user's foundation is an 88% match to an Armani foundation and an 82% match to a L'Oreal foundation. The system can also display the other matched products to the user and allow the user to purchase them in addition to or as an alternative to the user's customized formulation, thereby allowing the user the option of a close match to a commercial product for purchase or a customized cosmetic formulation based on OAPTA that should ultimately be at least as close or closer to the desired match for the user.

Production OAPTA Delivery, Collection, and Feedback

The OAPTA product can be shipped to the user from an automated compounding location, a warehouse, a retail establishment, or other location where OAPTA products can be compounded and/or stored. The user can be billed upon shipment using the production user identity information available to the system. In one implementation, the user is able to provide feedback and other data using a mobile application which serves the common service data collection.

OAPTA System Feedback

In one implementation, the OAPTA system 200 is configured to facilitate review of production OAPTA feedback 250 and compare any critical feedback to gaps in OAPTA metadata's 230 common service data combined vector space. The system 200 can adjust the allowable maximum distance from a solution if the space is too sparse, and upgrade production users to reference users to fill gaps in the model.

Implementations of the OAPTA system 200 can use appropriate hardware or software; for example, the OAPTA system 200 can execute on a system capable of running an operating system such as the Microsoft Windows® operating systems, the Apple OS X® operating systems, the Apple iOS® platform, the Google Android™ platform, the Linux® operating system and other variants of UNIX® operating systems, and the like.

Some or all of the described functionality can be implemented in software and/or hardware on a user device. A user device can include, but is not limited to, smart phones, smart watches, smart glasses, tablet computers, portable computers, televisions, gaming devices, music players, mobile telephones, virtual reality goggles, laptops, palmtops, smart or dumb terminals, network computers, personal digital assistants, home assistants (such as Alexa™ or Google® Home™), which preferably have camera, wireless devices, information appliances, workstations, minicomputers, mainframe computers, or other computing devices, that is operated as a general purpose computer or a special purpose hardware device that can execute the functionality described herein. The software, for example, can be implemented on a general purpose computing device in the form of a computer including a processing unit, a system memory, and a system bus that couples various system components including the system memory to the processing unit.

Additionally or alternatively, some or all of the functionality can be performed remotely, in the cloud, or via software-as-a-service. For example, matching functions can be performed on one or more remote servers or other devices as described above that communicate with the user devices. The remote functionality can execute on server class computers that have sufficient memory, data storage, and processing power and that run a server class operating system (e.g., Oracle® Solaris®, GNU/Linux®, and the Microsoft® Windows® family of operating systems).

The systems can include a plurality of software processing modules stored in a memory and executed on a processor. By way of illustration, the program modules can be in the form of one or more suitable programming languages, which are converted to machine language or object code to allow the processor or processors to execute the instructions. The software can be in the form of a standalone application, implemented in a suitable programming language or framework.

Method steps of the techniques described herein can be performed by one or more programmable processors executing one or more computer programs to perform functions by operating on input data and generating output. Method steps can also be performed by, and apparatus can be implemented as, special purpose logic circuitry, e.g., an FPGA (field programmable gate array) or an ASIC (application-specific integrated circuit). Modules can refer to portions of the computer program and/or the processor/special circuitry that implements that functionality.

Processors suitable for the execution of a computer program include, by way of example, both general and special purpose microprocessors. Generally, a processor will receive instructions and data from a read-only memory or a random access memory or both. The essential elements of a computer are a processor for executing instructions and one or more memory devices for storing instructions and data. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. One or more memories can store media assets (e.g., audio, video, graphics, interface elements, and/or other media files), configuration files, and/or instructions that, when executed by a processor, form the modules, engines, and other components described herein and perform the functionality associated with the components. The processor and the memory can be supplemented by, or incorporated in special purpose logic circuitry.

In various implementations, a user device includes a web browser, native application, or both, that facilitates execution of the functionality described herein. A web browser allows the device to request a web page or other downloadable program, applet, or document (e.g., from the server(s)) with a web page request. One example of a web page is a data file that includes computer executable or interpretable information, graphics, sound, text, and/or video, that can be displayed, executed, played, processed, streamed, and/or stored and that can contain links, or pointers, to other web pages. In one implementation, a user of the device manually requests a web page from the server. Alternatively, the device automatically makes requests with the web browser. Examples of commercially available web browser software include Google® Chrome®, Microsoft® Internet Explorer®, Mozilla® Firefox®, and Apple® Safari®.

In some implementations, the user devices include client software. The client software provides functionality to the device that provides for the implementation and execution of the features described herein. The client software can be implemented in various forms, for example, it can be in the form of a native application, web page, widget, and/or Java, JavaScript, .Net, Silverlight, Flash, and/or other applet or plug-in that is downloaded to the device and runs in conjunction with the web browser. The client software and the web browser can be part of a single client-server interface; for example, the client software can be implemented as a plug-in to the web browser or to another framework or operating system. Other suitable client software architecture, including but not limited to widget frameworks and applet technology can also be employed with the client software.

A communications network can connect the devices with one or more servers and/or with each other. The communication can take place over media such as standard telephone lines, LAN or WAN links (e.g., T1, T3, 56 kb, X.25), broadband connections (ISDN, Frame Relay, ATM), wireless links (802.11 (Wi-Fi), Bluetooth, GSM, CDMA, etc.), for example. Other communication media are possible. The network can carry TCP/IP protocol communications, and HTTP/HTTPS requests made by a web browser, and the connection between the clients and servers can be communicated over such TCP/IP networks. Other communication protocols are possible.

The system can also be practiced in distributed computing environments where tasks are performed by remote processing devices that are linked through a communications network. In a distributed computing environment, program modules can be located in both local and remote computer storage media including memory storage devices. Other types of system hardware and software than that described herein can also be used, depending on the capacity of the device and the amount of required data processing capability. The system can also be implemented on one or more virtual machines executing virtualized operating systems such as those mentioned above, and that operate on one or more computers having hardware such as that described herein.

In some cases, relational or other structured databases can provide such functionality, for example, as a database management system which stores data for processing. Examples of databases include the MySQL Database Server or ORACLE Database Server offered by ORACLE Corp. of Redwood Shores, California, the PostgreSQL Database Server by the PostgreSQL Global Development Group of Berkeley, California, or the DB2 Database Server offered by IBM.

It should also be noted that implementations of the systems and methods can be provided as one or more computer-readable programs embodied on or in one or more articles of manufacture. The program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

Sample User Operation

A user may engage the application through a user interface such as a welcome page, directing a user to one or more base products. The interface may have a list or scroll-type option for allowing the user to view one or more products. On a primary page, the user may log in, begin a scan or shop for products. As such a cart feature, log-in feature and scan feature interactive to a user selection would be preferably used. The user would select the next step. If a scan is initiated, the user will have an interactive guidance (video, sound, vibrations, prompts, etc.) to lead the user through a calibration and scan in accordance with one or more embodiments as noted above, including providing sufficient scan data in one embodiment to build a facial map.

The user may associate the application with a social media website (such as Facebook or Google, etc.) and log-in through such a website or through the application directly to the server. If there is an issue with the log-in, the user may be prompted to try again for a set number of times, be prompted to re-set the password or contact customer service. Once logged in, the user can load an existing profile or be asked if the user wishes to order a product. New users are prompted to provide user data for use as OAPTA metadata and which are then encoded in a search key and used to create a user ID.

The application may be an application that operates only to create and order new customized cosmetic products (or existing non-custom products in the ground truth data set) and/or may be an application that also includes steps to allow for modification or adjustment of products and/or works collaboratively with a separate application for modification or adjustment of a product. Preferably, the application allows for selection by a user of an existing non-custom product or a prior customized cosmetic formulation that is associated with a user (such as a unique formulation or non-custom formulation) that can be adjusted either by choice of the user if the user desires another shade or is prompted to do so after a new calibrated scan indicates a change in data that would cause suggestion of a modified or new custom cosmetic product or non-custom product based on the scan data.

After selecting a product, or after completing an initial scan (which will include calibration steps as noted above), the user will be prompted in one or more of the following ways.

In one embodiment, the user will be prompted to select a product for the next steps, e.g., the user may select either an existing customized cosmetic formulation from a prior session, a new product which may be a non-custom (existing commercial) product, a new and different customized cosmetic product (for example if a user has created a foundation, but now wants to create an eye make-up product), or a modified or adjusted product based either on a prior customized cosmetic product or a non-custom product. Options may also be provided for reviewing the user's cart, gift options, reordering, and the like.

The application may also prompt a user to run a scan which is preferred for any re-order of more than about thirty (30) days or for any initial interaction. For new users, a scan is an initial automatic prompt. The scan may be made in accordance with any of the scanning methods noted above. In one embodiment, the scan process proceeds using a first, second and third facial section, wherein the third facial section encompasses the user's face and preferably also the second and first facial sections, with tracking during the scan to generate user data that is saved and accessible as data stored in the system, such as OAPTA specification data or metadata. The output of the scan may also be used as an input to a user by creating a complexion color map and providing the user with the user's location on the complexion color map. The complexion color map, once created based on the calibrated facial scan, can be used in creating and selecting a customized cosmetic product or in modifying an existing customized cosmetic product or an existing non-custom product.

If the user is interested in a non-custom product, the user may indicate this and the application may prompt the user to select a non-custom cosmetic product (or prior customized cosmetic product in the system) that is the closest either in proximity using the CombinedVector or other techniques noted above by approximating the closest match in the ground truth data set, or to scan a non-custom product of interest so that the product may be searched and/or incorporated in the product attribute data store as discussed below. In either case, a selected non-custom product, once in the system either in one of the ground truth data set(s), which may include a product attribute data store, or in a separate product attribute data store, may also be further modified or adjusted using the adjustment application described below.

Once an order is complete, the order is processed. The application may also include an order history, a preview of products being ordered, and product details. As commonly provided by log-in or association of the application with a service such as Facebook, product orders may also be shared through the application with associated social media websites in a typical manner, and friends or other users added as associated as a friend to the user in the application. Other users (known or not known) may be "followed" through the application as well for modifying a user profile and friends may be invited to the application.

In the application, a user preferably may be able to access the user's current beauty profile through a profile tab on a user interface (see FIG. 8) to take the user to the user's beauty profile, wherein the beauty profile is an interface to a search key, and wherein the search key may include a location on a complexion color map corresponding to a user's scan data. The beauty profile allows the user to access user personal data, to re-run a scan which provides updated scan information of a variety of types to be incorporated and encoded into the user's search key, as well as to include device scan settings, and to allow the user also to send gifts, referrals, associate or list friends, seek help support, contact customer service, and provide feedback which may also provide user data collection that the application may associate with OAPTA metadata and update information encoded in a user's search key. Links to running a scan, ordering product and user information profiles may also be placed on the current profile interface.

Modification or Adjustment Application Including Updating of the Search Key

The user interface is constructed based on the contents of the search key which may include a complexion color map or through a separate application that pulls data only from the complexion color map. The first screen may present, for example, main search components associated with the search key suitable editing such as color, tone, undertone, dryness, opacity, coverage, SPF and/or product finish. The complexion color map converts the information to a CIELAB color, and the beauty profile may use the complexion map and other user interface selections to show as much information from the search key as possible. The complexion color map may be derived, at least in part, from the morphology of the skin and the biochemistry of the skin. Each location on the complexion color map may correspond to a CIELAB color within a range of error of ±about 3 percent. The complexion color map may be prepared based on reference users' skin morphology and biochemistry. In this instance the morphology relates to the layering of the skin and physical variation, as well as the biochemistry of those skin layers by evaluating the content of brown and red hemoglobin (eumelanin and pheomelanin) within the layers of the skin. The complexion color map is then created into various regions corresponding to various colors, tones and undertones which may be associated with a natural language description. Such natural language description may be used as a speech user interface to specify and search for a product or for use in modifying a product, or simply a word-based readable region communicable in a user interface using sliders, color icons, and other visual selection cues, etc. For example, the speech interface could prompt the user to provide feedback on the product (custom or non-custom) to be modified and allow the natural language speech agent to process the date. The user could notify the natural language agent, for example, that the color of a foundation is too light, wherein the natural language agent would process that information by navigating the interface to allow for modification of skin tone and provide accompanying voice prompts to guide the user to calibrate and/or scan an area of the user's skin (or the user's skin with a swatch of product as described above) for collecting data to adjust and modify the product and accompany search key.

Figure 5:
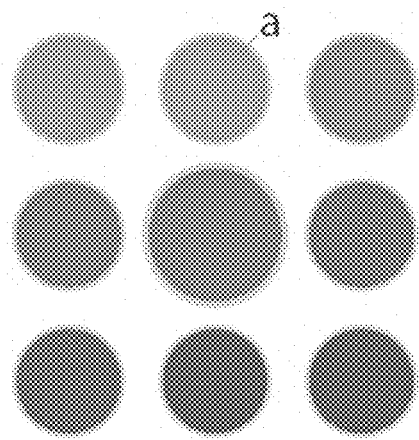
FIG. 5 is a representation of one embodiment of modifying a color component of an initial customized cosmetic product having an initial cosmetic product color, wherein the color variation step is gathered from color neighborhood found by a search key, and the label 'a' shows a first user selection.
Figure 6:
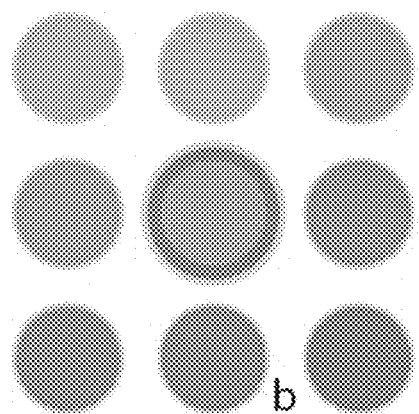
FIG. 6 is a representation of a result of first user selection in FIG. 5, wherein a selected color is moved over the center initial color, and color variation is adjusted, and label 'b' shows second user selection.
Figure 7:
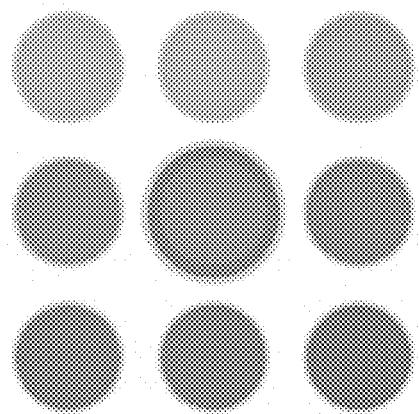
FIG. 7 is a representation of a result of a second user selection, wherein a selected color 'b' of FIG. 6 is moved over the center initial color and color variation is adjusted.

In one embodiment herein, as shown in FIGS. 5-7, if the user selects color for modification, for example, an interface is built so as to show an image of the original color in the center, and variations of color in a pattern around that image of the original color as shown in FIG. 5. The variation of the color pattern may be constructed using data from the OAPTA dataset for the initial customized cosmetic product that was produced for the user, and the statistical record of previous interactions with the color neighborhood being modified. For instance, it may be determined that the most likely change needed is to make the color slightly darker or lighter in luminance, or slightly more orange or less orange. The light/dark colors may be presented vertically, and the less/more orange presented horizontally. Other color choices may surround these choices based on less likely options, such as, more red, or more yellow.

The user may then select the modification that is the closest to his or her need or preference such as selection "a" in FIG. 5. In a further example embodiment, the interface may then show the new color now at the center as in FIG. 6, with the old color next to it. The colors surrounding the new choice "a" of FIG. 6 (now at the center) show slightly smaller and larger color or tone steps based on the last selection, and the most likely choice. If satisfied with "a", the user may then finally select that choice as a final modified customized product and/or may select a further option now shown, such as item "b" of FIG. 6, in which case, that choice "b" would move to the center as in FIG. 7.

Figure 8:
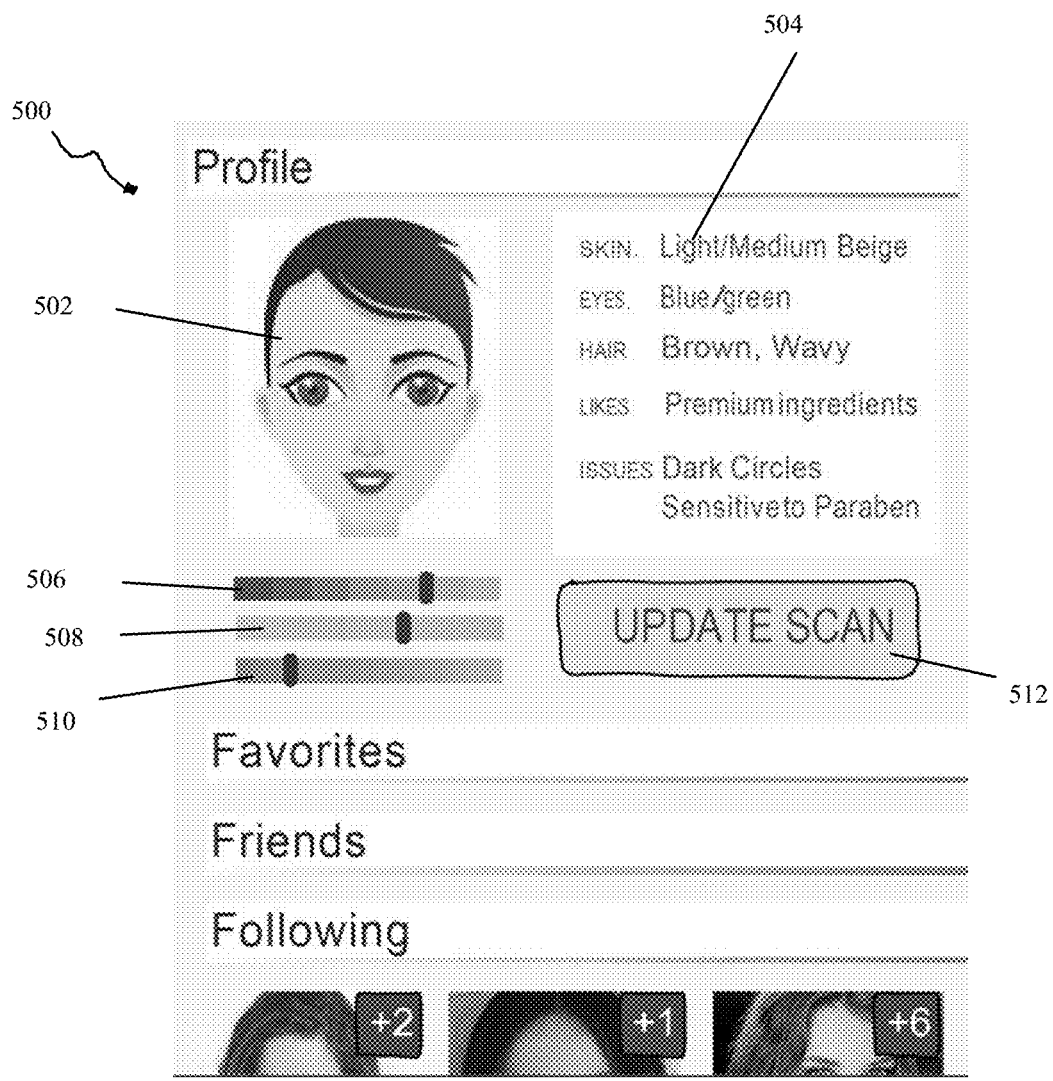
FIG. 8 is an illustration representation of a sample user interface page for use in modifying a user profile for a customized cosmetic product according to a further embodiment herein.

In another embodiment as shown in FIG. 8, a graphical representation of a user interface screen that may be with an application as described herein shows a user profile 500. The profile has a photo (shown as an illustration of a person, but in a real embodiment, a digital photo would preferably appear). The image of the user 502 is optional but useful in showing basic identification of the user and showing the user's characteristics as submitted to the application. The application may also use the photo or a video from the user or the user's scan (or updated scan) and activate associated software for detecting facial feature(s) and/or mapping of a user's face using facial recognition software. The photo is preferably taken from the user survey and/or facial detection software to provide the user with a current display for the user to refer to for evaluating the user's beauty profile and search component features for modification. The interface screen would also preferably include a summary 504 of general characteristics of the user taken from the user data collection and OAPTA metadata information from user feedback, facial detection, facial mapping, scanning survey, user input and from updated user scans as noted above. In this instance, the user is shown based on the user scans and user input to have a certain skin type ("Light/Medium Beige"), eye color ("Blue/green"), and to have a certain hair type ("Brown/Wavy") (which may be scanned or input by the user photo image data) and user preferences input by the user ("Premium ingredients") and user concern ("Dark Circles" and "Sensitive to Paraben").

In the embodiment described above, in which the user scans first, second and third facial regions, each of which is included within the next until the scan of the user's face is completed, and tracking is used during the scan, the data collected from the scan is input into the user data collection and OAPTA metadata along with the scanning device settings. Such information can be used to find a user's location on a complexion color map as described below, and also provides facial shape, hair color, eye color, skin color and color variations, skin finish, skin surface quality, pore size, etc.

The beauty profile 500 as noted above and as shown in FIG. 8 provides an alternative basis for editing the user's search key to modify the user's customized cosmetic product and associated OAPTA specification. The user's image 502 (which as noted above can be updated through an updated scan, facial detection and/or facial recognition software so as to be interactive) and the use of the general profile summary 504 information, are included for use in modification of the search key through at least one or more search components. As shown, the profile includes one or more sliding scales showing profile characteristics pertaining, for example, as a dark to light slide 506 (for example to measure the amount of melanin and skin tone), a cool to warm color slide 508 (running for example from green/red to blue/yellow tones which choices may be variable), as well as an undertone slide 510 which can relate to the ruddiness or natural tone of the skin which may be used in evaluating sun sensitivity. Other slide or adjustable components may include a dryness component or a coverage component. That is, the user may want to modify the moisturizing capability of a component in the formulation when their skin is drier (such as in the winter). The user may also wish to have a thicker and/or less opaque formulation when wanting additional coverage for a smoother look. Sliders, variation choices, selector buttons and the like may all be used for such modification requests.

It is also possible to simply include a feedback page for written or verbal feedback for requested changes from the user. The feedback data can be incorporated into OAPTA metadata derived from user data collection that would then also be utilized as noted above with reference to the initial user customized cosmetic formulation to establish commands encoded on the user's search key to associate with an updated OAPTA specification for preparing a mix and end product based on the modified search key.

The initial user profile can include the summary of the user when the initial profile was completed. The initial profile would represent the user data associated with search components in the search key that is related to the user's data collection in the OAPTA metadata used for creating the OAPTA specification. The profile may relate to an OAPTA that was developed for the user using the application to match the user to the ground truth data set to be closest to an existing commercial product (i.e., a non-customized product) or a customized cosmetic formulation. Whatever the match indicated, it was automatically selected for the user and matched to the user to create the OAPTA specification which is used for the mix and to generate the initial customized cosmetic formulation for the user.

In one embodiment a user may combine a product displayed on the user interface and the display of facial feature detection software to provide an interactive interface for the user to engage in interactive editing of search components of a search key (for example, by contacting a region of the image that is detected (such as a cheek area) so that the application can display search components associated with the reference profile of the product displayed on the user's image allowing the user to reference search components of the displayed product for modifying a user's own search components which in turn is for modifying a user search key and creating a modified or new customized cosmetic product.

Once the user evaluates the customized product, the user may determine, as noted above that the user may wish to try alternatives. For example, the user may wish to get a different coloration profile for a variety of reasons, including, e.g., a change in skin tone, skin undertone, aesthetic reasons, or for a different look. The user could then modify search components through the interface to modify the user's search key, such as by using the slides as in FIG. 8 (or variation color selection circles of FIGS. 5-7) to see how the change in tone or undertone might look on an image of the user in the profile screen, in the case where a facial recognition and/or feature detection software and make-up try-on application were integrated with the screen, or to use the sliders to initiate a new match. In order to do that, the application may ask the user also to "update scan" using the selection 512. The user may also use other application specific data (such as prior or current favorite non-custom or custom products the user may want to order or modify).

Users that log-in through social networks, may follow looks that their friends, who may be integrated to the application, are using, or friends or other users in the application that the user may be "following" to see what products other users of a similar coloring and look are selecting. Once the user wishes to modify the look or product orders using these various feedback selections, the user would update the scan, and use the sliders (or a color selection screen as described above with respect to FIGS. 5-7) to select a modified profile or a new and separate profile, each of which may be saved to the user's search key and user ID information so as to be available for further orders.

The product may then be re-ordered and manufactured using the modified search key. The primary points of the interaction with the user include that: the user is shown an interface to modify each relevant element of the search key; the variation in selection of each search key component is determined by the neighborhood being modified (whether expressed as a color variation selection screen, sliders or other similar mechanisms); the amount of variance in the neighborhood for that search key component is used to determine the amount of variation presented; the statistical record of requested variation is used to present the direction of the variation presented to the user; additional selections are provided to allow the user to edit less-likely cases; the original, unmodified value is presented next to the current selected value; and the user may optionally update his or her associated search key for future orders.

In another embodiment, a user may wish to modify an existing product that was not produced using custom manufacturing, but that has been characterized by the same system and method as the custom product as noted above. Thus, while the initial match may have been to a non-custom product for the initial user OAPTA, the user may still wish to modify that formulation. While this characterization may preferably include making the product customizable, it need not do so. The minimal case is that each shade or SKU of the product would be matched with a known user and a known search key. A database of such products is built, searchable, e.g., by each product SKU, and returning the product's associated search key, or a non-custom and custom product attribute data store may also be built and used for modification.

As mentioned above, a non-customized product may be used to create a search key, and that search key may reside in a ground truth data set. Thus, the user may also simply decide (even if the user has an existing profile for a customized product) to create a new profile using an existing non-custom product having a SKU (as its search key) and then modify it. The interaction for this embodiment includes that: the user may use a mobile device, web site or other device to modify the product; the user logs on; the user selects the non-custom product to customize, wherein selection may be by scanning a barcode, from a name search, from a product identification, and/or from a photograph of the product; the search key associated with the non-custom product is found in the ground truth data set; and the search key is used to modify and produce new custom product as described in the previous embodiment.

Other options may also be provided for modifying a user profile, including allowing a user to get an initial profile with several options recommended using the reference data and professional group, or the location of the user's complexion on a complexion color map and through access to the profile that may include one or more non-custom commercial products, and one or more customized formulations, each of which is selected by the user data input into the application from the initial user data and scan data, the user can select one or more product(s) for order or request modification or adjustment of the product(s) selected. As mentioned above, existing, non-custom product(s) may be associated to a user's search key and also presented to the user via the user interface. The neighborhood of non-custom products associated with search keys in the ground truth database, as disclosed above, may also be associated with the user, and their contribution scalar may be used for display.

In one embodiment of editing a user's search key, these products may displayed as a set of choices. The choices may be ranked by "closest match" value (99% rank, 80% rank, etc.) and displayed either graphically or by using a "try-on" software to allow the user to display the recommendations as ranked on an image of the user. Alternatively, the user may see color shades in graphical display or in an image of a product having a shade key and similar graphical displays to allow the user to choose a desired product, such as by selecting a new location on a complexion color map. The other choices may be saved to the user search key as alternative choices such that if the initial user selection is determined by the user to not be suitable in a future interaction with the application, the alternative choices may be tried or a new query submitted.

Each user interaction preferably includes an updated user scan and user profile review such that the application can detect any changes in the user's skin tone, skin undertone, blemishes, new skin tone change areas, hair color changes, preference changes, etc. The scan and specular reflectance measured by the scan from the user will also correlate to sebum content in the skin such that an artifact(s) on the skin (acne, wrinkles, skin irritation) can be monitored over time and mapped within the color map and user's facial map over time, with updates with each user scan to the user's profile. Such data collected overtime can also be used to modify an existing formulation based on the color map to modify coverage (thickness) of a makeup or oiliness/dryness for covering shine and/or adjusted for treating skin wrinkles. The updated scan will also automatically allow the application to interact with the user device to confirm and update for any change in the user's device (new device, updated operating system, updated version of the operating system, etc.), change in software, model number, etc., all of which is saved to the user data. The application will also preferably lead the user through a calibration each time the user re-engages the application to confirm the device data as discussed above and also to confirm the white balance and color data. The application will preferably calibrate using a calibration surface as noted above such as a known user's skin region, a white sheet of paper, a marker displayed by the device into a mirror, etc.

For a lighted-room environment, to account for greater environmental light illumination, finding the relationship between the camera and environmental illuminant can be complex. One solution that may be employed includes capturing multiple images using multiple illuminants to adjust the calculated surface color. An image is initially recorded by the user, by taking a 'selfie' using the device having an image sensor as described above with the color of the optical display being a known, calibrated color, or a calibrated white. In one embodiment, the screen color and brightness are measured for a given model of phone and used as a constant.

In other embodiments, where the screen color and brightness for a given model of the image device, such as a mobile phone, is too variable and cannot be considered constant, a white screen may be calibrated by having the user take a picture of himself or herself in a mirror. That image can then be used to calibrate the white screen of the phone—i.e., the white light in the image can be measured and, thus, become known. Techniques for embodiments of this step are described herein, in prior filings of the applicant, including U.S. Pat. Nos. 8,933,994, 9,122,918 and 9,122,919 and U.S. Patent Publication No. 2018-0260871A1 as well as described herein. For example, in one exemplary embodiment, the user is directed by a series of user interface screens to show the display of the handheld device to a common mirror. The exposure settings of the camera/phone are set to known values. The user is asked to press a user interface element to record an image of the image of the screen with the front camera of the hand-held device. Software on the hand-held device uses the recorded image, the known exposure settings, the type of the hand-held device, and the size and recorded brightness of the bright display in the image to calibrate the illumination of the display and the exposure sensitivity of the camera. This calibration information may then be used to improve the calculation of complexion color by using the found display illumination brightness and color relative to the exposure characteristic of the camera to adjust the white point for color conversion.

In making an initial selection or adjusting a selection, user scan data can be input into a color complexion map. As noted above, existing color maps have many drawbacks in terms of limitations as to the scope of the colors available, the lack of adaptation of such maps to geographical regions, the need to use a 3-dimensional space, when most user devices display in 2-dimensions, inadequate representation of skin undertones, and a failure to successfully map to the morphology and/or biochemistry of the skin.

The applicant herein has developed a more useful complexion color mapping that takes many of these drawbacks into account and provides a more useful mapping system.

The complexion color map herein is based on data in a user database taken from a number of diverse geographic regions of users, which location data is stored in the system in OAPTA metadata and in a user's profile. The complexion color map provides continuous 2-dimensional mapping that is easy for users to understand and interact with so as to provide yet another easy-to-employ basis for communicating a user's overall skin tone as well as basis for modification of products. The complexion color mapping results from a direct transformation of CIELAB L*a*b data and allows for representation and specific mapping of regions for cosmetic undertone, skin morphology and biochemistry. Use of the CIELAB data minimizes the error in color mapping, such that the resulting complexion color map is able to covers a wide gamut of user complexion colors.

Figure 10A:
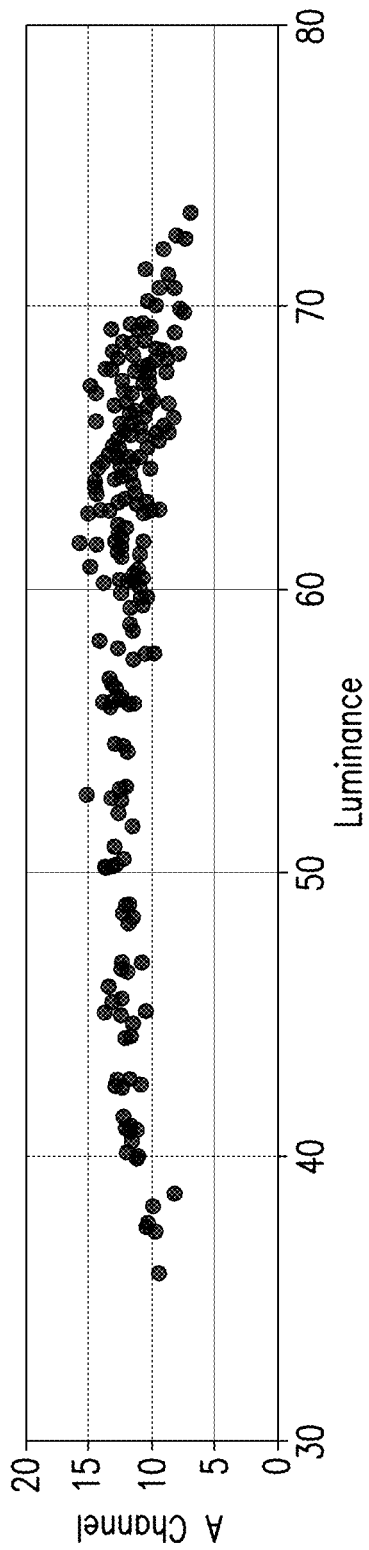
Figure 10B:
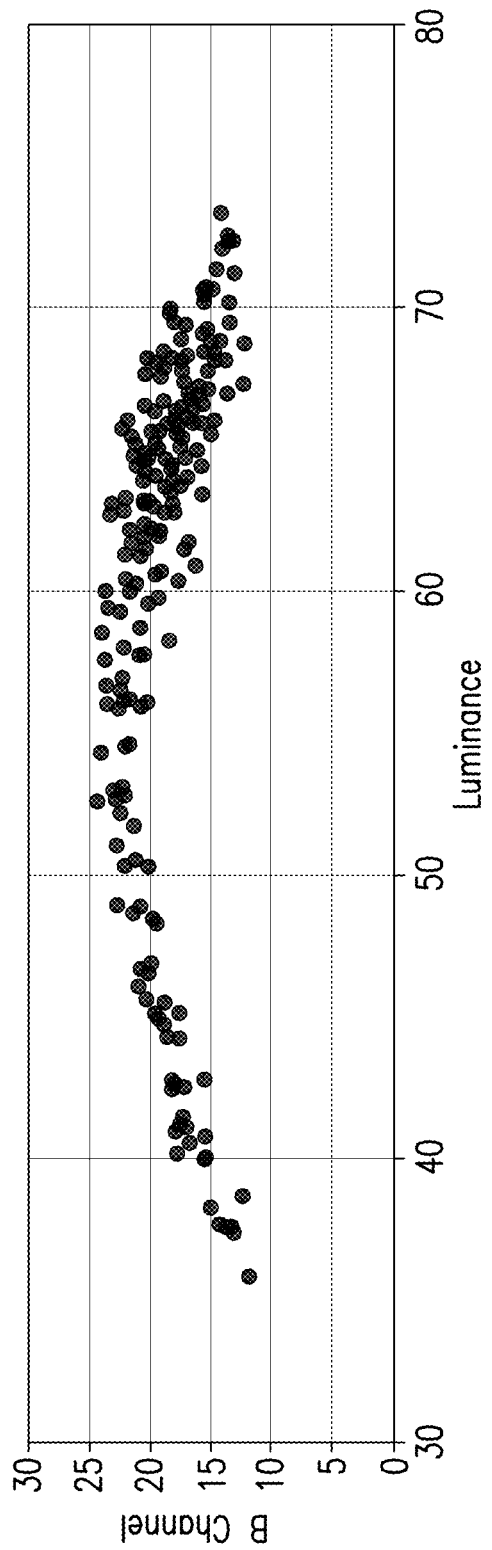

Initially, to build the complexion color map, data is recruited and obtained from users in one or more, and preferably a number of, diverse geographical areas which data can be incorporated as reference data. The number of users in the data set recruitment may be varied depending on the level of accuracy desired in the statistical sampling. Generally, at least 200 to 500 users may be sampled although more or less may be sampled as desired. The sample group or "complexion group" is then evaluated using a common and calibrated, uniform device capable of measuring light and color data, such as a NIST-certified spectrophotometer. However, any common device capable of performing this function may be used. A common device of high accuracy is preferred to give a known accuracy level to the sample based on the complexion group. The same instrument is used for all sampling. Data may be collected in these scans from one or more locations on the user's skin, e.g., the inside of the wrist, the forehead, the right cheek, the right jawline, the left cheek or the left jawline, and any other areas that may later be indicated for mapping on users that will avail themselves of the application herein. Results collected from the device scanning is aggregated using median sampling and may be displayed as shown in FIGS. 10a, 10b, in graphs 10a and 10b. In FIG. 10a, a graph of collected data is in the L*/a* plane. It is graphically represented as the a* channel against the luminance L* data, wherein using a CIELAB color model, the a* channel represents color variations measuring from a negative green to a positive red and L* represents luminance or lightness measured from 0 (black) to 100 (white). Similarly, data from the L*/b* plane is shown and graphically represented in FIG. 10b, wherein the b* channel is shown against the L* data, wherein the b* channel represents color variations measuring from a negative blue value to a positive yellow value. This data is then characterized using PCA on the CIELAB data. This results in a geometric surface with direct mapping within the CIELAB color space.

Figure 11:
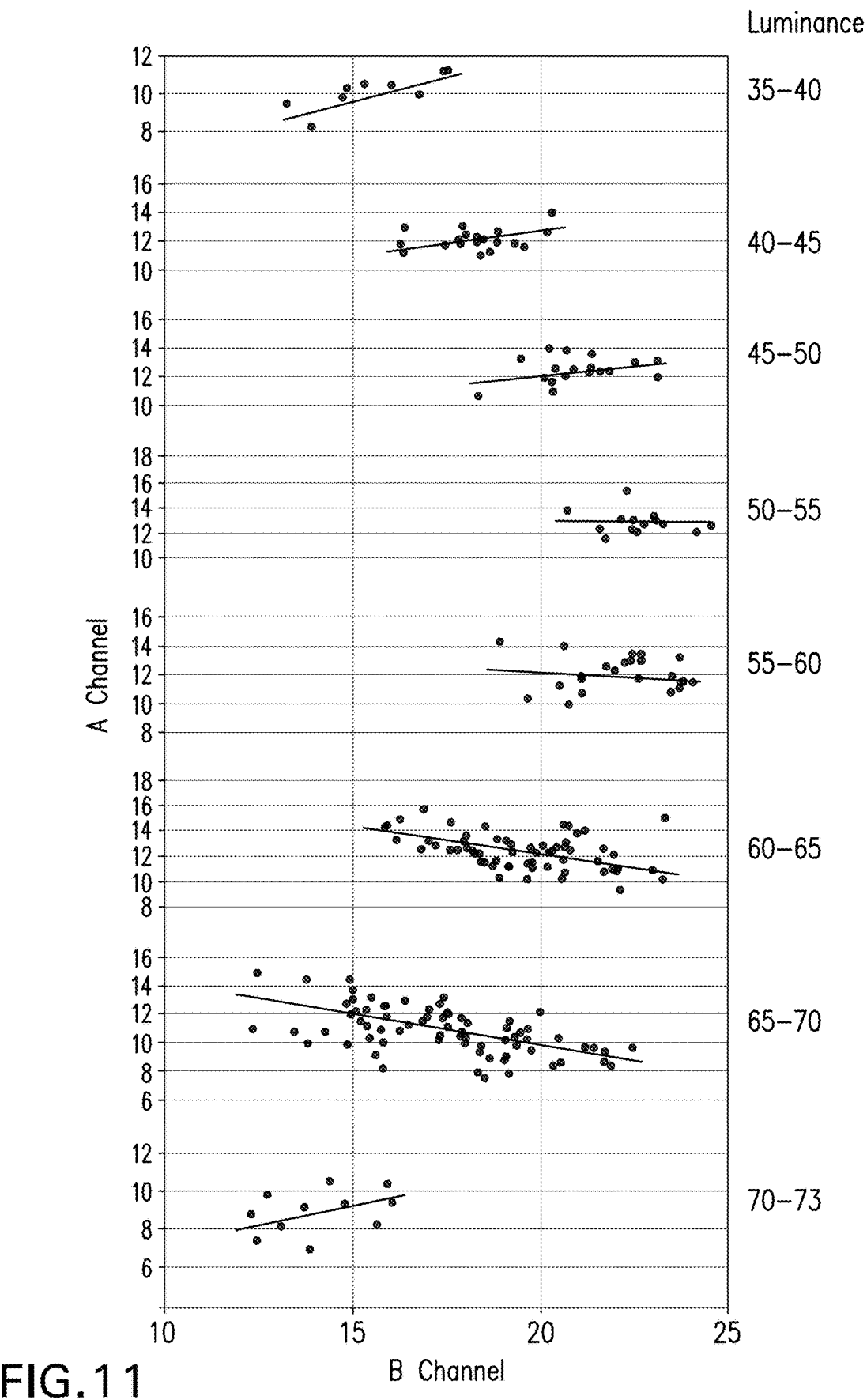
FIG. 11 is a graphical representation of data from FIGS. 10a-10b plotted using a 5.0 lab L* unit range to create bins of data represented as a 2-dimensional projection in the b*/a* plane after using PCA to find the best fit of a function of the a* channel to the b* channel to create a sequential linear fit of the data of FIGS. 10a-10b.

To carry out such PCA, samples are binned by L* value range. Bin size is determined by population and needed accuracy of the mapped results. The bin range is further determined by the L* range of collected samples. For example, using a data set as noted above, a 5.0 lab L* unit range may be used. Each bin of data is then represented as a 2-dimensional projection in the b*/a* plane. Once this is done PCA is performed to find the best fit of a function of the a* channel to the b* channel to create a sequential linear fit of the data set of FIGS. 10a, 10b as shown in FIG. 11. In FIG. 11, luminance values of ranges of 5.0 are used from 35 to 70, and a further dataset of 70-73 is used as the overall dataset range runs from about 35 to 73. A calculation may be used to determine error for each segment by calculating the distance of the b* component to the linear fit found. Other methods of finding a 3-dimensional surface that has the best fit to the sampled data may also be used, and this method is provided as one potential pathway for analysis. Other suitable methods may be found, for example, in N. Gorbanet et al., "Principal Manifolds for Data Visualization and Dimension Reduction," (2008).

Figure 13A:
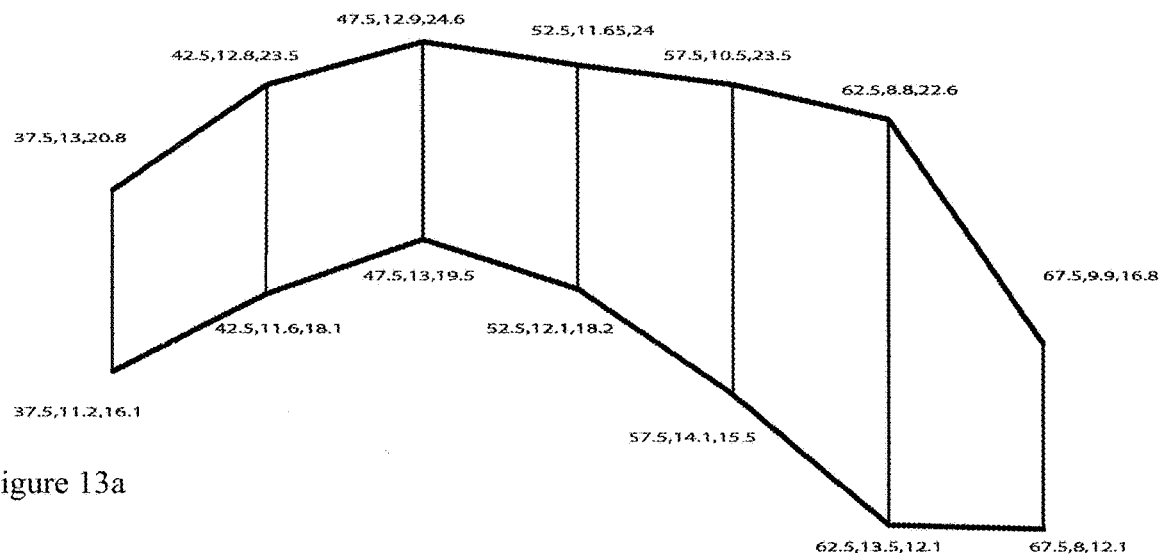
FIG. 13a is a graphical representation of a projection of connected polytopes in the L*/b* plane is shown with the CIELAB coordinates from Table 1 at each vertex.
Figure 13B:
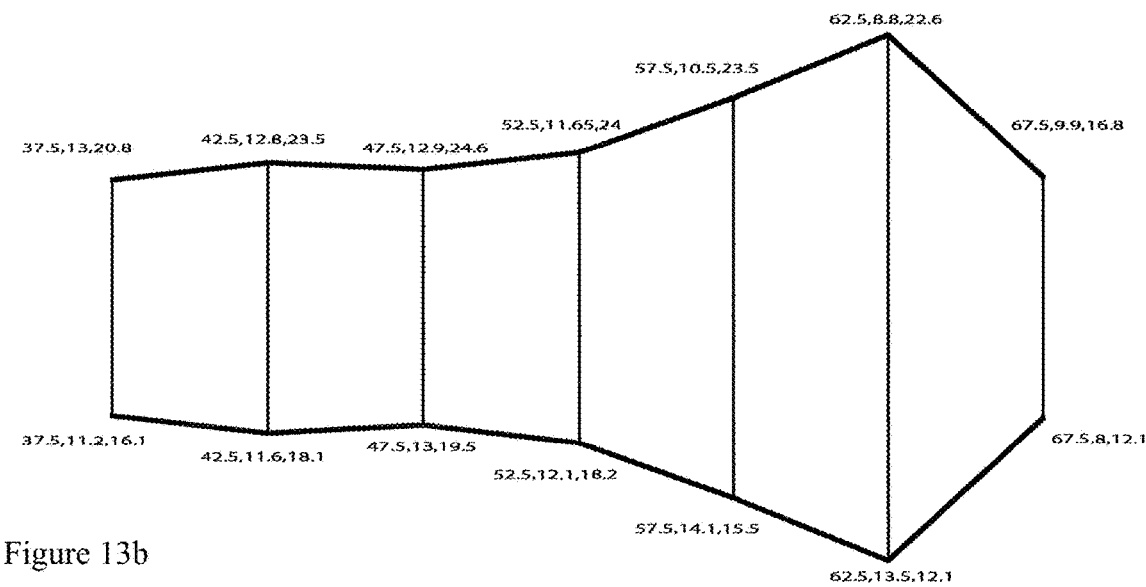
FIG. 13b is a graphical representation showing the projection of FIG. 13a adjusted so that the median of each cross section is centered.

FIG. 12 shows projections of the data mapped in FIGS. 10a, 10b and 11 are shown as 2-dimensional connected polytopes generated through the PCA technique, in the L*/a* plane, L*/b* plane and as a perspective projection in the b*/a* plane, in FIGS. 12a, 12b and 12c, respectively. The projection of connected polytopes in the L*/b* plane is shown in FIG. 13a with the CIELAB coordinates shown below in Table 1, at each vertex. FIG. 13b, shows the same projection adjusted so that the median of each cross section is centered.

TABLE 1

| L1 | a1 | a2 | L2 | b1 | b2 |
|---|---|---|---|---|---|
| 37.5 | 11.2 | 16.1 | 37.5 | 13 | 20.8 |
| 42.5 | 11.6 | 18.1 | 42.5 | 12.8 | 23.5 |
| 47.5 | 13 | 19.5 | 47.5 | 12.9 | 24.6 |
| 52.5 | 12.1 | 18.2 | 52.5 | 11.65 | 24 |
| 57.5 | 14.1 | 15.5 | 57.5 | 10.5 | 23.5 |
| 62.5 | 13.5 | 12.1 | 62.5 | 8.8 | 22.6 |
| 67.5 | 8 | 12 | 67.5 | 9.9 | 16.8 |

Figure 14A:
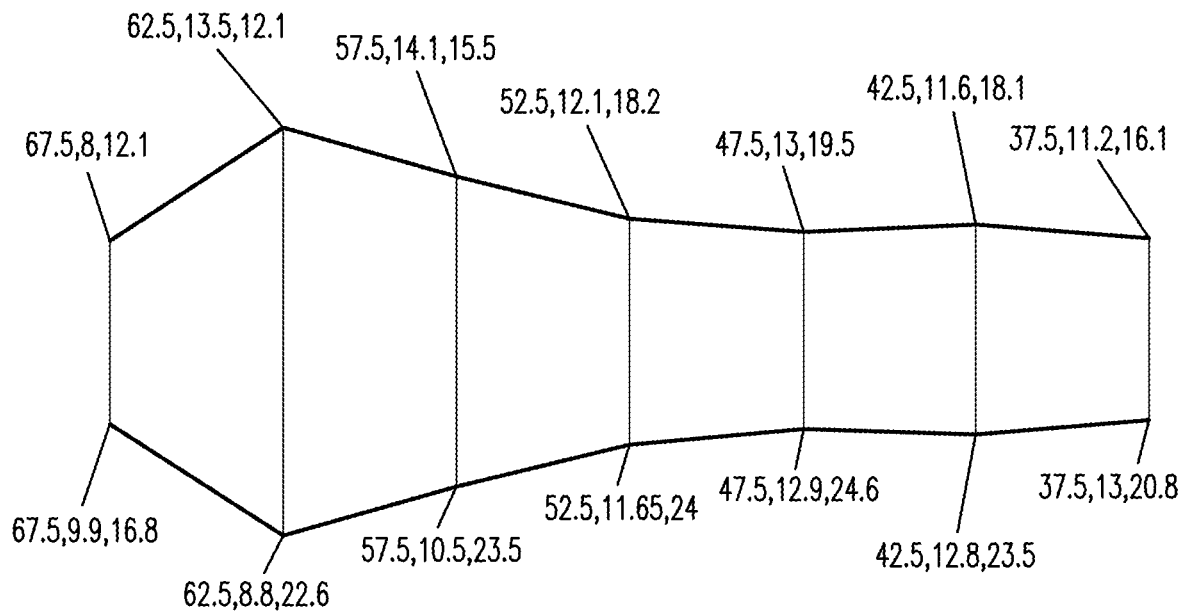
FIG. 14a is a graphical representation showing the projection of FIG. 13a reoriented for location in a rectangular map with CIELAB coordinates at the vertices.
Figure 14B:
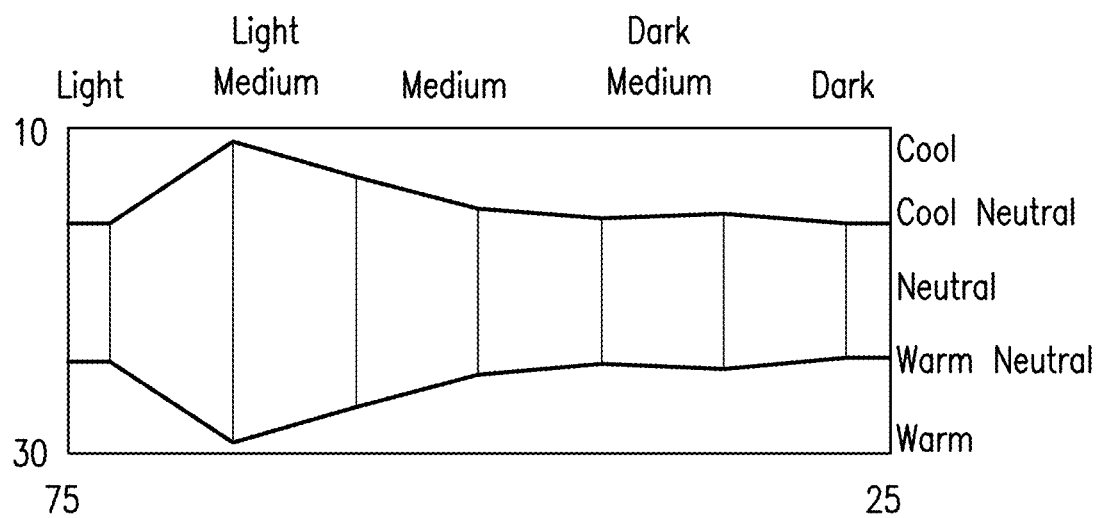
FIG. 14b is a graphical representation of the projection of FIG. 14a within a rectangular map and labeled with natural language and having numeric values for the L* and b* axis.

FIG. 14a shows a further projection of the projection shown in FIG. 13a placed within a rectangular map and labeled. With reference to FIG. 14a, the L*/b* projection is initially adjusted so that the median of each cross section is centered. While this flipping is optional, it was done to arrange colors in a compatible scale as a matter of design choice. The projection is incorporated in a rectangular map in FIG. 14b and labeled with numeric values for the L* and b* axis as well as to incorporate alphanumeric labels useful for describing the mapping in text and for user interactions.

Figure 15A:
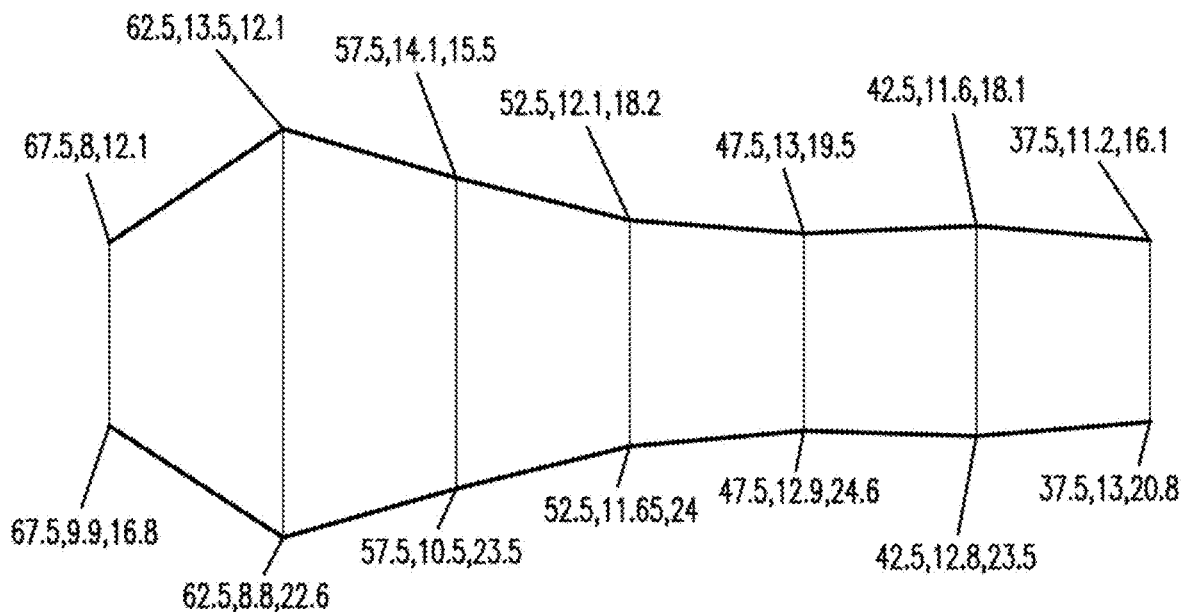
FIG. 15a is a graphical representation of the same L*/b* projection of FIG. 14a oriented for placement in a rectangular map for assigning skin color, undertone and morphology in regions.
Figure 15B:
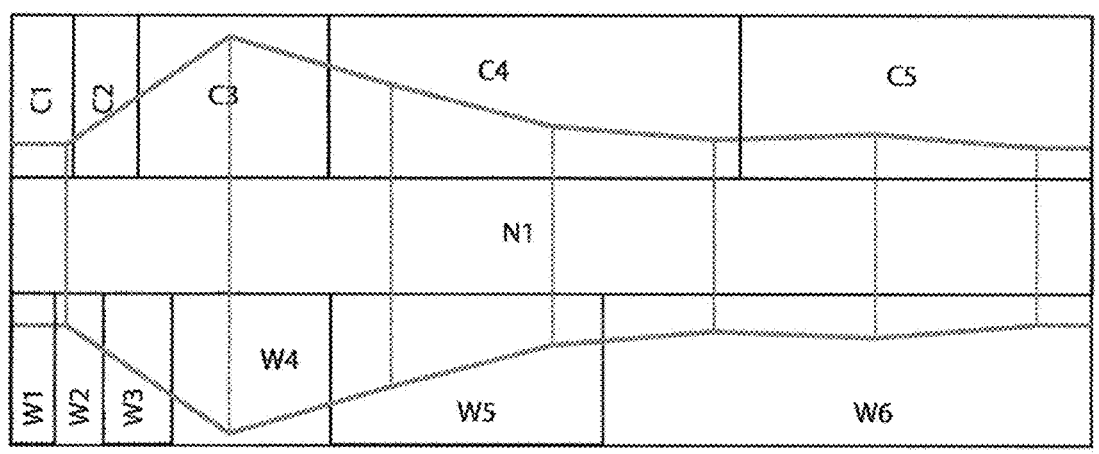
FIG. 15b is a graphical representation of the projection of FIG. 15a in a rectangular map with regions associated with skin undertone, color and skin morphology identified.

In FIG. 15, the same L*/b* projection of FIG. 14a is shown in 15a and is then placed in a rectangular map in FIG. 15b with regions for undertone and skin morphology identified. Morphology and biochemistry may be adapted from various sources that analyze skin pigment and epidermal information. For example, Del Bino et al., "Chemical Analysis of Constitutive Pigmentation of Human Epidermis Reveals Constant Eumelanin to Pheomelanin Ratio," DOI: 10.1111/pcmr.12410, vol. 28, issue 6, pp. 707-717 (2015), provide background information for evaluating the morphology and biochemistry of the analyzed skin. This particular study evaluates melanin content in skin samples of variable pigmentation through individual typology angle (ITA) using image analysis, spectrophotometry after solubilization and HPLC. ITA and total melanin (both eumelanin and phomelanin) were found to be correlated, such that human epidermis includes 74% eumelanin and 26% pheomelanin regardless of the degree of pigmentation, and the study also confirmed the low content of protective eumelanin among lighter skin explaining higher UV sensitivity. Such information can be used to analyze UV absorption and other factors of coloration of skin pigment. As shown in FIG. 15b, the regions identified use this information to provide feedback on the skin.

In FIG. 15b, the following map regions are located:
Region C1: provides undertones of blue and very fair translucent skin with a top layer of minimum melanin content and a mid-layer of de-oxygenated hemoglobin;

Region C2 provides undertones of light purple, with very fair translucent skin having a top layer of low melanin content and a mid-layer of a thin tracery of oxygenated hemoglobin;

Region C3 provides undertones of cool red, with fair skin having a top layer of low melanin content and a mid-layer of oxygenated hemoglobin;

Region C4 exhibits undertones of cool reddish brown, and a medium tone skin having a top layer of a low proportion of yellow-pheomelanin to brown/black-eumelanin and a mid-layer of oxygenated hemoglobin;

Region C5 provides undertones of umber, in medium dark to dark tone skin having a top layer of a low proportion of yellow-pheomelanin to black-eumelanin, with a mid-layer of minimum oxygenated hemoglobin and a lower layer of black-eumelanin;

Region N1 provides neutral undertones, a fair to dark skin tone with a relatively opaque top layer having about 74% of eumelanin and 24% yellow pheomelanin and 2% red-pheomelanin, a mid-layer with a tracery of oxygenated hemoglobin, and a lower layer with traces of eumelanin, yellow-pheomelanin and a very low content of red-pheomelanin;

Region W1 provides a pink undertone, with very fair skin having a top layer proportion of red-pheomelanin content and a mid-layer with a thin tracery of oxygenated hemoglobin (such a person may also have red hair and freckles);

Region W2 provides peach undertones and fair skin having a top layer with a larger proportion of red-pheomelanin and yellow-pheomelanin;

Region W3 provides a yellow undertone and light skin with a top layer having a larger proportion of yellow-pheomelanin than neutral skin tones;

Region W4 provides an olive undertone and a light-medium skin tone with a relatively opaque top layer and a somewhat larger proportion of yellow-pheomelanin to brown eumelanin than neutral skin tones;

Region W5 shows a gold undertone and a medium skin tone having a relatively opaque top layer and a somewhat larger proportion of yellow-pheomelanin to brown-eumelanin than neutral skin tones; and Region W6 shows warm brown undertones and a dark skin tone with relatively opaque top layer and a somewhat larger proportion of yellow-pheomelanin to brown-eumelanin than neutral skin tones.

Such a complexion color map as noted herein using words and regions can use various descriptive words associated with the L* (luminance) gradient of the map. The words may describe a value of L* in specific regions of the complexion map, and such words may be associated with even step changes in luminance, i.e., steps on the L* axis of the complexion map, e.g., Very light, Light, Medium light, Medium, Medium dark, Dark and Very dark. This is shown in an example in FIG. 14b. The complexion map may also incorporate descriptive words that associate with the projections of the a*/b* surface which can increase in the a*/b* axis at regular intervals, including, e.g., Very cool, Cool, Cool neutral, Neutral, Warm neutral, Warm, Very warm. A corpus of natural language text and verbal descriptions description complexions within the complexion group may then be collected and easily searched and used in various ways for matching or tracking a user's data against the complexion group data. Such complexion group data may be used as training data for a machine learning system to relate locations on the complexion color map to natural language text or verbal descriptions of the complexion group members. The system may use such training data to map natural language input to complexion map output. The system may also be trained to map complexion map input to synthesized language output.

The complexion map may be used with the user's interaction with the application. The user's face scan data may be incorporated into the application and analyzed against the complexion map based on the complexion group data to determine a location on the complexion color map that relates to the user's scan data. Words associated with the L* axis and a*/b* axis may be combined to form a description of the particular location corresponding to the user's scan data providing a description of the user's skin location on the complexion color map in terms of its region for skin undertone, skin morphology, etc. The scan location for the user can be used as a complexion color map input location to generate a synthetic natural language description of the scan using the methods noted above. The complexion color map may then be annotated with coordinates and words describing the L*axis and a*/b* axis data for the user. A portion of the complexion color map that is most meaningful to the user may be shown to the user or described by words or voice. A swatch or other rendering of the user's scan on the complexion map may also be shown. The complexion color map may also be divided into discrete areas by quantizing or other sampling means.

The user receives an output from the application as noted above in terms of the user's location on the complexion color map. That location may then also be used by the user to select a new location on the complexion color map either through gestural interaction, such as by pointing or touching a location on the map, clicking on a location or swiping the map up or down to center a new location. Further, as the complexion map locations are associated with words/text or voice, the selection may be made by natural language input that may be refined or verified using descriptive word responses.

As noted above, a user may desire to modify a custom formulation or an existing non-custom product, and the application may include a modification or adjustment feature such as features noted above wherein the user may see a representation of the matched color and choose from closest matches in proximity as shown in FIGS. 5 and 6. In another embodiment, modification can be carried out using an adjustment application that may operate using a complexion color map as noted above (wherein a user's scan provides a location and the user modifies the location), or through use of data in a product attribute data store.

In providing non-custom products to the ground truth data set, such products can be used as a formulation having given formulation properties (color, coverage and the like) which may be accessed by the system when matching a product in the ground truth data set to a user's scan data to recommend and create a new customized cosmetic product having a search key, and can be used and accessed by the user when a user uses steps in the present system to modify or adjust an existing customized cosmetic product formulation based on the initial search key to create a second product and/or modified customized cosmetic product formulation and modified search key. The non-custom products can also be included as listed user preferences in an OAPTA specification and in OAPTA metadata. Each of these circumstances and uses for non-custom products is described above. It is also described herein that the non-custom products may be used as reference user data through reference users applying such products and incorporating their scan data into the ground truth data set for searching to match with a search key.

In one embodiment herein, the non-custom products data may be used in an improved way by building a product attribute data store. The product attribute data store may be separately held data and/or incorporated on one or more ground truth data sets as described herein. The product attribute data store may incorporate a given set of color cosmetics, including cosmetic foundations, make up, skin care, and the like that are identified and their attributes collected and stored digitally. Individual color cosmetics may be used as the products in the product attribute data store that are non-custom retail commercial products. The attributes collected may vary depending on preferences, but preferably include color data, coverage data and surface qualities. The products in the product attribute database may also ultimately include customized cosmetic products prepared under the present disclosure with a known attributes such as color, coverage and surface qualities.

To adjust or modify products in the product attribute data store, a user may use any of the modification steps described herein. In one embodiment, the user may, for example purchase a commercial product that is in the product attribute database and order it from any source, including through the software application herein, and then tries the product. Similarly, a user may order a customized cosmetic product using the application and try the product. In either case, the user may wish to adjust or modify the product either because the match is not correct, the match is not what was desired or the product attributes are not correct (too oily or insufficient coverage, for example). The adjustment application works with the product attribute data store to help to modify the product purchased.

The adjustment application can be part of the overall user application or separately accessible through any mobile web browser, stand-alone mobile application or as a voice directed application.

If the product to be adjusted is a commercial, non-custom product, even if not originally selected through a match using the original application, the user may be directed to scan or take a photo of the product to create a product photo. The user will be directed by the adjustment application to apply the product as a swatch (as described above herein) to an area of the user's face. The user will preferably be instructed to apply the cosmetic in a somewhat thick region, about 1 mm thick with defined edges. The applied cosmetic is thus the user's swatch. The applied cosmetic on the user's face is now a swatch. The user than is directed to take a photo of the user's face while wearing the swatch. This photo is referred to herein as a "swatch selfie." The application then then will send or direct the user to send the product photo and the swatch selfie photo to the web interface of a web-based application that is the adjustment service. The service then performs various steps.

Machine vision and machine learning systems are used to identify a specific product from its submitted photo and the color, coverage and surface quality information are found for the product (whether in the product attribute data store or through a further source). Computer vision techniques may be used to locate the product swatch on the photo of the user's face, and the area and location of the swatch on the user's face is identified as the product region.

Using computer vision technologies, the user's skin region next to the product swatch is located ("swatch location skin region"). The application then calculates the relative product color of the product within the swatch location skin region. The application further calculates the relative skin color within the swatch location skin region. The application further retrieves the product attributes from the product attributes data store, including the color, coverage and surface qualities of the product. The application transforms the relative color of the product and of the skin in the swatch location skin region to an absolute color using data from the product attributes data store.

A difference is determined between the absolute skin color and the absolute product color as determined from the swatch location skin region and the absolute product color is used to adjust the mixture of the cosmetic in the search key as described above and in U.S. Pat. No. 9,122,919 of the applicant, incorporated in relevant part herein. The absolute skin color can further be represented as a CIELAB color using the complexion color map or some other technique so as to represent a facial scan as noted hereinabove. A facial scan is then also preferably used to provide further user knowledge of the face using the various user interaction steps as described above.

Figure 9:
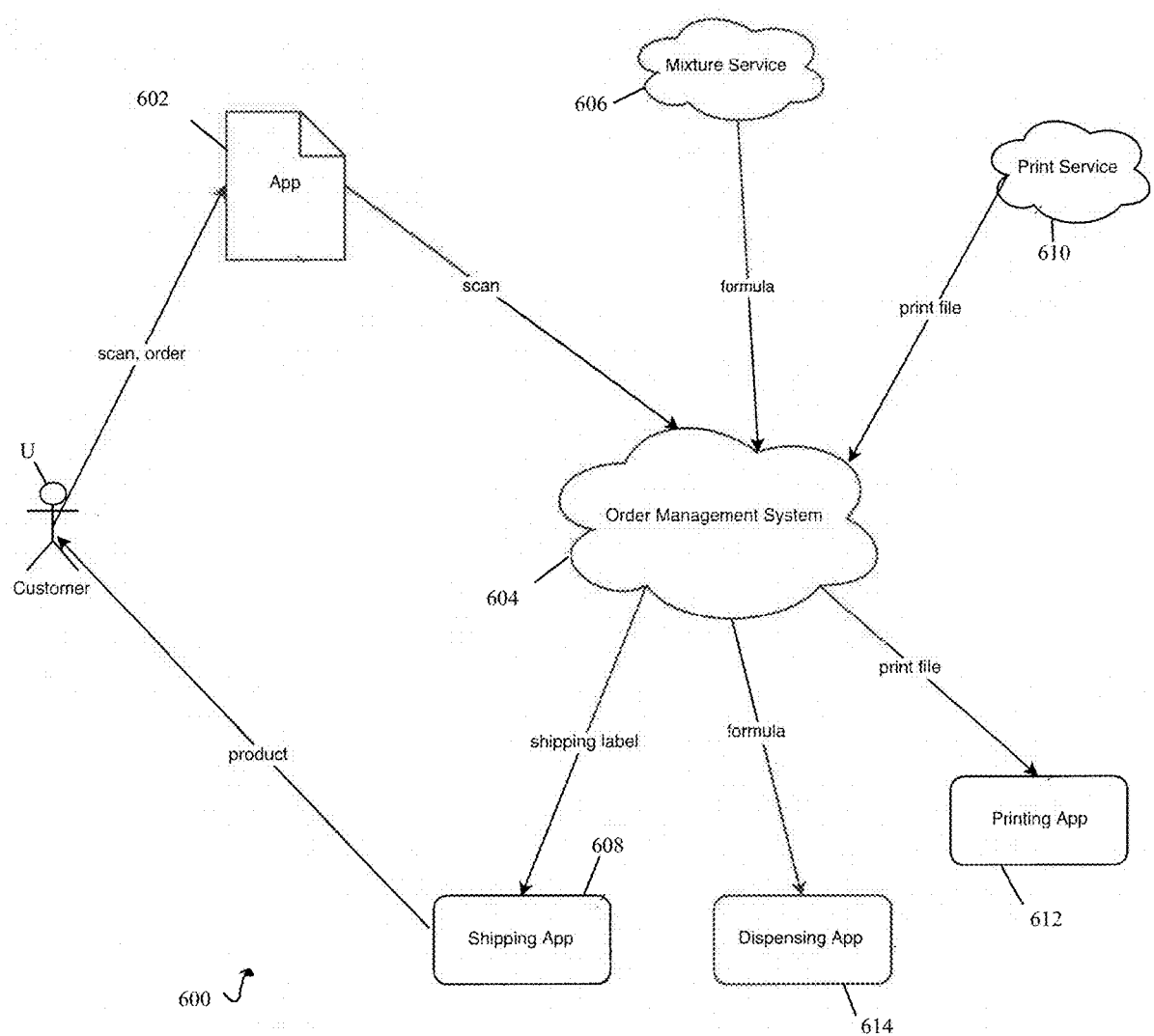
FIG. 9 is a representation of a system for use in creating a customized cosmetic product or modifying a customized cosmetic product.

In a generalized overall system 600 as shown in FIG. 9, a user U interacts with the application 602, wherein the application may be any of the systems and methods described hereinabove, through using a scan and/or ordering a customized cosmetic formulation through the application. The application 602 running on a device having an image sensor and preferably a light source as described above communicates the scan data (including optical data, user information, etc. as described above) to an order management system 604. The order management system and various components thereof, are connected to a server(s) as described above which may reside in specific locations or in a cloud-based or other remote server. The order management system stores the data for the various functions and steps to be carried out as described above. It interacts with a mix service 606 that generates a customized cosmetic formulation, a shipping application 608 which will receive a shipping label incorporating user information from the management system, a printing service 610 that prints data according to the order management system for the user ID and other information on the product as well as on the labels, a printing application 612 that runs the print service and interacts with the management system 604, and a dispensing application 614 that receives instructions from the order management system to dispense and blend the customized cosmetic formulation based on instructions from the mixture service and order management system. A preferred example of such a system is described in detail in applicant's co-pending U.S. Patent Application Publication No. 2018/0189853A1.

This system 600 may also be adapted to carry out the modification of a customized product by sending a rescan from user U using the application 602 and modifying the user search key stored in the user management system 604 and then executing the system based on the modified search key selection. The device re-scan will send the calibrated information as well as the updated user information and instructions for manufacturing. The mix will also be calibrated on each request against model L* a* b* data or other pre-set calibrations for color data. Each pre-mix is tested and calibrated accordingly. Non-custom commercial products included in the data base are also stored based on calibrated L* a* b* data, opacity and shine. Thus the system remains dynamic and responsive to user needs while providing interactive beauty guidance through the match capability based on the user's scan, user input, preferences, and access to the choices that are provided by using the search key to match the user to the ground truth data set having information from both existing non-custom products and reference user data and existing user data incorporating a large number of customized cosmetic formulations to allow for a closest match and creation of a customized cosmetic formulation as well as the ability to modify that customized cosmetic formulation based on a user's request, changes in styles, aesthetics or the user's profile data. The user's profile data (which may be referred to as a beauty profile) can be interactive so as to all the user to transmit questions through the application concerning the profile, so as to drive the most accurate profile and/or to take into account user preferences (cost, brands, components, colors, etc.). Data may be collected from the user interactions through known techniques achieved using website analytics to provide recommendations through the application or to inform the professional service so as to incorporate feedback and further recommendations.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

I claim:

1. A method for modifying a customized cosmetic product associated with a user, comprising:
   a. providing a system comprising at least one computer that includes a memory for storing computer-executable instructions and a processing unit for executing the instructions stored in the memory, and a device having an image sensor, a display and an application installed thereon, the system configured to provide calibrated user data by guiding a user using the application to automatically calibrate settings of the device having the image sensor based on user data and device data, guiding the user to scan at least one image of a skin region of the user using the calibrated settings, processing at least one image of the skin region with the calibrated settings, and saving the calibrated device data and the calibrated user data in a known search key associated with the user in the memory of the at least one computer, wherein the application uses the calibrated user and device data to provide a location on a complexion color map associated with the user based on the calibrated user data and device data and the location on the complexion color map is saved in the known search key;
   b. specifying an initial customized cosmetic product for the user using the location on the complexion color map in the known search key;
   c. providing an interactive user interface on the device display that includes the location on the complexion color map associated with the user from the known search key and allowing the user to select a second location on the complexion color map to create a modified search key; and
   d. using the modified search key to produce a modified customized cosmetic product and to determine modified manufacturing instructions associated with the modified customized cosmetic product.

2. The method for modifying a customized cosmetic product according to claim 1, wherein the initial customized cosmetic product is the same as a non-custom product and the known search key and the location on the complexion color map of the initial customized cosmetic product for the user is the same as the search key and location on the complexion color map of the non-custom product.

3. The method for modifying a customized cosmetic product according to claim 1, wherein the known search key and the location on the complexion color map includes the user's geographic region.

4. The method for modifying a customized cosmetic product according to claim 1, wherein the known search key further comprises at least one search component selected from the group of color, color variance, coverage, skin tone, skin undertone, surface quality, surface finish, dryness, oiliness, SPF, hair color, eye color, facial shape and/or pore size.

5. The method for modifying a customized cosmetic product according to claim 1, wherein each location on the complexion color map corresponds to a CIELAB color within a range of error of ±about 3 percent.

6. The method for modifying a customized cosmetic product according to claim 1, wherein regions of the complexion color map are associated with a natural language description used as a speech user interface to specify and search for a product or for use in modifying a product.

7. The method for modifying a customized cosmetic product according to claim 1, wherein the complexion color map is prepared using at least one two-dimensional projection of $L^*a^*b^*$ color data in the $L^*/b^*$ plane, and wherein the $L^*a^*b^*$ color data is taken from a group of users having varying complexions scanned using a calibrated spectrophotometer, and a plurality of regions overlaying the two-dimensional projection are associated with varying complexions.

8. The method for modifying a customized cosmetic product according to claim 1, wherein the application interactively guides the user to scan an area of the user's skin to collect data on one or more skin regions of the user;
   wherein the application is capable of adjusting the device settings for controlled scanning of the user's skin; and
   wherein the user data and device data collected is used to identify the location on the complexion color map associated with the user and the initial search key.

9. The method for modifying a customized cosmetic product according to claim 8, wherein step (c) further comprises the application interactively guiding the user to complete a new scan of the user's skin to collect updated user data and device data prior to creating the modified search key, and wherein changes in the updated data are collected by the system and used to modify the location on the complexion color map associated with the user in the initial search key before the user's modification of the location on the complexion color map.

10. The method for modifying a customized cosmetic product according to claim 1, wherein the initial customized cosmetic product associated with the known search key is a unique custom formulation associated with the user and communicated to the system by applying a swatch of the non-custom cosmetic on the region of the user's skin and scanning an image of the swatch on the user's skin to the system using the application and/or by the user scanning the non-custom product in a container.

11. The method for modifying a customized cosmetic product according to claim 1, wherein the complexion color map results from a direct transformation of CIELAB $L^*a^*b$ data.

12. The method for modifying a customized cosmetic product according to claim 11, wherein the user selects the second location on the complexion color map by pointing or touching the second location on the complexion color map, by clicking on the second location on the complexion color map, or by first moving the complexion color map on the display to center to the second location and then selecting the second location.

* * * * *